(12) United States Patent
Wagner et al.

(10) Patent No.: US 11,881,967 B2
(45) Date of Patent: Jan. 23, 2024

(54) METHOD FOR THE ACQUISITION OF IMPULSE RESPONSES, E.G. FOR ULTRA-WIDEBAND SYSTEMS

(71) Applicants: Fraunhofer-Gesellschaft zur Förderung der angewandten Forschung e.V., Munich (DE); Technische Universität Ilmenau, Ilmenau (DE)

(72) Inventors: Christoph Wagner, Ilmenau (DE); Florian Römer, Saarbrücken (DE); Rudolph Sebastian Semper, Ilmenau (DE); Giovanni Del Galdo, Ilmenau (DE)

(73) Assignees: Fraunhofer-Gesellschaft zur Förderung der angewandten Forschung e.V., Munich (DE); Technische Universität Ilmenau, Ilmenau (DE)

( * ) Notice: Subject to any disclaimer, the term of this patent is extended or adjusted under 35 U.S.C. 154(b) by 0 days.

(21) Appl. No.: 17/658,310

(22) Filed: Apr. 7, 2022

(65) Prior Publication Data
US 2022/0239530 A1    Jul. 28, 2022

Related U.S. Application Data

(63) Continuation of application No. PCT/EP2020/078154, filed on Oct. 7, 2020.

(30) Foreign Application Priority Data

Oct. 7, 2019  (EP) ..................................... 19201805
Sep. 2, 2020  (EP) ..................................... 20194213

(51) Int. Cl.
*H04L 25/02*  (2006.01)
*G01S 13/02*  (2006.01)
*G01S 13/08*  (2006.01)

(52) U.S. Cl.
CPC ...... *H04L 25/0212* (2013.01); *G01S 13/0209* (2013.01); *G01S 13/08* (2013.01); *H04L 25/0246* (2013.01)

(58) Field of Classification Search
CPC ............ H04L 25/0212; H04L 25/0246; H04L 25/0224; H04L 25/0242; G01S 13/0209; G01S 13/08
See application file for complete search history.

(56) References Cited

U.S. PATENT DOCUMENTS 6,026,130 A * 2/2000 Rahmatullah ....... H04L 25/0228
375/285
6,272,441 B1 8/2001 Peyerl et al.
(Continued)

FOREIGN PATENT DOCUMENTS

DE     19846870 C1    1/2001
EP     0994358 A2     4/2000

OTHER PUBLICATIONS

Baraniuk, R., et al., "Compressive radar imaging", Radar Conference, 2007 IEEE. IEEE, 2007, pp. 128-133.
(Continued)

*Primary Examiner* — Kabir A Timory
(74) *Attorney, Agent, or Firm* — Perkins Coie LLP; Michael A. Glenn

(57) ABSTRACT

There are disclosed techniques (e.g., apparatus, methods) for estimating an impulse response of a linear system.
An apparatus is configured to generate a transmit signal on the basis of a first sequence. The apparatus is configured to obtain a receive signal and to multiply the receive signal with a second sequence, to obtain a modified receive signal,
(Continued)

wherein the second sequence is different from the first sequence. The apparatus is configured to analog-to-digital, ADC, convert an integration result in order to obtain a sample value, the integration result being based on an integration of the modified receive signal over a period of time. The apparatus is configured to obtain an estimate of the impulse response on the basis of a plurality of sample values.

19 Claims, 18 Drawing Sheets

(56) References Cited

U.S. PATENT DOCUMENTS

| | | | |
|---|---|---|---|
| 7,561,643 B1 * | 7/2009 | Piirainen | H04L 25/062 375/317 |
| 8,717,210 B2 | 5/2014 | Eldar et al. | |
| 8,836,557 B2 | 9/2014 | Eldar et al. | |
| 9,532,735 B2 | 1/2017 | Sana et al. | |

OTHER PUBLICATIONS

Eldar, Y , et al., "Compressed Sensing: Theory and Applications", Cambridge University Press, Jan. 2012.
Golomb, S W , Shift Register Sequences. Laguna Hills, CA, USA: Aegean Park Press, 1981.
Le Magoarou, L , et al., "Flexible Multilayer Sparse Approximations of Matrices and Applications", IEEE Journal of Selected Topics in Signal Processing, vol. 10, No. 4, pp. 688-700 Jun. 2016, XP011610087.
Lustig, M. , et al., "Compressed sensing MRI", IEEE Signal Processing Magazine, vol. 25, No. 2, pp. 72-82, 2008.
Mishali, M , et al., "Sub-nyquist sampling", IEEE Signal Processing Magazine, vol. 28, No. 6, pp. 98-124, Nov. 2011.
Oliphant, T E , et al., "A guide to NumPy", vol. 1, Trelgol Publishing USA, 2006.
Rani, M , et al., "A systematic review of compressive sensing: Concepts, implementations and applications", , IEEE Access, vol. 6, pp. 4875-4894, 2018.
Sachs, J. , et al., "Ultra-Wideband Radar", Chapter 4, pp. 363-584, John Wiley & Sons, Ltd, 2012, pp. 363-584.
Sarwate, D V , et al., "Crosscorrelation properties of pseudorandom and related sequences", Proceedings of the IEEE, vol. 68, No. 5, pp. 593-619, May 1980.
Wagner, C , et al., "Fast linear transformations in python", arXiv preprint arXiv:1710.09578, 2017.
Zhou, T. , "Channel sounding for high-speed railway communication systems", IEEE Communications Magazine, vol. 53, No. 10, pp. 70-77, Oct. 2015.

Baransky, E. , et al., "A sub-nyquist radar prototype: Hardware and algorithms", IEEE Transactions on Aerospace and Electronic Systems, special issue on Compressed Sensing for Radar, Aug. 2012.
Candes, E. J. , et al., "Near-optimal signal recovery from random projections: Universal encoding strategies?", IEEE Trans. Inf. Theor., vol. 52, No. 12, pp. 5406-5425, Dec. 2006.
Chen, Cui , et al., "A research on anti-jamming method based on compressive sensing for OFDM analogous system", 2017 IEEE 17th International Conference on Communication Technology (ICCT), IEEE, (Oct. 27, 2017), doi:10.1109/ICCT.2017.8359718, pp. 655-659, XP033339982.
Chernyakova, T. , et al., "Exploiting fri signal structure for sub-nyquist sampling and processing in medical ultrasound", 2015 IEEE International Conference on Acoustics, Speech and Signal Processing (ICASSP), Apr. 2015, pp. 5947-5951.
Donoho, D. L. , "Compressed sensing", IEEE Transactions on Information Theory, vol. 52, No. 4, pp. 1289-1306, Apr. 2006.
Duarte, M. F. , et al., "Single-pixel imaging via compressive sampling", IEEE Signal Processing Magazine, vol. 25, No. 2, pp. 83, 2008.
Ender, J. , "On compressive sensing applied to radar", Signal Processing, vol. 90, No. 5, pp. 1402-1414, 2010.
Galajda, P. , et al., "Integrated m-sequence based transceiver for uwb sensor networks", Radioengineering, vol. 27, pp. 175-182, Apr. 2019.
Kulkarni, A. , et al., "Low overhead architectures for omp compressive sensing reconstruction algorithm", IEEE Transactions on Circuits and Systems I: Regular Papers, vol. 64, No. 6, pp. 1468-1480, Jun. 2017.
Laska, J. N. , et al., "Theory and implementation of an analog-to-information converter using random demodulation", 2007 IEEE International Symposium on Circuits and Systems, May 2007, pp. 1959-1962.
Pati, Y. C. , et al., "Orthogonal Matching Pursuit: recursive function approximation with applications to wavelet decomposition", 27th Asil. Conf. Signals, Systems Comp., Nov. 1993.
Sachs, J. , et al., "A new UWB-principle for sensor-array application", IMTC/99. Proceedings of the 16th IEEE Instrumentation and Measurement Technology Conference (Cat. No. 99CH36309), May 1999, vol. 3, pp. 1390-1395.
Semper, J. , et al., "Defect detection from 3d ultrasonic measurements using matrix-free sparse recovery algorithms", Conference Paper • Sep. 2018.
Sutter, E. E. , "The fast m-transform: a fast computation of cross-correlations with binary m-sequences", SIAM Journal on Computing, Society for Industrial and Applied Mathematics, US, (19910801), vol. 20, No. 4, doi:10.1137/0220043, ISSN 0097-5397, pp. 686-694, XP000910312.
Thiasiriphet, T. , et al., "Compressed sensing for uwb medical radar applications", 2012 IEEE International Conference on Ultra-Wideband, Sep. 2012, pp. 106-110.
Tropp, J. A. , et al., "Beyond Nyquist: Efficient sampling of sparse bandlimited signals", IEEE Transactions on Information Theory, vol. 56, No. 1, pp. 520-544, Jan. 2010, XP011286713.

* cited by examiner global block diagram

Fig. 2  detailed block diagram of measurement block (2)

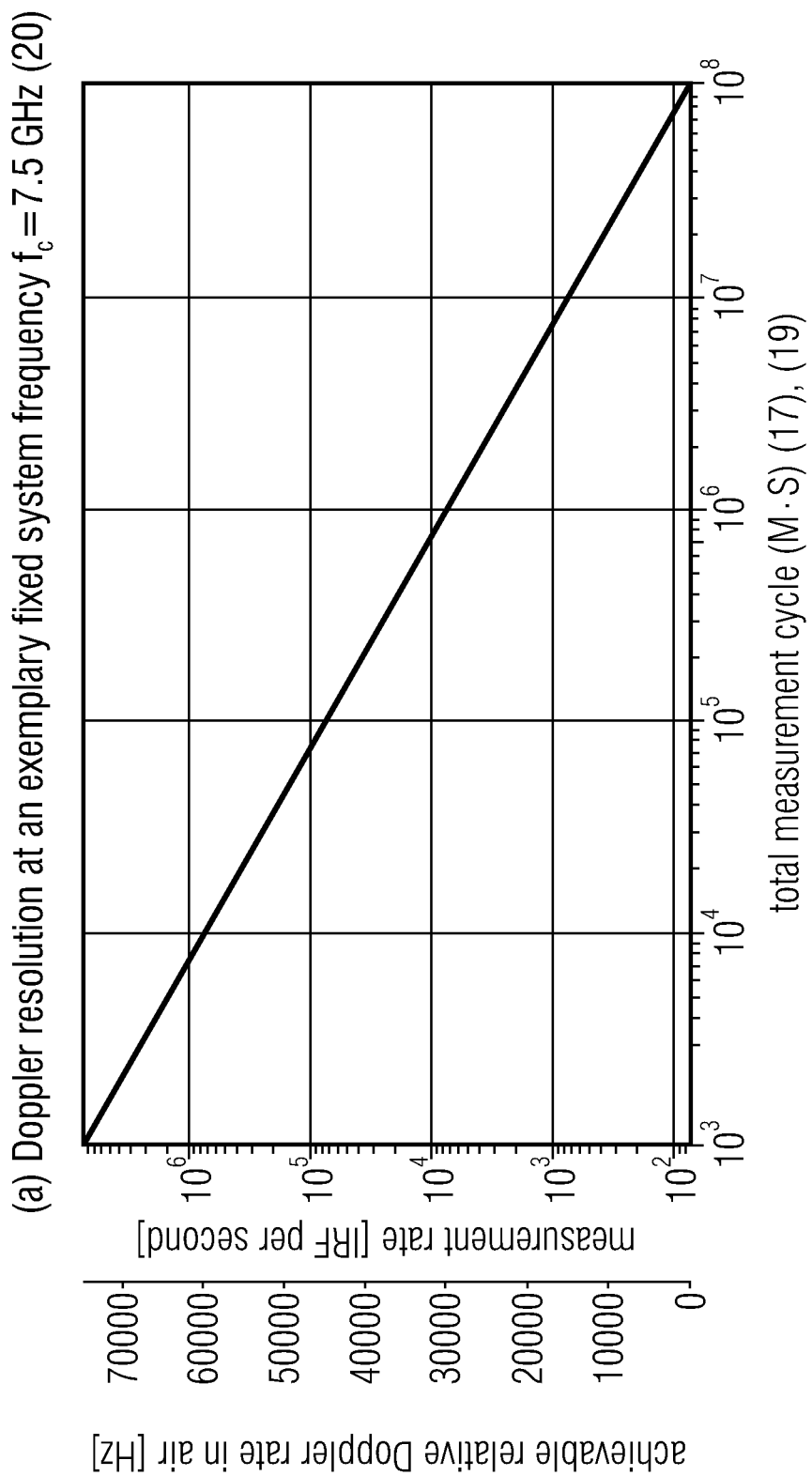
Fig. 7 (Part 1)

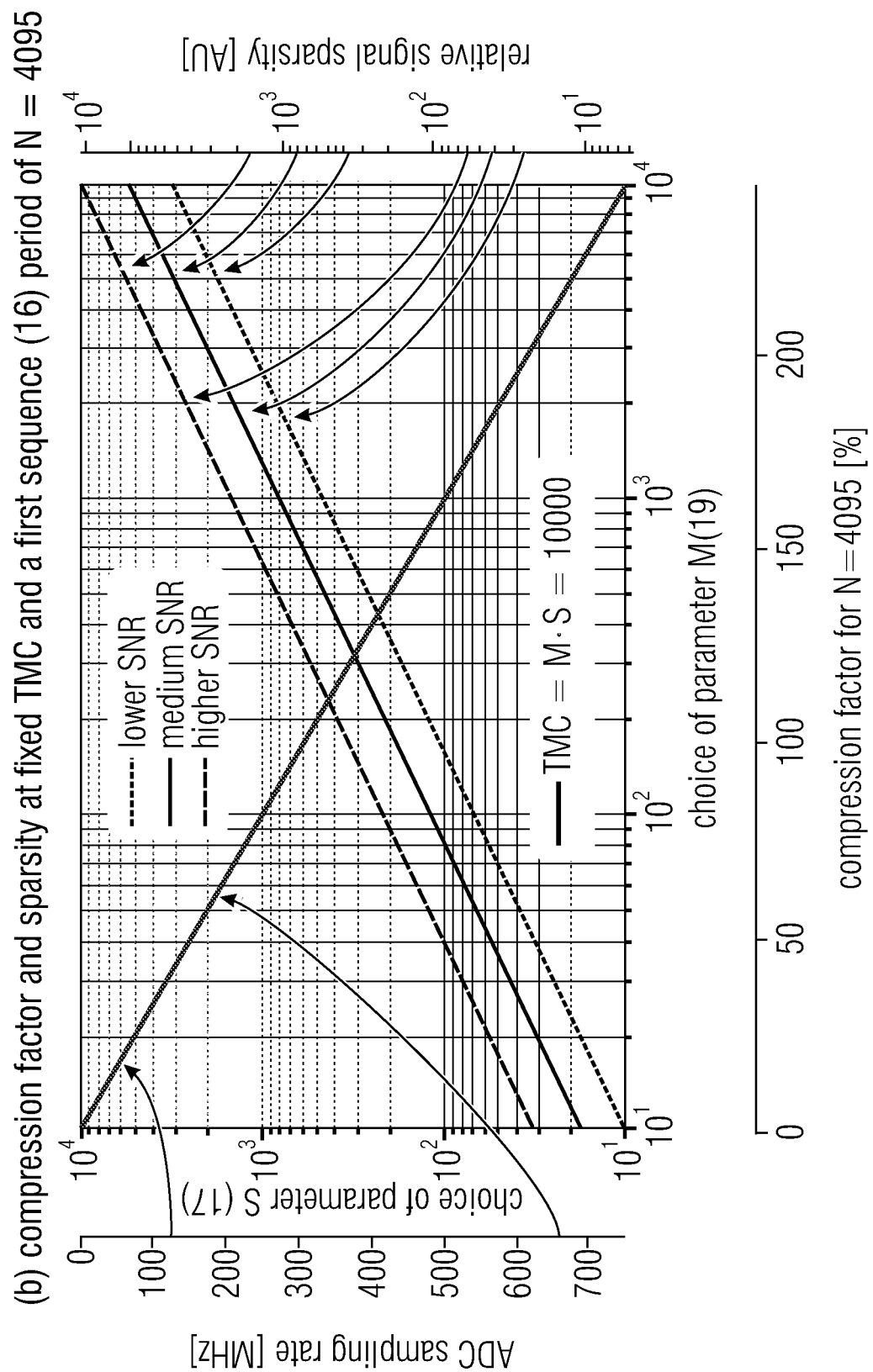
Fig. 7 (Part 2)

(Part 1)

(Part 2)

(Part 3)

(Part 4)

(Part 5)

(Part 6)

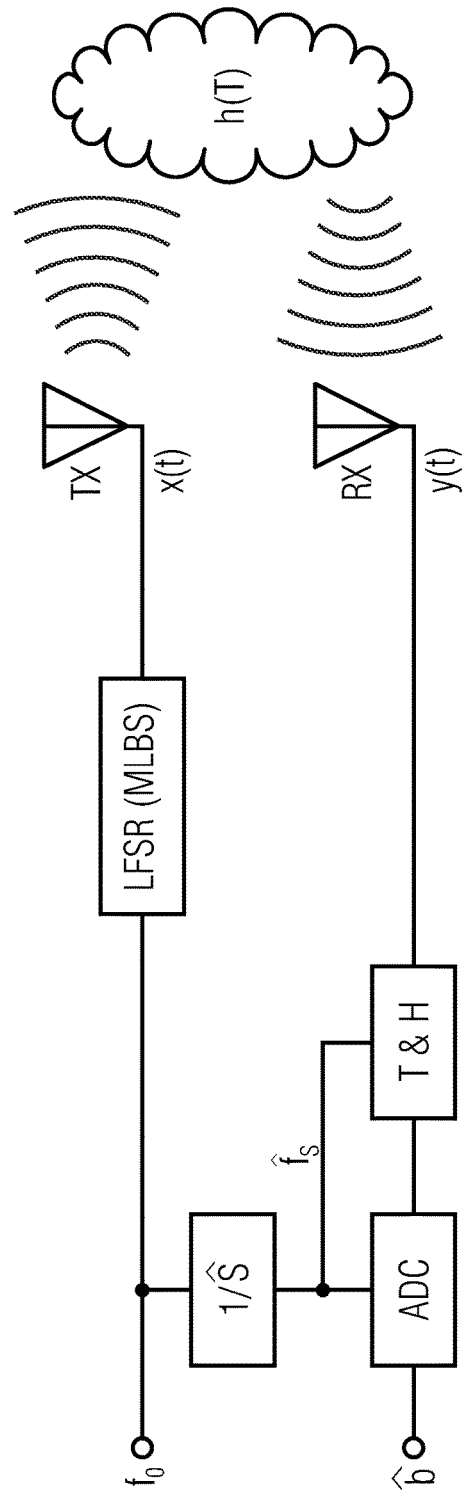
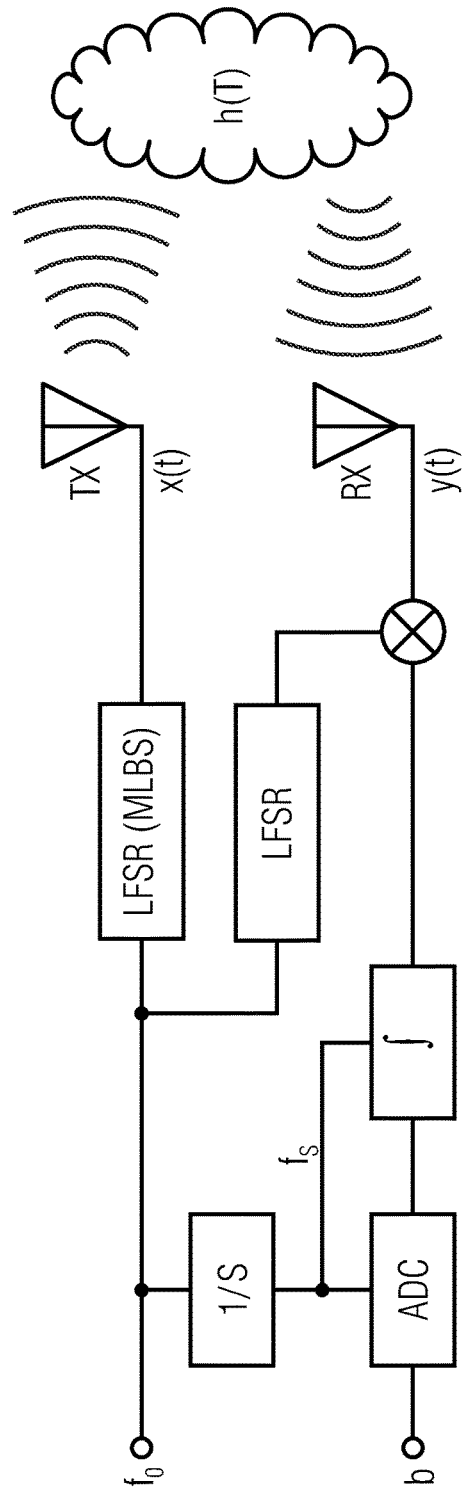
Fig. 11a
Fig. 11b

METHOD FOR THE ACQUISITION OF IMPULSE RESPONSES, E.G. FOR ULTRA-WIDEBAND SYSTEMS

CROSS-REFERENCE TO RELATED APPLICATIONS

This application is a continuation of copending International Application No. PCT/EP2020/078154, filed Oct. 7, 2020, which is incorporated herein by reference in its entirety, and additionally claims priority from European Applications Nos. EP 19201805.9, filed Oct. 7, 2019, and EP 20194213.3, filed Sep. 2, 2020, which are all incorporated herein by reference in their entirety.

I. INTRODUCTION

Present examples refer to apparatus, e.g. for estimating an impulse response of a linear system. Present examples also refer to methods, e.g. for estimating an impulse response of a linear system. Present examples also refer to non-transitory storage units storing instructions that, when executed by a processor, permit the processor to perform the steps of the method and functions of the apparatus. Further, examples refer to the acquisition of an impulse response, e.g. for ultra-wideband system.

A. Some Features of the Present Examples

The document discloses a method and architecture to determine the time-varying impulse response of a linear system in a flexible manner. Its operation can be defined as exciting a linear system with a first period signal sequence. The response of the linear system to this excitation may be effectively then the circular convolution of the excitation first sequence with the impulse response of the linear system. This convolved signal may be then observed by mixing it with a second signal sequence. The mixture signal may be integrated in the analog domain over a certain time window to produce one observation, which may then be digitized for further processing. An example includes an integrate-and-dump filter and a common analog-to-digital Converter (ADC) to implement this operation.

As will be explained in the subsequent passages, a proposed frontend processing scheme can be thought of as a generator for digital observations of linear combinations that are carried out in the analog domain. Each observation may take a different yet adjacent (i.e., without pauses) part of the analog linear system's output and combines it linearly with another similarly adjacent portion of the second sequence. As both, the first and second sequence are deterministic and generated in the frontend circuitry, it may be known which section of the linear system output was linearly combined in what way to form the digital observations made.

In a possible example, the first sequence may be chosen as Rademacher exhibiting a low crest-factor (e.g. close to 1), e.g. defined as the ratio of the peak amplitude to its RMS value over one period (other types of sequences are notwithstanding possible). A practical choice for such sequences may be a maximum length binary sequence (MLBS), which may be generated efficiently by simple shift registers with a feedback loop. This permits to achieve that each small time-domain section of the analog linear system's output contains a linear combination of the full linear systems' impulse response. This directly makes clear that each digital observation contains information about the full channel impulse response as well as it is made up of a linear combination of those dictionary entries. This is in particular true for the case that the observation time window leading to one digital observation is shorter than the first sequences' period, which directly corresponds to the duration of the linear systems' impulse response.

From the observations it is possible to retrieve the system impulse response by one of the many available methods for sparse recovery as the measurement kernel is known and linear.

Advantages over prior-art methods are as follows:
Examples reduce the observation rate drastically compared to sampling the signal at full Nyquist rate.
Examples allow to change the operating parameters (e.g., the length and the spectral properties of the used sequences, the integration time, etc.). One can dynamically choose the desired trade-off between measurement rate (i.e. number of impulse responses/second) vs. signal-to-noise ratio (SNR) vs. sparsity of the signal (i.e., impulse response).
Operating parameters may be changed without any modification to the hardware and in response to e.g. previous measurements of the system, in an adaptive way.
A proposed architecture may be implemented in very cost-efficient hardware, allowing for unprecedented performance (i.e., in terms of accuracy, speed and stability) at a low cost.

B. Application Background

Devices which measure the impulse response of a linear system are used in many applications (e.g., high level applications), such as
Telemetric systems
RADAR applications
non-destructive testing
detection and tracking of moving objects
radio frequency, RF, electronic measurements
search and rescue C. Conventional Technology Peyerl et. al. introduced a method for measuring linear system impulse responses in which the working principle is the excitation of a linear system with a periodic and dense sequence [1], [2], [3]. Observations are taken fulfilling the Nyquist criterion and at most the hardware requirements can be reduced by applying subsampling at the cost of the measurement rate (i.e., number of impulse response function (I RF)s per second) at equivalent SNR. Compared to the proposed examples, the method from Peyerl et. al. is inferior in that it does not introduce any compression not exploiting observable signal as its energy is simply not used in the subsampling step. The receive branch of the proposed architecture bears some similarities with [4], [5] that discloses an architecture where the receive signal is mixed with a sequence and then integrated and sampled at a lower rate. However, [4], [5] does not consider a first transmit sequence that is synchronous with the second receive sequence. As this is a key enabler for the reconstruction stage, it provides a significant novel and inventive step. Furthermore, the proposed architecture allows for adaptability without any notification to the hardware.

D. In Respect to Conventional Technology, Some Elements of at Least Some of the Present Examples May Encompass:

Adaptability of the system architecture offering on-the-fly adjustment of measurement parameters which allows live-tuning to the scenario at hand A trade-off between measurement rate (and thus Doppler sensitivity), signal-to-noise-ratio and signal diversity (sparsity) of the signal is explicitly offered and can be decided as a parameter A use of integrated high-speed digital logic circuits and architectural reuse of the sequence generators allows for an inexpensive implementation without sacrificing circuit performance.

II. DETAILED PRESENTATION OF THE EXAMPLES

SUMMARY

An embodiment may have an apparatus for estimating an impulse response of a linear system,
  wherein the apparatus includes a measurement block configured to generate a transmit signal on the basis of a first sequence and to send the transmit signal onto the linear system,
  wherein the measurement block is configured to obtain a receive signal as a feedback from the linear system and to multiply the receive signal with a second sequence, to obtain a modified receive signal, wherein the second sequence is different from the first sequence,
  wherein the measurement block is configured to analog-to-digital convert, ADC, an integration result in order to obtain a sample value, the integration result being based on an integration of the modified receive signal over a period of time, and
  wherein the apparatus is configured to obtain an estimate of the impulse response on the basis of a plurality of sample values,
  wherein the first sequence and the second sequence are synchronized with each other and/or are generated from a common system clock signal and/or are synchronized with a common system clock signal,
  wherein the measurement block is configured to perform a clock division by dividing the common system clock signal by a first divider factor parameter to obtain a sampling clock signal to control the ADC conversion and/or to define the period of time of the integration of the modified receive signal,
  wherein the first sequence is associated with a first linear signal model, and the second sequence is associated with a second linear model, so as to obtain the estimate of the impulse response on the basis of a relationship between the plurality of sample values, the first linear signal model, and the second linear model,
  wherein the first linear model is described by a first sparse representation operator and the second linear model is described by a second sparse representation operator,
  wherein the first sparse representation operator is obtained through a factorization which involves at least one Hadamard matrix or Hadamard transform.

According to another embodiment, a method for measuring the impulse response of a linear system may have the steps of:
  generating a transmit signal on the basis of a first sequence, and sending the transmit signal onto the linear system;
  obtaining a receive signal as a feedback from the linear system;
  mixing the receive signal with another signal based on a second sequence;
  analog-to-digitally, ADC, convert an integrated version of the mixed signal;
  estimating the impulse response on the basis of a plurality of digital obtained signals,
  wherein the first sequence and the second sequence are synchronized with each other and/or are generated from a common system clock signal and/or are synchronized with a common system clock signal,
  wherein the method performs a clock division by dividing the common system clock signal by a first divider factor parameter to obtain a sampling clock signal to control the ADC conversion and/or to define the period of time of the integration of the modified receive signal,
  wherein the first sequence is associated with a first linear signal model, and the second sequence is associated with a second linear model, so as to obtain the estimate of the impulse response on the basis of a relationship between the plurality of sample values, the first linear signal model, and the second linear model,
  wherein the first linear model is described by a first sparse representation operator and the second linear model is described by a second sparse representation operator,
  wherein the first sparse representation operators is obtained through a factorization which involves at least one Hadamard matrix or Hadamard transform.

Another embodiment may have a non-transitory storage unit storing instruction which, when executed by a processor, cause the processor to:
  generate a transmit signal on the basis of a first sequence,
  obtain a receive signal and to multiply the receive signal with a second sequence, to obtain a modified receive signal, wherein the second sequence is different from the first sequence;
  analog-to-digital, ADC, convert an integration result in order to obtain a sample value, the integration result being based on an integration of the modified receive signal over a period of time; and
  obtain an estimate of the linear system impulse response on the basis of a plurality of sample values,
  wherein the first sequence and the second sequence are synchronized with each other and/or are generated from a common system clock signal and/or are synchronized with a common system clock signal,
  wherein a clock division is performed by dividing the common system clock signal by a first divider factor parameter to obtain a sampling clock signal to control the ADC conversion and/or to define the period of time of the integration of the modified receive signal,
  wherein the first sequence is associated with a first linear signal model, and the second sequence is associated with a second linear model, so as to obtain the estimate of the impulse response on the basis of a relationship between the plurality of sample values, the first linear signal model, and the second linear model,
  wherein the first linear model is described by a first sparse representation operator and the second linear model is described by a second sparse representation operator,
  wherein the first sparse representation operator is obtained through a factorization which involves at least one Hadamard matrix or Hadamard transform.

In examples, there is provided an apparatus for estimating an impulse response of a linear system,
  wherein the apparatus is configured to generate a transmit signal on the basis of a first sequence,
  wherein the apparatus is configured to obtain a receive signal and to multiply the receive signal with a second sequence, to obtain a modified receive signal, wherein the second sequence is different from the first sequence,
  wherein the apparatus is configured to analog-to-digital, ADC, convert an integration result in order to obtain a sample value, the integration result being based on an integration of the modified receive signal over a period of time, and wherein the apparatus is configured to obtain an estimate of the impulse response on the basis of a plurality of sample values.

Accordingly, it has been observed that the sampling rate of the ADC may be reduced as compared to the bandwidth of the linear system.

The first sequence and the second sequence may be generated from a common system clock signal and/or are synchronized, e.g. with a common system clock signal).

The apparatus may perform a clock division by dividing the common system clock signal by a first divider factor parameter to obtain a sampling clock signal to control the ADC conversion and/or to define the period of time of the integration of the modified receive signal.

The apparatus may perform a clock division by dividing the common system clock signal, or a clock signal derived from the common system clock signal, by a second divider factor parameter, or a multiple of the second divider factor parameter, so as to obtain a frame clock signal to control the processing of the estimation of the impulse response and/or reset the generation of the second sequence.

The first sequence may be generated based on at least one first sequence definition parameter and/or the second sequence may be generated based on at least one second sequence definition parameter.

The apparatus may comprise an automated logic configured to select at least one of the following parameters:
the first divider factor parameter;
the second divider factor parameter;
the first sequence definition parameter; and
the second sequence definition parameter.

The automated logic may be configured to adaptively define at least one of the parameters based on at least one of a previous estimate, a priori knowledge about the linear system and linear system state information as obtained from other sources.

The automated logic may be configured to define the at least one of the parameters on the basis of a Doppler resolution, ambiguity range, number of non-zero components in the system's impulse response.

The apparatus may measure a distance of an object, wherein the receive signal is, or is associated with, the reflected version of the transmit signal,
wherein the apparatus is configured to measure a distance of the object on the basis of the estimate of the impulse response.

The first sequence may be associated with a first linear signal model, and the second sequence may be associated with a second linear model, so as to obtain the estimate of the impulse response on the basis of a relationship between the plurality of sample values, the first linear signal model, and the second linear model.

At least one of the first and second linear models may be a circulant linear model.

The first and second linear models may be described by a first and a second matrixes, wherein the product of the first and second matrixes form a linear behavioural model matrix, whose columns are such that any subset of up to K columns is linearly independent, wherein K is a number of unknown values of the impulse response to be determined.

The may obtain the estimate the impulse response of the linear system based on knowledge of the behavioural model matrix, by minimizing a sparsity-promoting function that maps its argument to a scalar number which represents the degree of sparsity, under the condition that a product of the linear behavioural model matrix and the reconstructed impulse response vector approximates or equals a sample vector defined by the plurality of samples.

In examples, there is provided a method for measuring the impulse response of a linear system comprising:
generating a transmit signal on the basis of a first sequence;
obtaining a receive signal;
mixing the receive signal with another signal based on a second sequence;
analog-to-digitally, ADC, convert the mixed signal, or an integrated version thereof;
estimating the impulse response on the basis of a plurality of digital obtained signals.

In examples, there is provided a non-transitory storage unit storing instruction which, when executed by a processor, cause the processor to:
generate a transmit signal on the basis of a first sequence,
obtain a receive signal and to multiply the receive signal with a second sequence, to obtain a modified receive signal, wherein the second sequence is different from the first sequence;
analog-to-digital, ADC, convert an integration result in order to obtain a sample value, the integration result being based on an integration of the modified receive signal over a period of time; and
obtain an estimate of the linear system impulse response on the basis of a plurality of sample values.

In accordance with embodiments, there is disclosed an apparatus for estimating an impulse response of a linear system, wherein the apparatus is configured to generate a transmit signal on the basis of a first sequence, wherein the apparatus is configured to obtain a receive signal and to multiply the receive signal with a second sequence, to obtain a modified receive signal, wherein the second sequence is different from the first sequence, wherein the apparatus is configured to analog-to-digital convert, ADC 11, an integration result in order to obtain a sample value, the integration result being based on an integration of the modified receive signal over a period of time, and wherein the apparatus is configured to obtain an estimate of the impulse response on the basis of a plurality of sample values.

According to an embodiment, the first sequence and the second sequence are synchronized with each other and/or are generated from a common system clock signal and/or are synchronized with a common system clock signal.

According to an embodiment, the apparatus is configured to perform a clock division by dividing the common system clock signal by a first divider factor parameter to obtain a sampling clock signal to control the ADC conversion and/or to define the period of time of the integration of the modified receive signal.

According to an embodiment, the apparatus is configured to perform a clock division by dividing the common system clock signal, or a clock signal derived from the common system clock signal, by a second divider factor parameter, or a multiple of the second divider factor parameter, so as to obtain a frame clock signal to control the processing of the estimation of the impulse response and/or reset the generation of the second sequence.

According to an embodiment, the first sequence is generated based on at least one first sequence definition parameter and/or the second sequence is generated based on at least one second sequence definition parameter.

According to an embodiment, the apparatus is comprises an automated logic configured to select at least one of the following parameters: the first divider factor parameter; the second divider factor parameter; the first sequence definition parameter; and the second sequence definition parameter.

According to an embodiment, the automated logic is configured to adaptively define at least one of the parameters based on at least one of a previous estimate, a priori knowledge about the linear system and linear system state information as obtained from other sources.

According to an embodiment, the automated logic is configured to define the at least one of the parameters on the basis of a Doppler resolution, ambiguity range, number of nonzero components in the system's impulse response.

According to an embodiment, the apparatus is configured to measure a distance of an object, wherein the receive signal is, or is associated with, the reflected version of the transmit signal, wherein the apparatus is configured to measure a distance of the object on the basis of the estimate of the impulse response.

According to an embodiment, the apparatus is configured to measure transmission properties in an electromagnetic medium, wherein the receive signal is, or is associated with, a modified (e.g. by the electromagnetic medium that is subject to the transmission) version of the transmit signal, and/or wherein the apparatus is configured to measure the transmission properties on the basis of the estimate of the impulse response.

According to an embodiment, the apparatus is configured to measure reflection properties in an electromagnetic medium, wherein the receive signal is, or is associated with, a reflected (e.g. by the electromagnetic medium that is subject to the transmission) version of the transmit signal, and/or Wherein the apparatus is configured to measure the reflection properties on the basis of the estimate of the impulse response, and/or whereas the apparatus is connected to the electromagnetic medium by means of a directional coupler, and/or which is configured to couple the electromagnetic waves originating in the transmit signal of the apparatus into the electromagnetic medium, causing a propagation of the transmit signal into the electromagnetic medium, and/or which is also configured to couple the electromagnetic waves from reflections of the transmit signal, that have occurred within the electromagnetic mediums, and that are propagating in the direction of the apparatus, into the receive signal of the apparatus, and/or wherein the apparatus is configured to measure the reflection properties on the basis of the estimate of the impulse response.

According to an embodiment, the electromagnetic medium is a cable or transmission line or a combined network of either.

According to an embodiment, the linear system is associated with a cable or transmission line or a combined network of them.

According to an embodiment, the first sequence is associated with a first linear signal model, and the second sequence is associated with a second linear model, so as to obtain the estimate of the impulse response on the basis of a relationship between the plurality of sample values, the first linear signal model, and the second linear model.

According to an embodiment, at least one of the first and second linear models is a circulant linear model.

According to an embodiment, the first linear model is described by a first sparse representation operator and/or the second linear model is described by second sparse representation operator.

According to an embodiment, at least one of the first and second sparse representation operators is obtained through a factorization which involves at least one Hadamard matrix [e.g. a Hadamard matrix having only +1s and −1s as values, which may be multiplied by a constant value for all the entries of the Hadamard matrix] or Hadamard transform [the Hadamard transform giving information on the Hadamard matrix].

According to an embodiment, the calculation of at least one of the first and second sparse representation operators involves a factorization [e.g. P1·H·P2] of at least one Hadamard transform or Hadamard matrix and at least one sparse permutation matrix [e.g. P1, P2, or more, the sparse permutation matrix having more 0s than values different form 0, which are all equal to 1s; the sparse permutation matrix may be a square or rectangular matrix].

According to an embodiment, at least one of the first and second sparse representation operators, or one term of their factorization, is an m-transform or contains at least one term which is an m-transform.

According to an embodiment, the apparatus is configured to obtain the estimate of the impulse response of the linear system based on knowledge of the behavioural model [e.g. a matrix or at least one of the first and second sparse representation operators] based on the first and second linear models [e.g. based on the sparse representation operators based on the sparse representations of at least one of the first and second linear models], by minimizing a sparsity-promoting function that maps its argument to a scalar number which represents the degree of sparsity, under the condition that: the application of the linear behavioral model to the reconstructed impulse response vector approximates or equals a sample vector defined by the plurality of samples; and/or the application of the linear behavioral model to a sample vector defined by the plurality of samples approximates or equals the reconstructed impulse response vector.

[Basically, the first and second sparse representation operators can be used either in a forward direction, like in formula, or in a backward direction, e.g. by $(\phi \cdot D)^{H} \cdot b = \hat{h}$, where "H" refers to the reciprocal conjugate and "·" to the matrix multiplication]

According to an embodiment, the behavioural model [e.g. A] is obtained from the first and second linear models through one of Orthogonal Matching Pursuit (OMP), Iterative Shrinking-Thresholding Algorithm (ISTA), Fast Iterative Shrinking-Threshold Algorithm (FISTA).

According to an embodiment, at least one of the first and second linear models is described by a first and a second matrixes, wherein the product of the first and second matrixes form a linear behavioural model matrix, whose columns are such that any subset of up to K columns is linearly independent, wherein K is a number of unknown values of the impulse response to be determined (which is bounded to the sparsity).

According to an embodiment, the apparatus is configured to obtain the estimate of the impulse response of the linear system based on knowledge of the behavioural model matrix, by minimizing a sparsity-promoting function that maps its argument to a scalar number which represents the degree of sparsity, under the condition that a product of the linear behavioural model matrix and the reconstructed impulse response vector approximates or equals a sample vector defined by the plurality of samples.

According to an embodiment, the apparatus is configured to generate at least one among the first sequence and the second sequence through a feedback signal register [e.g., LFSR, AFSR, DSFR]. [e.g. it may be in series to an optional amplifier]

According to an embodiment, the apparatus is configured to generate the first sequence based on an M-sequence [maximum-length sequence].

In accordance with embodiments there is disclosed a method for measuring the impulse response of a linear system comprising: generating a transmit signal (e.g., 23) on the basis of a first sequence; obtaining a receive signal; mixing the receive signal with another signal based on a second sequence; analog-to-digitally, ADC, convert the mixed signal, or an integrated version thereof; estimating the impulse response on the basis of a plurality of digital obtained signals.

In accordance with embodiments there is disclosed a non-transitory storage unit storing instruction which, when executed by a processor, cause the processor to: generate a transmit signal on the basis of a first sequence, obtain a receive signal and to multiply the receive signal with a second sequence, to obtain a modified receive signal, wherein the second sequence is different from the first sequence; analog-to-digital, ADC, convert an integration result in order to obtain a sample value, the integration result being based on an integration of the modified receive signal over a period of time; and obtain an estimate of the linear system impulse response on the basis of a plurality of sample values.

BRIEF DESCRIPTION OF THE DRAWINGS

Embodiments of the present invention will be detailed subsequently referring to the appended drawings, in which:

FIG. 7 shows examples of relationships between parameters.

FIG. 11a shows an implementation according to conventional technology.

FIG. 11b shows an implementation according to the present technique.

DETAILED DESCRIPTION OF THE INVENTION

Figure 1:
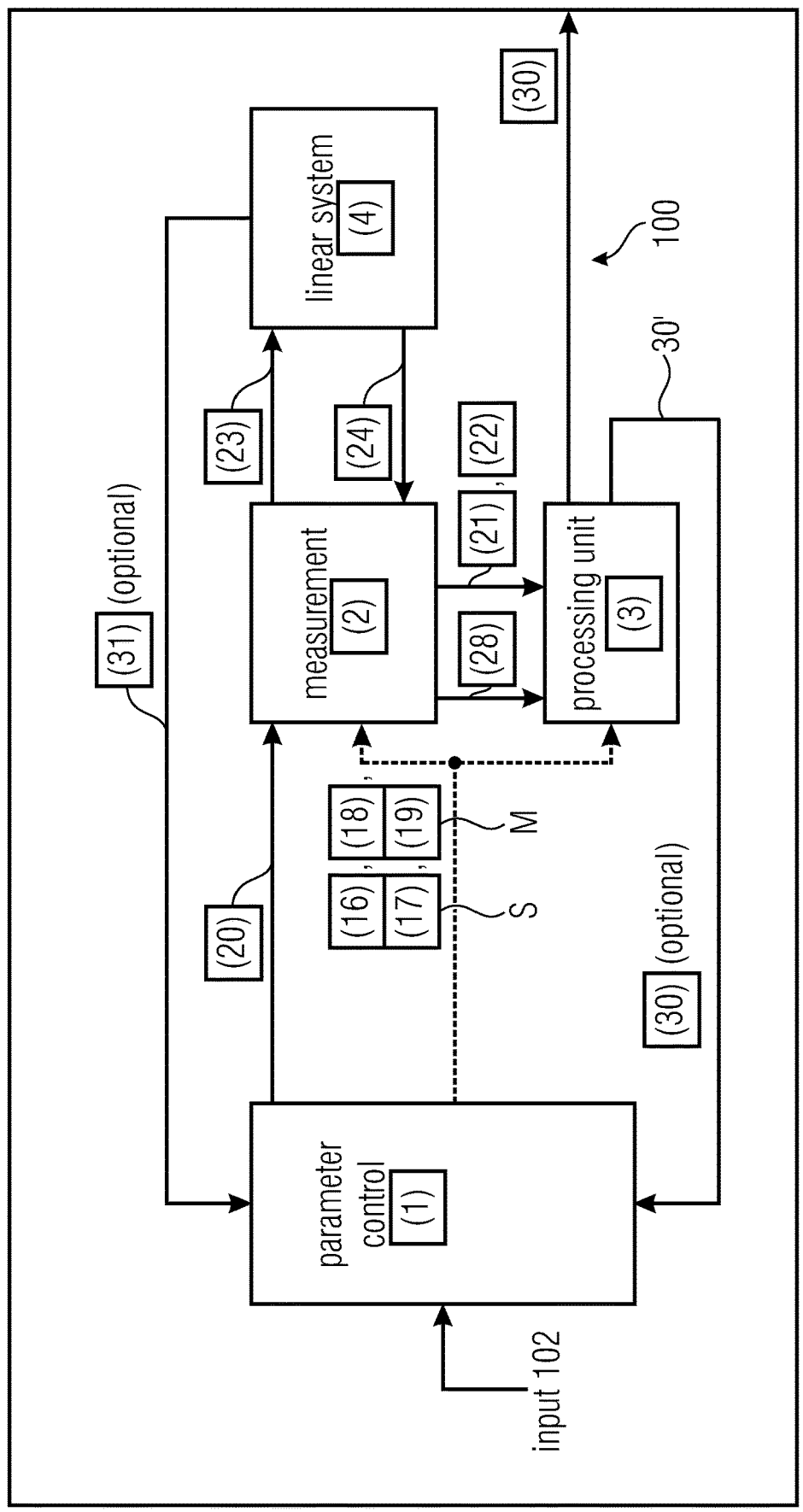
FIG. 1 shows an apparatus according to an example.
Figure 2:
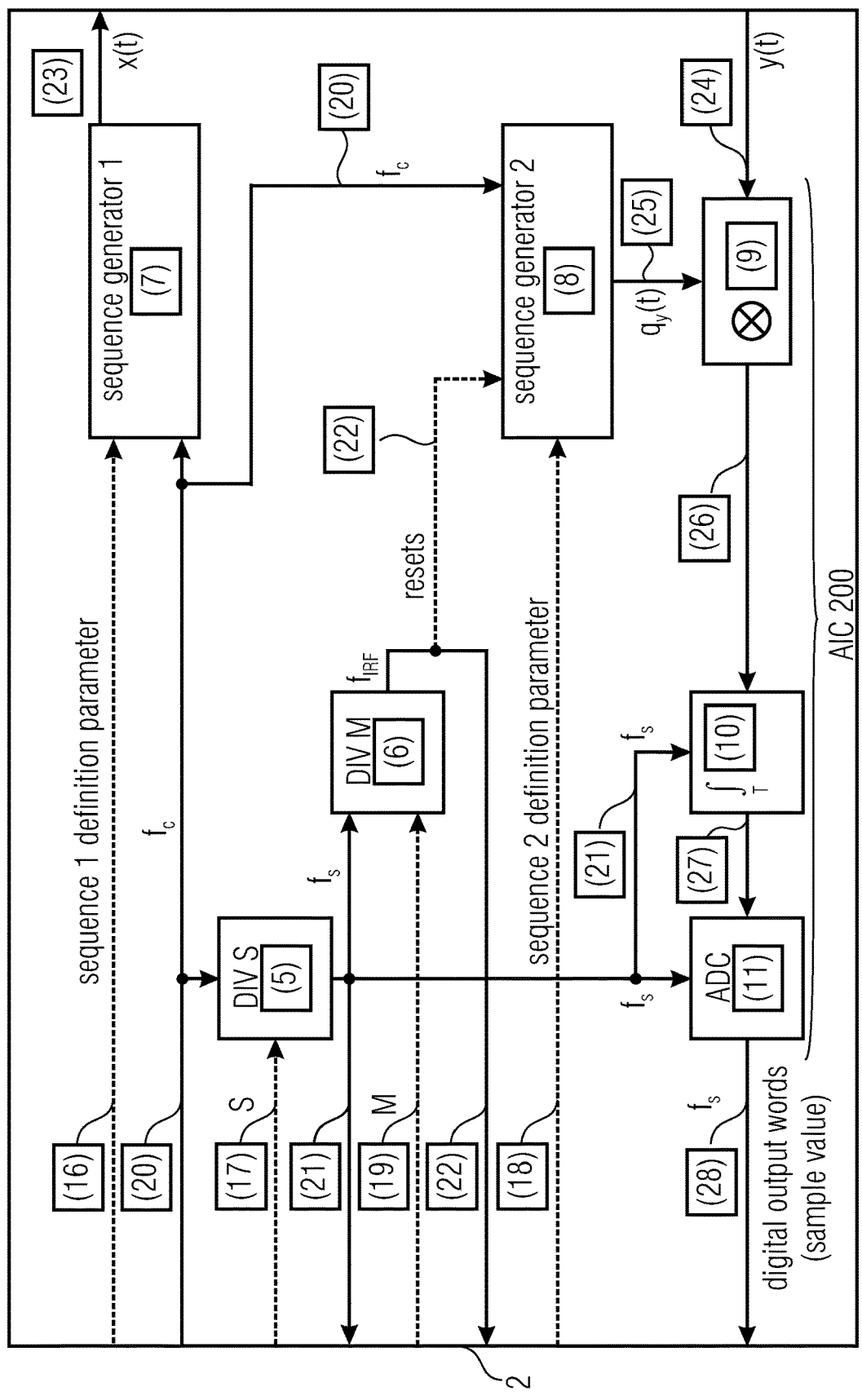
FIG. 2 shows a measurement block according to an example and which may be a part of the apparatus of FIG. 1.
Figure 3:
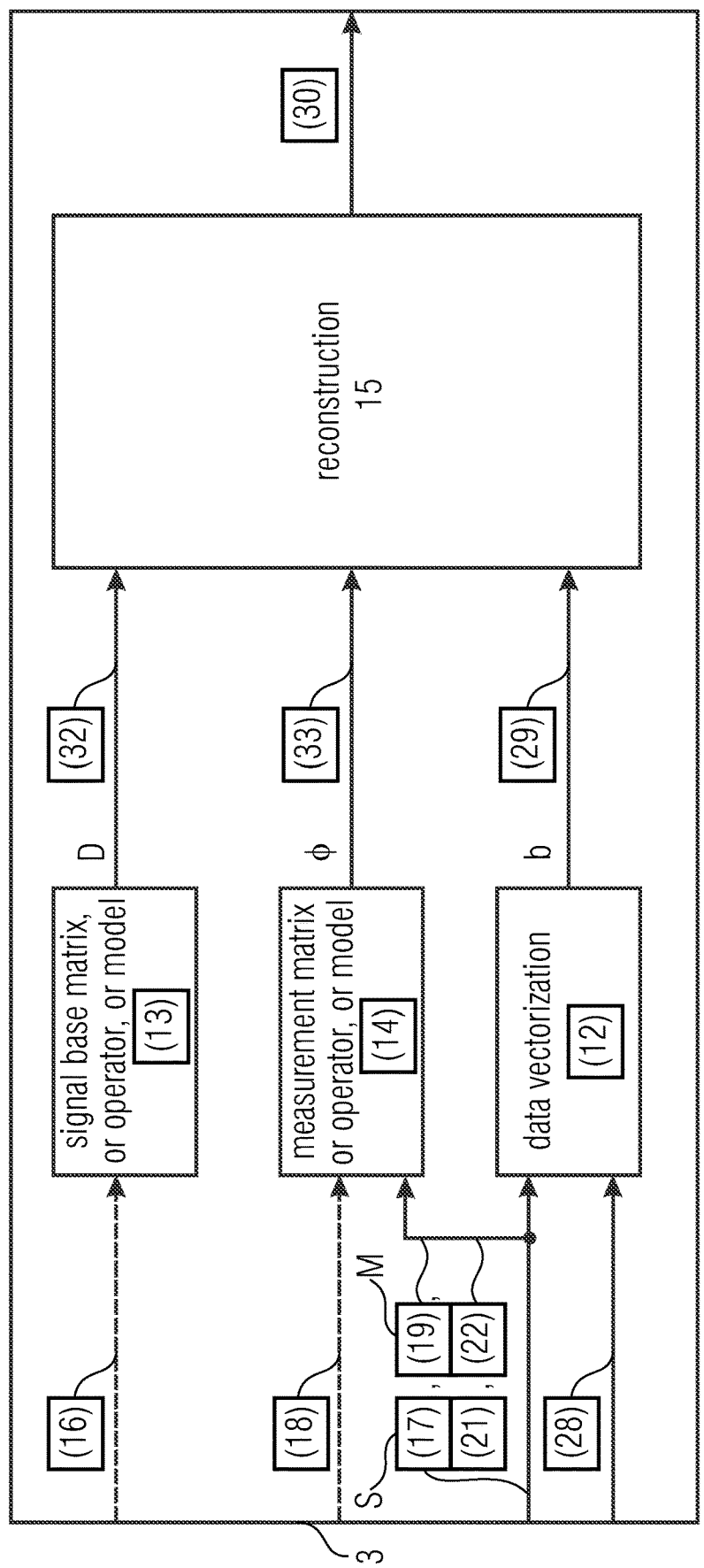
FIG. 3 shows a processing unit block according to an example and which may be a part of the apparatus of FIG. 1.

FIGS. 1-3 relate to possible implementations of an apparatus 100 according to examples. The blocks of FIGS. 1-3 may also be understood in some cases, as steps of methods (however, most of the features are expressed in terms of functional/structural features of the apparatus 100, even though it remains understood that also a method may be used for achieving the purpose of the apparatus 100). The following block may also be understood as blocks of code stored in a non-transitory storage unit. When the code is executed by a processor, a processor may perform the operations of the apparatus 100 and/or perform the steps of the method.

The apparatus 100 may include at least one receiving and/or transmitting antenna.

The apparatus 100 may be understood as being intended for measuring a physical property of a system 4 (the system 4 may be a linear system, such as a cable, a transmission line, a region in space . . . ). The property may be, for example, the impulse response (which may be associated with the state of the channel). Here, reference is mostly made to radio frequency (RF) electromagnetic waves. In general terms, this system is intended for measuring properties associated with RF waves (e.g., for measuring distances, e.g., using a radar) and/or for measuring noise, etc. Ultra-wideband applications may be supported. In alternative examples, ultrasound signals may be used (e.g., for the purpose of measuring distances or for measuring the ultrasound channel) instead of RF signals. Hereinbelow, reference is mostly made to RF for brevity, even though it is possible to generalize the concepts to other kinds of linear systems. In some cases, the linear system 4 is part of the apparatus 100. In some cases, the linear system 4 is not part of the apparatus 100.

In a telemetric application (e.g. radar application), the linear system 4 may be understood as being associated with the path of a transmitted signal, which is reflected by an object, and the reflected signal is received by the apparatus 100. Accordingly, it is possible to estimate the distance of the object.

The apparatus 100 may include an input 102 through which a user (e.g., a human user or an automatic user, such as a high-level application or control) may command parameters.

The apparatus 100 may provide an output 30 (e.g. estimate) which may be information on the impulse response 30 as measured. The output 30 may be provided to high level applications (e.g., a radar application) and/or displayed on a display. The output 30 may be used for providing information about the noise in the channel and/or for measuring the state of the channel (e.g., for a mobile phone communication).

The apparatus 100 may be or include or be part of an automated logic. The automatic logic may be configured to adaptively define at least one parameter on the basis of a previous estimate (e.g., output 30), and/or on the basis of a priori knowledge about the linear system 4, and/or on the basis of channel state information (e.g. input 31) as obtained from other sources.

The apparatus 100 may comprise at least one of a parameter control block 1, a measurement block 2, and a processing unit 3.

The parameter control block 1 may be the element which receives the input 102. The parameter control block 1 may be adaptively based on the optional input 31 which may be channel state information, i.e., obtained in other ways (e.g., by other systems or units measuring the channel state information). In some cases, the parameter control block 1 may obtain feedback 30 (through feedback line 30') from the processing unit block 3 (the feedback 30 may be a previously estimated impulse response). This may be in case the automated logic (which may be the same parameter control block 1 or another block connected to the parameter control block 1) performs a feedback-based operation (e.g., a radar application).

As can be seen from FIG. 1, at least one parameter (e.g., 16, 17, 18, 19) may be provided to the measurement block 2 and/or to the processing unit 3. The at least one parameter may be at least partially conditioned by the input 30, 31 or 102 and/or may be defined by the parameter control block 1.

The measurement block 2 may be a unit which prepares and/or sends a transmit signal 23 onto the linear system 4 and receives a receive signal 24 as feedback from the linear system 4.

The transmit signal 23 (also indicated mathematically as x(t) or, with discrete notation, x[n]) may be generated by a "sequence generator 1 block" 7. (See also formulas (24) and (25) below.) The signal 23 or x(t) may be a periodic function and may have a period $T_X$. The period $T_X$ may be a multiple of a chip period $T_C$ (which may be the period of a common system clock signal 20) with chip rate $f_C=1/T_C$. ($f_C$ is here also referred to as system clock rate, as other frequencies which are here discussed may be obtained, in some examples, by dividing $f_C$.) The transmit signal 23 may be based on (e.g., may be or may be generated by) a first sequence of (e.g., rectangular) chips. Non-return-to-0, NRZ,-pulses, may be used. The chip length $T_C$ may be understood as being provided by the system clock signal 20 (which may be provided by the parameter control block 1). Accordingly, the chip rate $f_C$ may be provided to the sequence generator 1 block 7. As shown in FIG. 2, a parameter 16 (here also indicated as "sequence 1 definition parameter"), may be provided by the parameter control block 1. The sequence 1 definition parameter 16 may define the properties of the first sequence (or "sequence 1") from which the transmit signal 23 (or x(t)) is generated. The transmit signal 23 may therefore be defined to be according to the definitions of formulas (24) and (25) (other definitions are notwithstanding possible). The first sequence (sequence 1) may be deterministic. The first sequence may be a Rademacher sequence, in some examples.

Figure 4:
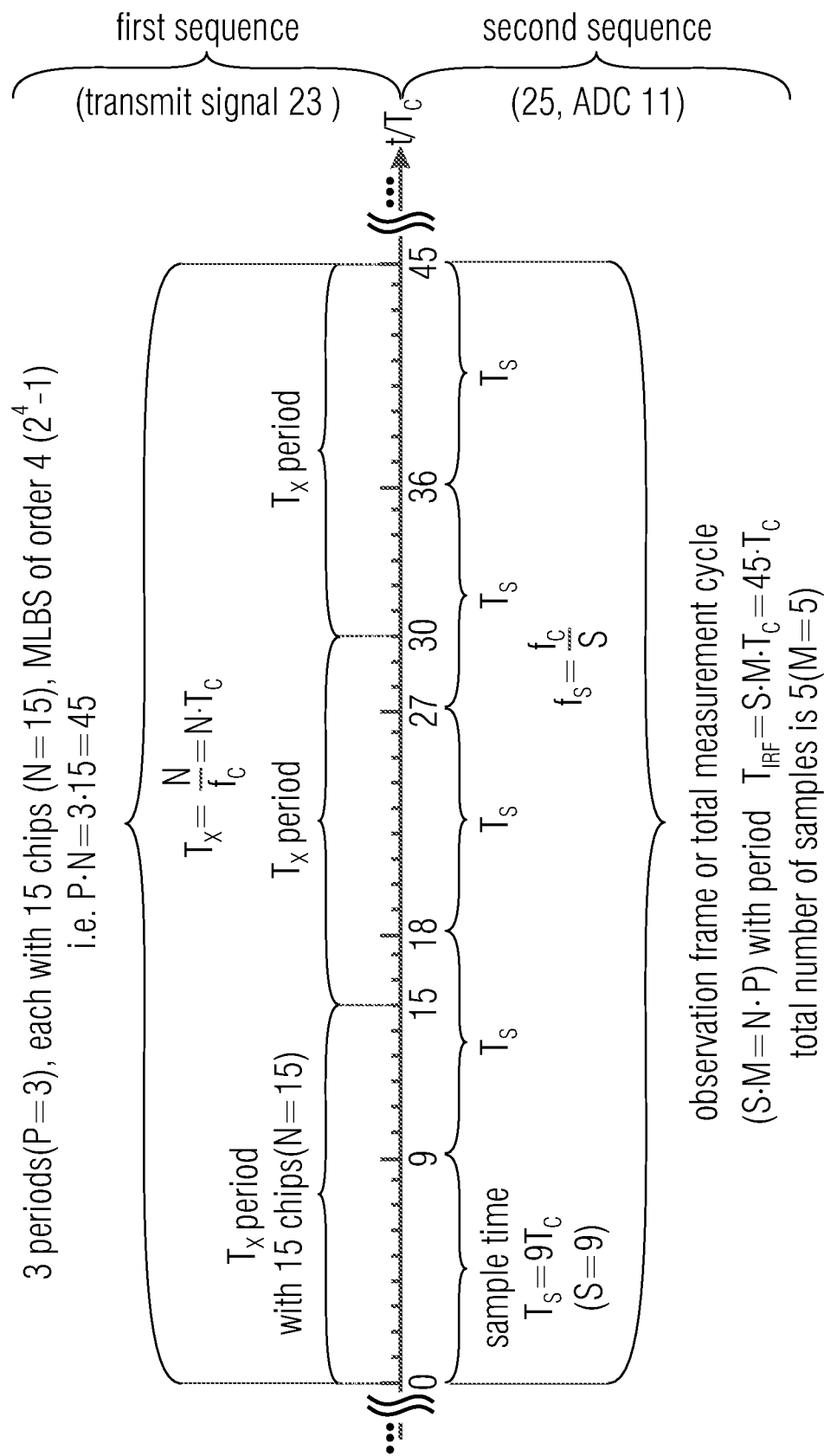
FIG. 4 shows an example of timing relationships.

As can be seen in FIG. 4, the period $T_X$ of the transmit signal 23 according to the first sequence may include an integer number of chips (in this case 15) and is therefore a multiple of the chip period $T_C$. The transmit signal x(t) (23) may be periodical, an may be repeated in the subsequent periods $T_X$. The transmit signal x(t) may be univocally defined by the first sequence.

The receive signal 24 (mathematically indicated with y(t)) may be received by the apparatus 100 (e.g., through a receiving antenna) as a feedback from the linear system 4, e.g. to estimate the impulse response of the linear system 4. In radar, telemetric applications, the receive signal 24 may be a version of the signal reflected by the object whose distance is to be measured. In general terms, the receive signal 24 may be an analog signal, which is to be digitalized by an analog-to-digital, ADC, 11 converter. Should the ADC 11 try to obtain a digital copy of the receive signal 24, the sample rate of the ADC 11 should be at least twice as much of the chip rate $f_C$.

However, at least with the present examples, the sample rate $f_S$ controlling the ADC can be sensibly smaller than the chip rate $f_C$.

According to examples, an analog-to-information converter (AIC) 200 has been defined which provides a plurality of digital output words 28 from the receive signal 24 (or an analogically processed version 27 of the receive signal 24). Each of the digital output words 28 may be output by the AIC 200 at a frequency $f_S$ (sample rate of the ADC 11) which is less than the chip rate $f_C$ (here, $$f_s = \frac{f_c}{S}$$

with S>1). It will be shown that a plurality of digital words (e.g., vector, sample vector, measurement data vector, etc.) may provide a complete information on the impulse response, which may be subsequently processed to estimate the impulse response. Hence, the AIC 200 may be understood as providing information on the impulse response from the analog input signal (or an analogically processed version thereof).

The AIC 200 may include at least one of a mixer block 9 (e.g. analog mixer), an integrator 10 (e.g. an analog integrator), and an ADC 11.

The mixer block 9 may multiply (e.g., scale) the receive signal 24 by a second sequence 25 (mathematically indicated with $q_y(t)$). The mixed signal 26 (mathematically indicated with $y_m(t)$ and an example of which is in formula (16) below) may be provided to an integrator block 10.

The integrator block 10 may be an analog integrator. An integration result 27 (mathematically indicated with $\bar{y}_m(t)$, a formula of which is indicated in equation (30)), may subsequently be converted into digital signals (words, observations) 28 through an ADC 11. The ADC 11 may provide digital samples at the sample rate $f_S$, with $f_S<f_C$. The sample time $T_S=1/f_S$ is therefore greater than the chip time $T_C$. The sample time $T_S$ may be a multiple of the chip time $T_C$, i.e. $T_S=S \cdot T_C$ (in FIG. 4, the sample time $T_S$ is 9 times the chip time $T_C$).

For the ADC 11 and the integrator block 10, sample frequency $f_S$ may be provided by a clock divider block 5. A sampling clock signal 21 may be provided at the sampling clock rate $f_S$ which may be obtained by an integer division of the chip frequency (system clock) $f_C$. The clock divider block 5 may be controlled by a parameter 17 (mathematically indicated with S), indicating that the sampling period $T_S$ is S times greater than the chip time $T_C$ (in FIG. 4, S=9, $T_S=S \cdot T_C=9 \cdot T_C$). Therefore, a digital value will be output by the ADC 11 every $T_S$, and/or the integrator block 10 will be reset every $T_S$. Hence, $T_S$ also represents the period of time over which the analog integration is performed at the integrator block 10.

As explained above, the mixed signal 26 (which may be input to the integrator block 10) may be obtained by analogically scaling the receive signal 24 by the second sequence (also indicated with "sequence 2") numbered with 25. The second sequence 25 may be generated by a "sequence generator 2" block 8. The sequence generator 2 block 8 may be synchronized by the clock signal 20 (chip rate) and, therefore, the second sequence 25 may be in phase with the transmitter signal 23. The second sequence 25 may include a plurality of chips whose length $T_C$ may be the same of the chips generated for the first sequence (and for the transmit signal 23) at the sequence generator 1 block 7. The second sequence 25 may be deterministic. The second sequence 25 may be pseudo random. The second sequence 25 may be a Rademacher sequence. The second sequence 25 may be different from the first sequence and/or may have a different period than the period of the first sequence.

A complete measurement cycle may include an integer number M of observations (each observation being a digital sample, or word, as generated by the ADC 11 during a sample time $T_S$). The integer number M may therefore be understood as the number of observations that is needed for obtaining a complete information on the impulse response (this may be application specific). The integer number M may be understood as indicating the number of entries of the sample vector b (29). In order to obtain the complete sample vector (i.e., in order to carry out all the measurements that permit to obtain the measurement of the impulse response), M consecutive observations are to be performed.

In FIG. 4, an observation frame or total measurement cycle takes a time length $T_{IRF}$ (which in this case is five times the sampling rate, in the sense that the complete information on the impulse response is obtained from five subsequent words at the output 28 of the ADC 11). The number of observations needed for obtaining the information of the impulse response is, in general, an integer multiple of the sample time $T_S$. It may be possible to apply the relationship $$M \cdot S = N \cdot P.$$

(In FIG. 4, M=5, S=9, N=5, P=3.)

Accordingly, a "sample vector" 29 (mathematically indicated with b) may be obtained from a sequence of M consecutive words 28 obtained from the ADC 11 (or AIC 200).

Here:
M ("second divider factor parameter" 19) may be the integer number of samples output by the analog-to-digital conversion (ADC 11) for obtaining the sample vector (29, b);
S ("first divider factor parameter" 17) may be the integer number of chips (length $S \cdot T_C$) for the time length $T_S$ needed for obtaining one sample at the ADC (11);
P may be the number of periods ($T_X$) of the first sequence in a complete observation frame; and
N may be the number of chips ($N \cdot T_C$) for each period in the first sequence.

In examples, it is needed to have a number M of digital samples (words) 28 for obtaining information on the channel impulse response (in FIG. 4, M=5). It will be needed a digital output word including M digital sampled values 28 as obtained by the ADC 11.

FIG. 2 shows a clock divider block 6 which may be controlled by the parameter 19 (M). The clock divider block 6 may be input by the sampling clock signal 21 (sampling rate $f_S$), and output a frame clock signal 22 at the frequency $f_{IRF}$ (frame clock rate). $f_{IRF}$ may be a sub-multiple of the sampling rate $f_S$ (i.e. $f_{IRF}=f_S/M$). Basically, the frame clock rate 22 may be understood as following the relationship $$f_{IRF} = \frac{f_c}{S \cdot M}$$

Therefore, in another example, block 6, instead of being input by the sampling clock signal 21, may be input by the system clock 20 (at the chip rate $f_C$) and be obtained by dividing chip rate $f_C$ by M~S, for example.

In examples, the first sequence and/or the transmit signal 23 and the second sequence 25 may be generated from a common system clock signal 20 at the clock rate $f_C$. Therefore, the chips of the first sequence, the transmit signal 23 and the second sequence 25 may result to be synchronized (e.g., same length and phase zero). In particular, at least one of the following clock divisions may be performed:
a clock division (at block 5) obtained by dividing the common system clock signal (20) by a first divider factor parameter (17, S) to obtain a sampling clock signal (21, $f_S$) to control the ADC conversion (11) and/or to define the period ($T_S$) of time of the integration (10) of the modified receive signal (26); and
clock division (block 6) by dividing the common system clock signal (20, $f_C$), or a clock signal (21, $f_S$) derived from the common system clock signal (20), by a second divider factor parameter (19, M), or a multiple of the second divider factor parameter (19, M), so as to obtain a frame clock signal (22, $f_{IRF}$) to control the processing (15) of the estimation of the impulse response (30) and/or reset the generation of the second sequence (25).

More in general, at least one of the following assumptions may hold:
the ADC 11 may be clocked in synchronism to the system clock (20, $f_C$) that drives the sequence 1 generator block 7 for the transmit sequence 1;
the sequence generator 2 block 8 is in synchronism to the system clock (20, $f_C$);
the ADC 11 and the sequence generator 2 block 8 are in synchronism to each other.

The frame clock signal 22 at the frequency $f_{IRF}$ may be understood as indicating the rate at which an information regarding the impulse response may be actually obtained (the information being constituted by M words). While the digital value (word) 28 may be obtained by the ADC 11 at the sampling rate $f_S$, the sample vectors 29 (b) may be obtained at the frame rate $f_{IRF}=f_S/M$. The frame clock signal 22 may be input to the sequence generator 2 block 8 for resetting the sequence 25.

The system clock signal may be commonly provided to blocks 6, 7, 10, 11 etc. and may be divided in real time (e.g., using phased locked loop(s), PLL(s)), e.g. providing for electrical connections between blocks 6, 7, 10, 11 etc. and/or other blocks using the system clock signal. In some examples, the synchronization is based on a presynchronization, which is performed at particular time instant(s). In examples, periodical or aperiodical resynchronizations may be provided. Accordingly, the different blocks result to be synchronized with each other.

In general terms, it is possible to see that the information output by the AIC 200 (and/or the words output by the ADC 11) may be conditioned by at least one of the following parameters:
the first divider factor parameter (17, S);
the second divider factor parameter (19, M);
the first sequence definition parameter (16); and
the second sequence definition parameter (18).

At least one of these parameters may be selected (e.g., by a user e.g. manually though input 102) and/or at least one of these parameters may be adaptively defined by the automated logic (which may be include in block 1 or may include block 1 or may be connected to block 1), e.g., on the basis of feedback 30 or 31.

It has been understood that the first sequence defining the transmit signal 23 may be associated with a first linear signal model, and the second sequence 25 to be mixed to the receive signal 24 may be associated with a first linear signal model (signal based model) and a second linear signal model (measurement model), respectively. It has also been understood that the first linear signal model may be embodied by a matrix D, which may be associated with the first sequence. Analogously, it has been understood that the second linear signal model may be embodied by a matrix φ, which may be associated with the second sequence 25. It has also been understood that the first linear model and/or the second linear model (in particular, the first matrix and/or the second matrix) may be a circulant linear model (in particular, a circulant matrix). By intelligently processing the information as output by the AIC 200 (e.g., vector b), and by making use of the first and second linear models, it will be possible to estimate the impulse response 30.

FIG. 3 shows an example of the processing unit 3. As can be seen, a reconstruction block 15 may provide an estimation 30 of the impulse response (or another information associated with or derived from the impulse response). The reconstruction block 15 may be input by at least one of:
1. information 32 (e.g. first linear signal model, e.g. matrix D) associated with the transmit signal 23 generated by the sequence 1 generator block 7 (which may be conditioned by the sequence 1 definition parameter 16 which has defined the first sequence);
2. information 33 (e.g. second linear signal model, e.g. matrix ϕ) associated with the second sequence 25 as generated by the sequence generator 2 block 8 (and which may be conditioned by the sequence 2 definition parameter 18 which has contributed to define the second sequence 25, and/or by parameters S or 17, M or 19 and the sampling rate $f_S$ or 21 and the frame clock rate or $f_{IRF}$ 22); and
3. information 29 (e.g. vector b) associated with the information 28 obtained from the AIC 200 (which may include the digital output words 28 as obtained by the AIC 200 and may also include at least one of the parameters S or 17, M or 19 and the sampling rate $f_S$ or 21 and the frame rate or $f_{IRF}$ 22).

On the basis of the information 32, 33, and 29, the impulse response 30 may be reconstructed.

The matrix D may be a matrix N×N, with N rows and N columns (N being the number of chips for each period $T_X$ in the first sequence). The matrix D may be a circulant matrix. The diagonal entries of the matrix D may have the same value. The non-diagonal entries of the matrix D may have values which are shifted one-by-one for each column. In an example, matrix D is provided by formula (17) (see below). In general terms, the information 32 associated with the first sequence may be expressed as the matrix D, generated by a linear transformation block 13. The matrix D may include values taken by the transmit signal 24. Entries of the matrix D may be (or be associated with) values of the first sequence.

The information 33 may be provided in terms of matrix ϕ and/or may be generated by a linear transformation block 14. The matrix ϕ may be a matrix with real values and may be an M×N matrix, with M rows and N columns. In the example of FIG. 4, ϕ may have five rows (by virtue of M=5) and 15 columns (by virtue of N=15). An example of matrix ϕ is provided by formula (18). As may be seen, matrix ϕ may include values of the second sequence 25. The matrix ϕ may be a circulant matrix. Entries of the matrix ϕ may be (or be associated with) values of the second sequence 25.

The information 29 regarding the receive signal 23 may be provided as a measurement data vector (sample vector) b with M components. In the example of FIG. 4, the vector b may be a 5×1 vector, by virtue of M=5. The vector b (29) may be understood as expressing a sequence of the digital output words 28 as output by the AIC 200 and/or include, for each of its components, a value output by the ADC 11.

The product of the first and second matrixes D and ϕ may be understood as forming a linear behavioural model matrix, whose columns are such that any subset of up to K columns is linearly independent (K being a number of unknown values of the impulse response to be determined).

In general terms, the following relationship may be valid:

$$b = \Phi \cdot H \cdot D \cdot e$$

(see also formulas (10), (12), and (19) below). "e" is an ideal impulse (see formula (3)).

Matrix H may be understood as associated with the impulse response to be obtained. Matrix H may be a complex matrix with N rows and N columns. Matrix H may be a circulant matrix.

It has been understood that, in order to obtain the estimate 30 of the impulse response, it is possible to use knowledge of the behavioural model matrix, by minimizing a sparsity-promoting function g, where g is a function that maps its argument to a scalar number which represents the degree of sparsity, under the condition that a product of the linear behavioural model matrix ϕ·D and the reconstructed impulse response vector 30 approximates or equals the sample vector (12, b). See for example formula (19) below.

In one example, the sparsity-promoting function may be a norm (e.g. a p-norm) or a quasi-norm. E.g. the sparsity-promoting function g(u) may be $g(u)=\|u\|_p$. In general terms, a p-norm may be indicated with $(\Sigma|X_n|^p)^{1/p}$ for p≥1 (where "Σ" indicates the summation). Other norms or other sparsity-promoting functions may be used. For 0<p<1, instead of a norm, a quasi-norm may be used as sparsity-promoting function, e.g. a 0-norm: in this case, the 0-norm of a vector may indicate the number of components of the vector which are different from 0 (e.g., if ten components of a vector are different from zero, the 0-norm will be 10; if if five components of the vector are different from zero, the 0-norm will be 5; and so on).

Note that the smaller p, the more strong the sparsity-promoting. p=1 may be used to simplifying the processing; p=0 may be advantageous in terms of sparsity, despite its processing would be less easy.

The impulse response may be reconstructed by minimizing the norm of the impulse response vector under the condition that a product of the linear behavioural model matrix ϕ·D and the channel impulse response matrix H approximately equals the sample vector b.

It has been understood that, by defining particular first and second sequences with particular relationships to each other (which also covers the matrixes D and ϕ) to have analogous similarities and which imply some particular relationships with the vector b. The particular relationships between the first and second sequences, by virtue of the fixed definition of the matrixes D and ϕ, can therefore be described with reference to the relationships between the matrixes D and ϕ.

It may be possible to define the first and second sequences so that the matrixes D and ϕ have the so-called restricted isometric property. This property characterizes matrixes which are nearly orthonormal.

The first and second sequences may be defined so that the product ϕ·D (behavioural matrix) of the first matrix [13, D] and the second matrix [14, ϕ] has columns such that any subset of up to K columns is linearly independent, wherein K is a number of unknown values of the impulse response to be determined.

The first and second sequences may be chosen such that each sample (word 28) obtained by the ADC 11 is generated from a unique linear combination of signal values within an observation frame (e.g. comprising the samples that are used for a joint determination of a channel information associated with a given instance of time).

The first and second sequences may be defined so that the product of the first matrix [13, D] and the second matrix [14, ϕ] has columns such any subset of K columns is linearly independent, wherein K is a number of unknown values of the impulse response to be determined. (In general terms, it may be understood that the condition is in the product of the matrixes D and ϕ, and not in D and ϕ taken singularly. If it has linearly independent columns, we may perform the reconstruction uniquely, without necessity to enforce other constraints on D and ϕ separately.)

Therefore, the matrixes D and ϕ (or more in general, information 32 and 33) may be directly obtained as a consequence of parameters such as the sequence 1 definition parameter 16 and the sequence 2 definition parameter 18. The parameters 16 and 18 may be defined by the parameter control block 1 on the basis of the necessities (e.g., as requested by the input 102 and/or by feedback and/or by high-level applications, such as a radar application). To the contrary, the information 29 (formed by multiple measurements or words 28) is not predetermined, but is obtained on-the-fly on the basis of the digital output words 28 as output by the AIC 200, and may be understood as mirroring information associated with the receive signal 24. The sample rate $f_S$ may be selected on the basis of parameter 17, while the frame clock rate $f_{IRF}$ may be selected on the basis of parameter M. The selection may be obtained through the input 102, feedback 30 or 31, and/or higher level applications (such as radar applications), e.g. in the automated logic.

Accordingly, it may be understood that the parameters 17, 19, 18 and 20 may be selected and varied according to the different necessities. With particular reference to the parameters 17 and 19 (S, M) it may be simply needed to observe the relationship M·S=N·P. The first and sequences may be defined by parameters 16 and 18 by keeping into consideration the constraints such as those above and below (i.e., the restricted isometric property and so on.

An example may be, for example, for a radar application, associated with the limitations due to Doppler frequencies for a moving object. The Doppler shift is defined by $$a = f \cdot \frac{v}{c'}$$

where v is the velocity of a moving object and c is the speed of light. The Doppler range may be defined as $$\pm \frac{1}{2 \cdot T_{IRF}}.$$

Accordingly, the apparatus 100 (or the automated logic) may comprise or operate as a Doppler controller which selects, based on a desired doppler resolution, at least one of
the sample rate [$f_S$] of the ADC (11), the chip rate [$f_C$] of the first and/or second sequence (25), a ratio [S] between the rate [$f_C$] of the first and/or second sequence (25) and the sample rate [$f_S$] of the ADC (11); and
the minimum periodicity of the first sequence and the minimum periodicity of the second sequence (25).

Accordingly, on the basis of the speed of the moving object, there will be the possibility of modifying at least the parameters M and S to reach the requested $T_{IRF}$. For example, it is possible to adjust the parameter M (19) to
increase the IRF rate (to reduce the $T_{IRF}$) if the impulse response of the linear system 4 shows low signal diversity or
decrease the IRF rate to gain either signal-to-noise ratio, SNR, for system responses featuring high signal diversity.

In addition or alternative, the parameter controller 1 and/or the automated logic may operate so as to define at least one of the parameters 16, 17, 18, 19 on the basis of the ambiguity range or the number of non-zero components in the system's impulse response (30).

Figure 5:
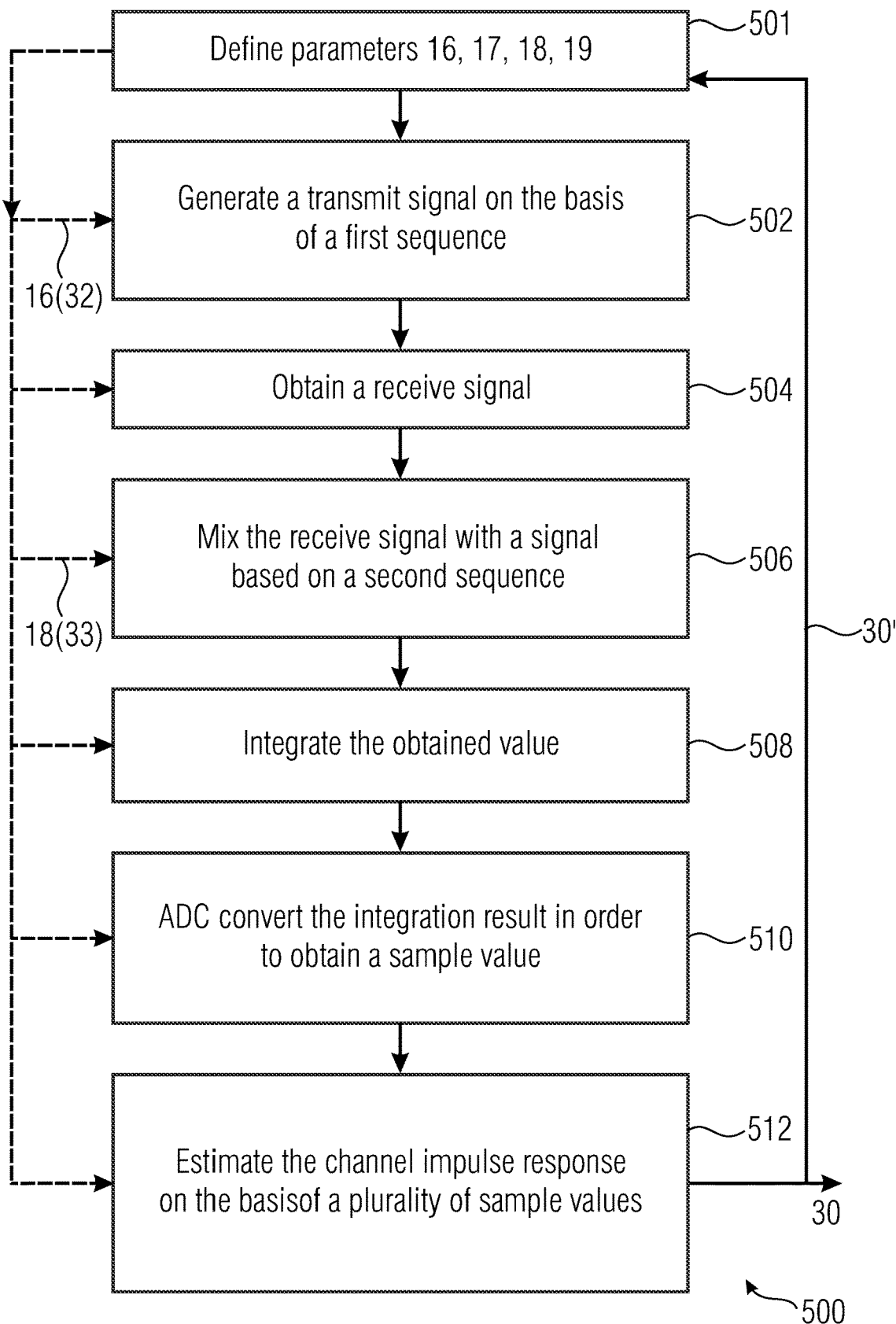
FIG. 5 shows a method according to an example.

FIG. 5 shows a method 500 which may be understood as implementing and also summarizing and/or embodying the apparatus 100 above. The method 500 may include a step 502 of generating a transmit signal (e.g., 23) on the basis of a first sequence. The first sequence may be defined by parameter 16 and/or by the sequence generator 1 block 7. The transmit signal may be the signal 23 and may have a period $T_X$ which is a multiple of a chip rate $T_C$ (where $T_X = N \cdot T_C$, which N natural number which is the number of chips in a period $T_X$ of the first sequence).

The method 500 may comprise a step 504 of obtaining a receive signal. The receive signal may be, for example, the signal 24. The receive signal 24 may be the reflected version of the signal 23, for example. The receive signal 24 may permit to reconstruct information on the channel (e.g., impulse response).

The method 500 may comprise a step 506 of mixing the receive signal 24 with another signal 25 based on the second sequence, to obtain a mixed signal 26. This may be obtained, for example, at mixer block 9 by multiplying the signal 24 with the signal 25 which may be understood as being the second sequence. The signal 25 may be generated by the sequence generator 2 block 8, e.g., on the basis of the sequence 2 definition parameter 18. The signal 25 may be a deterministic signal. The signal 25 may have a periodicity different from the periodicity of the transmit signal 23. The signal 25 may have a periodicity which is a multiple of the chip period $T_C$. The signal 25 may be synchronized to the system rate $f_C$ (where $f_C = 1/T_C$). The signal 25 may be reset on the basis of the reset command 22 at with a frequency $f_{IRF}$ (where $f_{IRF} = f_C/(S \cdot M)$).

At step 508 the mixed signal 26 may be integrated (e.g., at the analog integrator block 10). The integration may be reset with frequency $f_S$ (where $f_S = f_C/S$).

At step 510, the method 500 may ADC convert (e.g., through the ADC 11) the integration result to obtain a sample value. Sample values are obtained according to the sample rate $f_S$ (where $f_S = f_C/S$). Every M obtained digital samples, a digital output word 28 (formed by M consecutive digital samples) may be obtained.

At step 512, the channel impulse response (e.g., 30) may be estimated on the basis of information 29 regarding the digital output words obtained at step 510, as well as on the basis of information 32, 33 associated with the first and second sequences. Therefore, at step 512, it is possible to estimate the impulse response 30.

In FIG. 5 there is also shown a step 501 in which parameters such as at least one of the parameters 16, 17, 18, 19 may be defined, e.g., through input 102, e.g., by a user, e.g., by feedback 30 or 31, e.g., by an application (such as a radar application), e.g. by the automated logic. The feedback line 30' shows the possibility of defining at least one of the parameters 16, 17, 18, 19 on the basis of the estimated channel impulse response. This may be obtained, for example, in applications such as those associated with the Doppler range and/or the modification of the IRF rate based on the diversity of the impulse response. The feedback line 30' of FIG. 5 may therefore be associated with the feedback line 30' of FIG. 1.

One particular case of the method 500 may be the following:
1) Generating (e.g., sequence generator 1 block 7) a transmit sequence and use it to excite the linear system (e.g., 4) under test.
2) Generating a second sequence (e.g., by sequence 2 generator 8), which is multiplied with the collected analog signal.

3) Collecting the receive signal 24 and multiply in analog domain by the second sequence 25, to obtain the signal 26.
4) Performing subsequent integrations, at integrator block 10, of adjacent windows of the signal 26.
5) Digitizing by the ADC 11 the output of the integrations 27.
6) Determining the effective measurement kernel used from the sequences chosen, the integration parameters and the relative timing of the involved steps
7) Reconstructing (e.g., by reconstruction block 15) the desired impulse response 30 from the digital data obtained in step 4 with the knowledge of the measurement kernel e.g., by means of sparse signal reconstruction.

Figure 6:
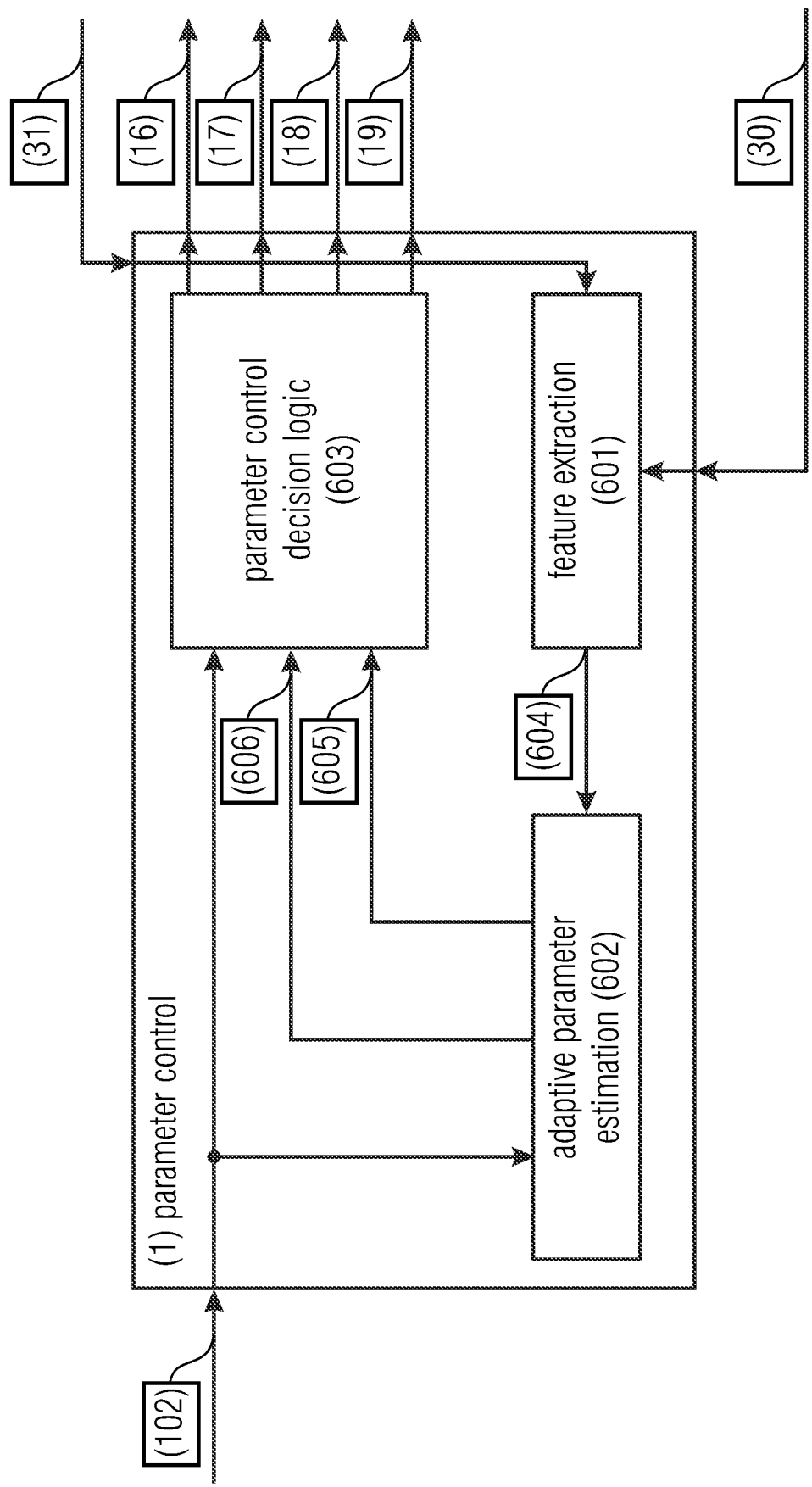
FIG. 6 shows an example of high-level application.

FIG. 6 shows an exemplary implementation of the parameter estimation block (1) such that the apparatus (100) may modify the parameters (16), (17), (18) and (19) adaptively, based on either previous estimates of the impulse response (30) and/or based on information about the linear system from other sources (31). In a feature extraction step (601) relevant features of the linear system are extracted. These can be the speed of individual subtargets, an estimate of the impulse response's sparsity order or its ambiguity range (width of the impulse response in delay domain) just to name a few. This process strongly depends on the actual properties of the measurement scenario the apparatus (100) is applied to.

The extracted key features are then processed in an adaptive parameter estimation step (602) to obtain the actual targeted parameters for Doppler range (605) and compression factor (606), all controlled by user input (102) specifying the behaviour of the adaptive control process.

Finally, a Parameter Control Decision Logic (603) interprets the Doppler range target (605) and compression factor target (606) parameters to set the actual parameters (16), (17), (18) and (19) for the apparatus (100), based on user constraints (102) that may set boundaries corresponding to hardware limitations of the frontend (such as maximum ADC rate).

FIG. 7 details how the parameters Doppler range target (605) and Compression factor (606) can be connected to the parameters S (17), M (19) and sequence 1 (16) period of apparatus (100). A crucial factor is the Total Measurement Cycle (TMC), which can be generated by the multiplication of S (17) and M (19). It directly relates to the observation duration needed in order to estimate one impulse response of the linear system (4) and is therefore directly related to the Doppler range. The choice on how to split the desired TMC to S (17) and M (19) is influenced by available SNR, signal sparsity and/or ADC capabilities, amongst others. The plots for variations of SNR must not be interpreted quantitively as the exact dependency on SNR cannot be defined generally.

However it can very well be said that higher SNR leads to relaxations on signal sparsity, compression factor or achievable Doppler range in the context of the apparatus (100).

Example: If a system aims to configure for a certain minimum Doppler range (605), its TMC and thus the parameters (17) and (19) are to be chosen accordingly. However, depending on the available SNR (indicated by the three lines in the second drawing of FIG. 7) and Sparsity requirements, this might involve a larger number of observations, controlled by parameter M (19). This then might increase the needed ADC sampling rate (21) as parameter S (17) will need to be chosen sufficiently low to achieve the target TMC.

A. System Model and Channel Reconstruction

The observed response signal is observed by mixing the output (24) of the system (4) with a second signal sequence (25), and finally digitizing the result (27) of an integrate-and-dump operation on the mixing operation output (26) at a specific sampling rate $f_S$ over a total number of M∈ N samples, hereafter referred to as one frame. A main characteristic of the proposed architecture is that the first signal sequence and the second signal sequence (25) are generated by a common uniform clock signal $f_C$ and are synchronized at the beginning of every frame, effectively defining an operation which is deterministic and periodic. The frame period $T_{IRF}$ and/or the sampling period $T_S$ is an integer multiple of a common time interval $T_C$. The proposed architecture allows to measure the impulse response of a linear system (4) at a rate $f_C$ that is much lower than the bandwidth of the to-be-observed linear system (4) itself as well as of each of the signal sequences. Obtaining the actual impulse response may imply a post-processing step (e.g., at block 3) that reconstructs an approximation 30 of the linear system's impulse response based on one measured data frame. This is possible, as the signal transformation which this proposed architecture applies is deterministic and known. In an example, both signal sequences are composed of a sequence of narrow rectangular NRZ-pulses ("chips") with relative amplitudes [+1; −1] and uniform width $T_C$ (other implementations are possible The chip rate may be $f_C$, where $f_C=1/T_C$ (in this document, in some cases, instead of $f_C$ there may be the notation $f_0$). In this case, the sampling rate can be chosen as an integer fraction of the chip rate such that $f_S=f_C/S$. Let the first sequence comprise N chips (each with length $T_C$) and let a complete measurement cycle comprise P periods (each with length $T_X=P \cdot T_C$) of the first sequence. Then one cycle, producing one frame of data, is completed after N·P chips which leads to M observations where M=N·P/S. The proposed architecture may allow to reconstruct the impulse response of the linear system from M observations of one measurement cycle (each measurement cycle taking a sample period $T_S$), based on a specific reconstruction stage that may depend on a parametric model and whose examples are described below and above. A complete measurement cycle may therefore take a time of $T_{IRF}=M \cdot S \cdot T_C=N \cdot P \cdot T_C$. This means that one impulse response is available at a rate of $f_{IRF}=1/T_{IRF}$ (in some cases, additional averaging may be considered, which may further reduce that rate).

The tracking of time-varying impulse responses may therefore be limited, in examples, to Doppler frequencies within $\pm 1/2/T_{IRF}$. Now, since the parameters N, P, and S, are adjustable (e.g., defined an automated logic), the proposed architecture offers the flexibility to trade the Doppler resolution with the sampling clock $f_S$. We can choose a lower sampling clock $f_S$, e.g., by increasing the parameter S, which leads to an increase of $T_{IRF}$ and thus a lower Doppler range. This is a novel and inventive feature compared to the conventional technology approach from [1], [2], [3], which also discloses an architecture for measuring the impulse response of a linear system. It uses a similar transmit sequence but it does not use a second receive sequence and therefore does not allow to adjust the sampling rate Doppler trade-off in the way it was mentioned above. Further, the track-and-hold block of [1], [2], [3] is replaced with a serial combination of the newly introduced blocks for mixing the input signal with the second sequence, followed by performing an integrate-and-dump operation in that order. When comparing both approaches the temporal receive signal coverage ratio may be considered. This is the proportion of the actual active signal observation time that gets represented in one observation to the repetitive observation interval $T_S=T_C \cdot S$. While the proposed extension allows observing the signal continuously at a ratio of 1, the snapshotting approach embodied by the track-and-hold architecture only achieves a ratio of $T_C/T_S=1/S$.

The additional blocks, namely the second sequence generator (8), mixer (9) and integrate-and-dump filter (10), introduced by the present proposal, may be recognized as analog-to-information converter (AIC) (200) in the form of a random demodulator (RD) (see also [6]). The AIC 200 may be understood as a building block for performing the compressive acquisition of (wideband) signals with low-rate ADC. The term "compressive" reflects the reduction of the observation rate below what is commonly needed to fulfil the Nyquist sampling criteria for the receive signal. Further, due to the introduced mixing operation (9) of the receive signal (24) with the second sequence (25) followed by the integrate-and-dump filter (10), our proposed technique is capable of representing the all of the receiving signal's energy in the observations generated, in contrast to the sub-sampling approach of [1], [2], [3].

A time-varying impulse response $h(\tau; t)$ of a linear system at time t can in general be expressed as $$h(\tau, t) = \sum_{\ell=1}^{L} \alpha_\ell(t) \cdot \delta(\tau - \tau_\ell(t)), \quad (1)$$

i.e., it is comprised of a sequence of L paths (taps) with complex tap weight $\alpha_\ell$ and delay $\tau_\ell$. This impulse response can, e.g., stem from reflections of the signal across different propagation paths with different path lengths. Note that both, amplitude and delay can be time-varying. However, it has been understood that it is possible to assume that they vary slowly in time so that within one measurement cycle $T_{IRF}$ they can be considered approximately constant but changing from cycle to cycle. Their rate of change may be referred to as the Doppler frequency. For example, if a relative movement between transmitter/reflecting object/receiver occurs at a certain speed v, this gives rise to a frequency-proportional Doppler shift given by $\alpha=f \cdot v/c$, where c is the speed of light. Since we obtain one estimate of the impulse response every $T_{IRF}$, we can resolve a Doppler range of $$\pm \frac{1}{2 \cdot T_{IRF}}$$

(according to the Nyquist criterion). This shows that there is maximum allowed speed of movement is inversely proportional to $T_{IRF}$. After transmitting the periodic sequence x(t), the receive signal can be written as $$y(t) = \sum_{\ell=1}^{L} \alpha_\ell \cdot x(t - \tau_\ell) + w(t) \quad (2)$$

where w(t) represents the additive noise and $\alpha_\ell$, $\tau_\ell$ represent tap weights and delays of the current channel realization. As formula (2) shows, besides for the additive noise, y(t) is given by a linear combination of shifted copies of the known sequence x(t). This implies that the a signal can be represented via only 2·L unknowns, which suggests that a sampling at a rate above $2 \cdot L/T_{IRF}$ is possible without loss of information (e.g., in the noise-free case), regardless of the bandwidth of the signal sequences.

B. Block Descriptions

In the following please find a detailed description of building blocks, some property of which (in relationships to examples) are also discussed above.

1) Parameter Control Block

A control unit which may provide the measurement parameters needed in the blocks (2) and (3) as shown in FIG. 1. This block (1) may exploit known state information (31) of the system under test (4) or the reconstruction output of previous observation periods (30) e.g., by means of an adaptive strategy.

2) Measurement Block

The measurement block (2) may be responsible for probing the system under test (4) with a suitable periodic excitation stimulus and to acquire observations in the form of digital data samples according to at least one of the parameters 17, 19, 16, 18 and 20, e.g., provided by the parameter control block (1). A novelty of the proposed method lies in this block (22) and the strategy the measurement of the unknown impulse response of the linear system (4) under test may be retrieved by the processing unit block (3). Our proposed method enhances conventional technology methods by replacing the undersampling a-to-digital conversion, as proposed by [1], [2], [3], with a random demodulator, as proposed by [5], [4]. This is a sampling strategy that applies the theoretical framework of compressed sensing to conduct a series of observations (28), and involves additional post-processing (3), e.g., to retrieve a measurement of the linear system impulse response from the observations taken. A range of algebraic requirements that may depend on the measurement system's signal model may be fulfilled in order to give recovery. In a prominent application of the random demodulator the receive signal (24) may be first multiplied (and/or mixed) with a known deterministic signal (25), that is generated by a suitable signal generator (8). The resulting signal (26) may be then fed into a continuous time-gated integrator (10). The gate width of the integrator block may be controlled by a suitable timing generator (5). In an example the integrator block (10) would be designed such that it is capable of fully-continuous operation by means of multiple integration stages that are switched properly. This may be achieved most easily by operating two integration stages that are antagonistic controlled by one time-gate control signal. While one of the integrators is busy integrating, the other holds the value for a sufficient period to allow a successful a-to-digital conversion and then discharges its output. On every logic transition of the time-gate control signal, the integrators switch their operation modes, effectively enabling the a-to-digital converter to observe the energy of consecutive time-slices of the mixed signal (26). The blocks' functionality can be approximated by a linear model as given in (23), (24), (25) and (26).

3) Processing Unit

The reconstruction block (3) may compose a measurement vector (or sample vector) 29 from the observations of one measurement frame (28), (22) and construct the linear system model (32), (33), e.g., from the parameter set formed by at least one of the parameters 16, 17, 18, 19. Based on those prerequisites the linear system's impulse response (30) may be approximated by the block 15. A basic principle of determining the impulse response of a linear system is in general to excite it with an ideal impulse and measure its response $$e = \begin{cases} N & \text{for } n = 0 \\ -1 & \text{else} \end{cases} \quad (3)$$

$$\tilde{h} = e \cdot h \quad (4)$$

where $e \in \mathbb{R}^N$ is the ideal impulse vector.

The periodic convolution can be expressed as a matrix multiplication with a circulant matrix $H \in \mathbb{C}^{N \times N}$ which may be (in examples) defined as:

$$H = \begin{bmatrix} h[0] & h[N-1] & \cdots & h[1] \\ h[1] & h[0] & \ddots & \vdots \\ \vdots & \vdots & \ddots & \vdots \\ h[N-1] & h[N-2] & \cdots & h[0] \end{bmatrix} \quad (5)$$

$$\tilde{h} = H \cdot e \quad (6)$$

As this straightforward approach becomes impractical very quickly due to implementation considerations, these may apply a pulse compression by convolving the ideal pulse with a vector having special auto-correlation properties. The true impulse response h can then be retrieved from the measurement vector $\hat{b}$ using the inverse matrix $D^{-1}$, which is unfortunately quite expensive to determine. In this case, the special auto-correlation property of the transmit sequence is exploited (7). Then, $D^{-1}$ can be sufficiently approximated by $D^H$, where "H" refers to the hermitian matrix, i.e., the conjugated transpose of matrix D yielding a relatively small error $\Delta r = D^H \cdot D$. Extending the system model to:

$$\hat{e} = D \cdot e \quad (7)$$

$$\hat{b} = H \cdot \hat{e} \quad (8)$$

$$\hat{\tilde{h}} = D^H \cdot \hat{b} + \Delta r \quad (9)$$

It has been understood that adding the proposed sampling scheme extends the model further:

$$b = \Phi \cdot H \cdot D \cdot e \quad (10)$$

We see that the order of operands prohibits the direct attempt of retrieving a linear system model. To overcome this issue, we consider the property of Fourier matrices to diagonalize circulant matrices $$H = F^H \cdot X \cdot F \quad (11)$$

where $F \in \mathbb{C}^{N \times N}$ is the discrete Fourier matrix of order N and X a diagonal matrix $\in \mathbb{C}^{N \times N}$. A product of any two circulant matrices yields $$H_1 \cdot H_2 = F^H \cdot X_1 \cdot F \cdot F^H \cdot X_2 \cdot F$$

$$= F^H \cdot X_1 \cdot X_2 \cdot F$$

$$= F^H \cdot X_2 \cdot X_1 \cdot F = H_2 \cdot H_1$$

where $X_1$ and $X_2$ each are diagonal matrices $\in \mathbb{C}^{N \times N}$. We see that we can swap the terms for matrix products of circulant matrices.

Exploiting this property yields a final linear model for this proposed method $$b = \phi \cdot D \cdot H \cdot e \quad (12)$$

of which $\tilde{h}$ can be determined according to the block (15) (FIG. 3). b may indicate the sample vector 29.

4) Linear System (4) Under Test

Examples here may be directed to measure a wideband linear time-invariant system (LTI) system. Proposed examples may permit to retrieve its impulse response h(τ). Contrary to the conventional technology methods in [1], [2], [3] is that the impulse response can be assumed to be sparse, i.e. the impulse response can be modeled as a set of weighted and time-shifted delta functions of its K primary components:

$$h(\tau) = \sum_{k=0}^{K-1} A_k \delta_k(\tau - \tau_k) \quad (13)$$

Formula (13) describes the impulse response h(τ) as a sum of pulses with amplitude $A_k$.

In a prominent application h(τ) models the power delay profile of a radio-frequency (RF) channel containing information about its K dominant multi-path propagation components. In a discrete interpretation, K may be the number of non-zero or above-noise-floor components of the impulse response vector $h \in \mathbb{C}^N$. K may be referred to as sparsity of the channel.

5) Clock Divider Block (5), Division by a Divider Factor S

This block 5 may derive the sampling clock (21, $f_S$) from the system clock (20, f) and may be controlled by the parameter S (17). The choice of S does not need to be fixed in time and may very well be time-variant, e.g. if non-equidistant observations (27) are needed. However, in an example this block 5 may be implemented as an integer divide-by-S clock divider with S>1, leading to a uniform sampling clock $f_S$, at which, for example the ADC (11) obtains the digital words (28).

6) Clock Divider Block, Division by M

This block 6 may generate the measurement frame synchronization signal (22, $f_{IRF}$) from the sample clock (21, $f_S$) and may be controlled by the parameter M (19). The choice of M does not need to be fixed in time and may very well be time-variant, e.g. if measurements of varying observation rate or with a varying overall number of observations (27) are needed.

In conventional technology methods a strict frame synchronization is not needed and a measurement consists of N observations, which would resemble the number of system clock cycles (20) in one transmit sequence period (23). As in the present proposed examples, the number of observations (words 28) for each frame (and for each measurement vector 28 or b) can be adjusted. Accordingly, the parameter M offers a new degree of freedom in that it allows a trade-off between signal sparsity, signal SNR and measurement rate (with the known effects to Doppler sensitivity).

In an example, this block 6 may be implemented as an integer divide-by-M clock divider with M>1, fed by the sample clock $f_S$ (21), leading to a uniform overall measurement rate $$f_{IRF} = \frac{f_c}{S \cdot M},$$

consisting of M observations (words 28) obtained by the ADC (11) at sampling rate $f_S$.

7) Generator Block for Sequence 1 ("Sequence Generator 1 Block")

This block 7 may generate a periodic a signal (23) with a signal period $$T_x = \frac{N}{f_c}$$

synchronous to the system clock, where N∈ℕ is the number of system clock cycles per period and $f_C$ is the system clock frequency (20). The signal waveform may be understood as being completely defined by the transmit signal definition parameter (16). In an example, the sequence generator may be implemented as a binary linear feedback shift register (LFSR) properly configured in register size and feedback tap configuration to generate a MLBS. The parameter defining the transmit signal generator's operation may then comprise, e.g., consist of the register's feed-back tap configuration $t=\{0,1\}^K$, with the transmit signal sequence's characteristic polynomial of order K being $$g(x) = \sum_{i=0}^{K} t_i \cdot x^i,$$

and the register's initial value being $s_{(0 \ldots K)}=\{0,1\}$, mapping to the generator's output symbols as $\{0 \to 1, 1 \to -1\}$. In such a system, the feedback tap configuration, and thus the characteristic polynomial shall be chosen such that the polynomial g(x) is irreducible [7]. Then, the length $N=2^K-1$ of the periodic sequence is maximal given the order K and its period in time domain is $T_x = N \cdot f_C$. The advantage of choosing a periodic maximum length sequence lies in the properties of its cyclic auto-correlation function. For an ideally band-limited linear system of corner frequency $$B = \frac{f_c}{2},$$

it can be written in continuous and discrete form:

$$\Psi_{xx}(\tau) = 2^K \cdot \frac{\sin(\pi f_0 \tau)}{\pi f_0 \tau} - 1 \tag{14}$$

$$\Psi_{xx}[n] = \begin{Bmatrix} N & \text{for } n = 0 \\ -1 & \text{else} \end{Bmatrix} \tag{15}$$

It can be seen that for the given choices, the delay-domain resolution of the impulse response is limited to the peak-width of the auto-correlation function $\Psi_{xx}$ which is α$\phi$≈

$$\Delta \phi \approx \frac{1}{B} = \frac{2}{f_c}.$$

Given me propagation speed in the medium, this directly relates to the achievable resolution (in the sense of target separation) of $$\delta = \frac{v_0}{\Delta \phi}.$$

The accuracy (in the sense of ranging) can even be well below that.

8) Generator (8) Block for Sequence 2 (25) ("Sequence 2 Generator Block 25")

This block 25 may generate a deterministic signal (25, mixing signal) whose temporal relation to the system clock (20) is known at all times. The properties and waveform of the deterministic signal can be controlled by a parameter (18) introduced in this method, which is not present in any conventional technology method. This block 8 may relate to the mixing sequence generator of a random demodulator as in [5]. In an example the deterministic signal (25) is generated by a pseudo-random sequence generator (8), which may be fed by the system clock (20) and/or may be producing a uniform sequence of symbols at a rate $f_C$, that may be drawn from the Rademacher set [−1; 1], for example (other techniques may be implemented).

Although generator 8 is quite similar to the signal 1 generator block (transmit signal generator) 7, block 8 does not necessarily need to generate a periodic sequence. In order to ensure that the deterministic mixing signal (25) is known at all times, the pseudo-random sequence generator (8) may be reset by the frame synchronization signal (22), as shown by the dashed array labeled reset. The deterministic mixing signal (25) generated by this block does not necessarily need to be periodic as long its state is known at all times.

9) Signal Mixing Block

This block 9 may combine the receive signal y(t) (24) and the mixing signal $q_y(t)$ (25) by means of point-wise multiplication of the signals:

$$y_m(t) = q_y(t) \cdot y(t) \tag{16}$$

Due to the choice of symbols possible signal values the mixing operation (9) may be implemented by a simple polarity inverter, which inverts the sign of the analog receive signal (24) whenever the Rademacher deterministic signal (25) is [−1] This block relates to the mixer block in [4]. In an example, a common RF two-port signal mixing circuit, e.g. a Gilbert cell, is chosen for implementation of this block.

10) Integrator Block

This block 10 may be understood as being similar to the mixer block in [4]. In the example a short-time integrator with controllable integration slope is chosen to implement this block. This allows stretching the impulse response function of the integrator block, allowing to control the integration time optimally when adaptively varying the parameter 19.

11) Analog-to-Digital Conversion Block

This block 11 may convert the continuous analog integrated signal (27), e.g. as output by the integrator block (10), into a sequence of digital output words (28) by means of a common ADC. In a prominent application the number M of observations (words 28) is chosen smaller than the length N of the transmit sequence (which also is the size of the reconstructed impulse response vector h[n] (30)), hence the term "compressed". This directly leads to one of the following implications:

(1) The AIC 200 could run at reduced sampling rate $f_S$,
(2) While retaining the sampling rate $f_S$, more reconstructions of the impulse response could be generated.

12) Data Vectorization Block

The data vectorization block 12 may collect the stream of observations (words 28) in the measurement sample sequence and form observation vectors b (29) that fit the linear transformations (33) generated by formula (14). As the underlying parameters 17 and 19 may be time-variant, the dimension of the resulting observation vector b (29) may change accordingly but fits the shape of the corresponding element in the matrix 33 at any time.

13) Linear Transformation Block for Signal Base

The linear transformation block 13 may define a basis spanned by time-shifted versions of the excitation signal. Due to the special auto-correlation properties of the transmit sequence (23) any set of two different base vectors (time-shifted versions of the excitation signal) exhibits low correlation. Therefore, the columns of the resulting basis may be regarded as quasi-orthogonal and the sparsity assumption of the linear system's impulse response (4) is also valid for the receive signal (24) in this signal basis, although the receive (transmit) signal is dense and exhibits no resemblance of sparsity. As we have introduced earlier, the requirement of sparsity in a known signal domain for successful sparse recovery is therefore fulfilled.

$$D = \begin{bmatrix} x[0] & x[N-1] & \ldots & x[1] \\ x[1] & x[0] & \ddots & \vdots \\ \vdots & \vdots & \ddots & \vdots \\ x[N-1] & x[N-2] & \ldots & x[0] \end{bmatrix} \quad (17)$$

Matrix D may be a circulant matrix of the transmit signal 23 and/or resemble a periodic convolution matrix.

14) Linear Transformation Block for Sampling Operation

This block describes the linear analog signal processing operation as implemented in the measurement block (2), i.e. by the blocks (8), (9), (5), (10) and (6), as a linear transformation $\Phi \in \mathbb{R}^{M \times N}$, which can be exemplary defined as follows for the example:

$$\Phi_{i \bmod N, \lfloor \frac{i}{s} \rfloor} = q_y[i] \quad (18)$$

for $i = 0 \ldots (S \cdot M)$

Where "mod" indicates the remainder of the integer division, and $$\left\lfloor \frac{i}{s} \right\rfloor$$

indicates the floor function (i.e., the integer part of the argument). The remaining entries of $\phi$ are equal to 0.

See the description of the data vectorization block b (12) for details on the relation of the outputs of this block and (the passages describing the measurement data vector b (29) and the measurement matrix (33) respectively.

15) Reconstruction Block

This block 15 may reconstruct the linear system's impulse response (4, 30) by solving the following optimization problem based on knowledge of the exact measurement operation in block 2:

$$\operatorname*{argmin}_{\tilde{h}} \|\tilde{h}\|_0 \quad (19)$$

$$\text{s.t.} \quad \Phi D \tilde{h} = b$$

where "argmin" refers to the value of $\tilde{h}$ which minimizes the function $\|\tilde{h}\|_0$ and $\|\ldots\|_0$ is the so-called 0-norm (quasi-norm). In alternative, another quasi-norm or a proper norm may be used (e.g. a p-norm $\|\ldots\|_p$ with $p \geq 1$). More in general, the equation (19) may be used by minimizing a sparsity-promoting function g, where g is a function that maps its argument to a scalar number which represents the degree of sparsity, under the condition that a product of the linear behavioural model matrix $\phi \cdot D$ and the reconstructed impulse response vector 30 approximates or equals the sample vector (12, b). An example may be to use the sum of the absolute value of the components of the vector (in some other example, other kinds of norms may be defined). Another example may be to use the 0-norm $\|\ldots\|_0$, i.e. the quasi-norm that provides the number of components of a vector which are different from 0.

Due to that $N \neq M$ the system of linear equations (SLE) in formula (19) is either under- or over-determined and need attention. In the literature, many methods capable of solving the described problem have been investigated. Amongst them are orthogonal matching pursuit (OMP), iterative shrinking threshold algorithm (ISTA) or basis pursuit (BP), etc.

C. Parameter Descriptions

The exact parameter definition is very dependent on the actual implementation. The following parameters relate to examples.

16) Sequence 1 Definition Properties

See the description of the generator block 7 for the sequence 1 for a description of the defining parameters and the description of the transmit signal 23 for a description of the sequence 1 (transmit signal x(t)).

17) Sample Clock (Divider Factor) 17, S

See the description of the clock divider block 5 for a description of the parameter S.

18) Sequence 2 Definition Properties

See the description of the generator 8 for the sequence 2 for a description of the second sequence (mixing signal).

19) Frame Clock Divider Factor

See the description of the clock divider block 6 for a description of the parameter M.

D. Signal Descriptions

20) System Clock (Common System Clock or Chip Rate) $f_C$ (Signal: 20)

The system clock $f_C$ is the fundamental clock supplying the sequence generators 7 and 8 as well as a clock divider block chain consisting of the blocks 5 and 6. The choice of the fundamental clock frequency $f_C$ may determine the rate of chips being generated at the output of the generator block 7 and thus directly translate to the bandwidth B of the transmit signal (23), which may be understood as corresponding to the achievable resolution.

21) Sampling Clock Rate $f_S$. (Signal: 21, Parameter: S, 17)

The sampling clock divider block (5) may be understood as generating the sampling clock $f_S$ (e.g., used by the ADC 11) from dividing the system clock $f_C$ (20) by an integer divider factor $S \in \mathbb{N} > 1$, so that the resulting sampling clock is synchronous to and slower than the system clock:

$$f_s = \frac{f_c}{s} \quad (20)$$

$$T_S = \frac{1}{f_s} \quad (21)$$

The signal may serve as sampling clock for the signal conversion block or ADC (11) and may further control the time behavior of the integrator block (10). In examples, as short-time integrator the sampling clock may determine integration window $t_S$ and therefore achieve high temporal resolution, i.e., low jitter. In another implementation variant, as low pass filter withhold circuit the clock edges control the exact sampling instances of the low-frequency integrated signal.

22) Frame Clock Rate $f_{IRF}$ (Signal: 22, Parameter(s): 17 and/or 19)

The frame clock divider block 6 generates the frame clock $f_{IRF}$ by dividing the sampling clock $f_S$ (21) with an integer divider factor $M \in \mathbb{N} > 1$. $f_{IRF}$ may be understood as being synchronous to, but slower than, both the system clock $f_C$ (20) and the sampling clock $f_S$ (21):

$$f_F = \frac{f_s}{M} = \frac{f_c}{S \cdot M} \tag{22}$$

$$T_{IRF} = M \cdot T_S = \frac{1}{f_{IRF}} = \frac{S \cdot M}{f_c} \tag{23}$$

The frame clock (22) may provide the time structure for the association of single elements of the measured sample sequence (28) to a measurement vector b (29) and trigger the impulse response vector reconstruction in the reconstruction block (15) of the math processing unit (3) from the collected measurement data vector once it was filled. Further, it may control the time-behavior of sequence 2 generator (8) by synchronizing the mixing signal $q_{y(t)}$ (25) to the frame clock $f_{IRF}$ (22), thus ensuring a consistent and stable timing scheme for the integration of all measurement samples ("words" 28) over all measurements, i.e. for each measurement data vector b (29).

23) Transmit signal x(t)

The transmit signal x(t) may be the output of the Sequence Generator 1 block (7) and is used as stimulus signal to excite the linear system under test (4):

$$x[n] = q_x[n \bmod N] \tag{24}$$

$$x(t) = x\left[\left\lfloor \frac{t}{T_0} \right\rfloor\right] \tag{25}$$

(where $T_0$ is $T_C$).

24) Receive Signal

The receive signal may be understood as the convolution of the transmit signal (23) and the unknown impulse response of the linear system under test (4) and can be written as:

$$y(t) = x(t) * h(\tau) \tag{26}$$

where * is the linear convolution operator.

25) Mixing Signal $q_{y(t)}$ (25)

The mixing signal $q_{y(t)}$ is the output of the Sequence

Sequence generator 2 block (8) and can generate a second sequence 25 (mixing signal) which can be mathematically written (in examples) as $$m[n] = q_m[n \bmod (M \cdot S)] \tag{27}$$

$$m(t) = m\left[\left\lfloor \frac{t}{T_0} \right\rfloor\right] \tag{28}$$

(where $T_0$ is $T_c$).

for the example as described in formula (8), including the described generator reset from the signal (22). In order to ensure good conditioning of the measurement matrix (33) the lengths of both generator signals, N for (7) and S·M for (8) respectively have to differ. This may permit to ensure that each observation ("word" 28) is generated from a unique linear combination of the receive signal (24) within one observation frame.

26) Mixed Signal $y_m(t)$ (26)

The mixed signal (26) is the continuous output signal of the multiplication (or mixing) operation as performed by (9) on the signals (24) and (25):

$$y_m(t) = y(t) \cdot m(t) \tag{29}$$

27) Short-Time Integrated a Signal $\bar{y}_m(b)$

The integrator output signal (27) is the continuous output signal of the analog integration operation of block $$\bar{y}_m(t) = \int_{T_0 \cdot \left\lfloor \frac{t-T_0}{T_0} \right\rfloor}^{T_0 \cdot \left\lfloor \frac{t}{T_0} \right\rfloor} y_m(\tau) d\tau \tag{30}$$

(where $T_0$ is $T_c$).

28) Measurement Sample Sequence $\bar{y}_m(m)$ (28)

The integrator output signal (28) is a sequence of digital output words that are the representation of the integrator output signal (27) as converted by the ADC (11):

$$\bar{y}_m[n] = \bar{y}_m(n \cdot T_0) \tag{31}$$

(where $T_0$ is $T_C$).

29) Measurement Data Vector b

A set of observations (or "words" 28) corresponding to one particular measurement frame $b \in \mathbb{C}^M$, whose alignment may be determined by the frame clock signal (22):

$$b = [\bar{y}_m[0] \ldots \bar{y}_m[M-1]]^T \tag{32}$$

where "T" refers to the transposed matrix.

30) Impulse Response Vector $\tilde{h}(m)$ (30)

The discrete representation of the approximated linear system's channel impulse response $\tilde{h} \in \mathbb{C}^M$ (4) and output of the measurement reconstruction block (15):

$$\tilde{h}[n] = \tilde{h}(n \cdot \Delta \phi) \tag{33}$$

$$\tilde{h} = [\tilde{h}[0] \ldots \tilde{h}[N-1]]^T \tag{34}$$

where T refers to the operation of transposition.

31) Channel State Information

An optional set of information about the linear system under test (4) that assists the parameter control block (1) in an example.

32) Signal Basis Transformation D

The signal basis $D \in \mathbb{C}^{N \times N}$ in which the receive signal (24) is sparse. See the description of block 13 for more details.

33) Measurement Matrix $\Phi$

See section II-A and the description of block 3 for a description on how the measurement matrix $\Phi$ is defined and the description of block 14 on how it is generated (depending on which other blocks, signals and parameters).

III. IMPLEMENTATION EXAMPLE FOR AN EXAMPLE

In the following, one example implementation of the example is given to illustrate the choice of the parameters. A simple line of sight (LOS) scenario is chosen for this measurement setup. Two suitable antennas are connected to the transmit (23) and receive (24) signal ports respectively and oriented such that the path loss is minimal for a given distance. The space between the antennas can be referred to as channel, rendering this arrangement a channel sounding measurement setup. The system-under-test (4) therefore may comprise, e.g., a chain of three sub-blocks: the transmitting antenna, the channel, and the receiving antenna. Such a measurement setup is well suited for various applications such as non-destructive testing, radio detection and ranging (RADAR), antenna characterization or distance measurements.

LFSRs are chosen as sequence generators for both cases (7) and (8), generating a binary sequence of the symbols {1, −1}, where the internal LFSR state vector symbols $s_i$ map to the generator's output symbols as {0→1, 1→1}. The generators can be parameterized according to the description given in block (7) by two vectors t and s each. The definition parameters for sequence generator 1 (16) may be chosen such that $g_1 = x^{12} + x^{11} + x^7 + x^4 + 1$ and $s_1 = \{1\}^{12}$, which resembles a MLBS of order k=12 and with a period of 4095 chips. The parameters for sequence generator 2 (18) may be chosen such that $g_2 = x^{13} + x^4 + x^3 + x + 1$ and $s_2 = \{1\}^{13}$, giving another MLBS of order k=13 and with a period of 8191 chips. The sequence generator 2 (18) will be reset to its initial state vector at the beginning of every 11th transmit sequence (23), which results in ~5.5 repetitions of the implemented MLBS within one total measurement cycle of 45054 $T_C$. The system performance is not dependent on certain criteria regarding the parameter selection for the sequence generator 2 (18) as long as the columns of the resulting system matrix are linearly independent.

The clock divider blocks (5) and (6) may be both implemented as integer divide-by-N clock dividers with the sample clock divider factor (17) chosen as S=117 and the frame clock divider factor (19) chosen as M=385. For a system clock (20) of $f_C$=9.22 GHz this directly translates to a sampling clock (21) of $f_S$≈78.8 MHz and a frame clock rate (22) of $f_{IRF}$≈205000 IRFs per second.

Comparing to an implementation featuring the conventional technology m-Sequence method, the closest divider factor would be S=128, resulting in a sampling clock of f $f_S$≈72.03 MHz.

However, due to the fact that the observation frame size M is fixed to the used MLBS' period of 4095 the IRF is only $f_{IRF}$≈17600 IRFs per second, which is considerably lower than the rate achieved by the examples. Furthermore, due to the adaptability of the proposed method, M may easily be changed adaptively to achieve one of these effects:

Increase the IRF rate even further if the impulse response of the linear system (4) features low signal diversity;

Decrease the IRF rate to gain either SNR or reconstruction robustness for system responses featuring higher signal diversity.

Further discussion is provided below any aspect may be individually or collectively combined with any aspect disclosed above.

REFERENCES

[1] P. PEYERL et al., "Verfahren zur Bestimmung der Impulsantwort eines breitbandigen linearen Systems und Meßanordnung zur Durchführung des Verfahrens," DE Patent 19 846 870, Jan. 25, 2001.

[2] P. PEYERL et al., "Verfahren zur Bestimmung der Impulsantwort eines breitbandigen linearen Systems und Meßanordnung zur Durchführung des Verfahrens," EP Patent 0 994 358, Apr. 19, 2000.

[3] P. PEYERL et al., "Method for determining the pulse response of a broad band linear system and a measuring circuit for carrying out the method," U.S. Pat. No. 6,272,441, Aug. 7, 2001.

[4] Y. ELDAR et al., "Sub-nyquist sampling of short pulses," U.S. Pat. No. 8,836,557, Sep. 16, 2014.

[5] Y.ELDAR et al., "Multi-channel sampling of pulse streams at the rate of innova-tion," U.S. Pat. No. 8,717,210, May 6, 2016.

[6] J. A. Tropp et al., "Beyond nyquist: Efficient sampling of sparse bandlimited signals," IEEE Transactions on Information Theory, vol. 56, no. 1, pp. 520-544, Jan 2010.

[7] S. W. Golomb, Shift Register Sequences. Laguna Hills, CA, USA: Aegean Park Press, 1981.

Hardware Architecture for Ultra-Wideband Channel Impulse Response Measurements Using Compressed Sensing We propose a compact hardware architecture for measuring sparse channel impulse responses (IR) by extending the M-Sequence ultra-wideband (UWB) measurement principle with the concept of compressed sensing. A channel is excited with a periodic M-sequence and its response signal is observed using a Random Demodulator (RD), which observes pseudo-random linear combinations of the response signal at a rate significantly lower than the measurement bandwidth. The excitation signal and the RD mixing signal are generated from compactly implementable Linear Feedback Shift registers (LFSR) and operated from a common clock. A linear model is derived that allows retrieving an IR from a set of observations using Sparse-Signal-Recovery (SSR). A Matrix-free model implementation is possible due to the choice of synchronous LFSRs as signal generators, resulting in low computational complexity. For validation, real measurement data of a time-variant channel containing multipath components is processed by simulation models of our proposed architecture and the classic M-Sequence method. We show successful IR recovery using our architecture and SSR, outperforming the classic method significantly in terms of IR measurement rate. Compared to the classic method, the proposed architecture allows faster measurements of sparse time-varying channels, resulting in higher Doppler tolerance without increasing hardware or data stream complexity.

1. Introduction

Estimating the IR of a linear system is a core task in many engineering applications, including system identification, channel sounding, radar, localization and others [107, 101, 112, 105, 120]. More often than not, these IRs are not entirely static but (slowly) changing in time, e.g., due to motion of scattering objects in wireless propagation conditions, giving rise to Doppler shifts. In such scenarios, the IR needs to be measured repeatedly and the repetition rate we can sustain determines the Doppler range we can support [124].

A wide variety of principles exists to measure IRs, including impulse methods, Frequency-Modulated Continuous-Wave (FMCW) or methods based on Pseudo-Noise (PN) sequences [118]. Due to their advantages in implementation complexity and the low achievable crest-factor, we focus on the latter category in this paper. For PN methods, it is common to excite the linear system with a periodic PN signal of high bandwidth. The trade-off between hardware complexity and achievable Doppler range is then controlled by subsampling the received signal and varying the subsampling factor, capitalizing on the fact that the periodic signal can be recovered from samples taken in subsequent periods after proper rearrangement [117]. However, a drawback of subsampling is that most of the receive signal remains unused and measurement time is increased considerably, drastically reducing IR measurement speed and tolerable Doppler range.

Measuring sparse IR of linear systems or channels based on Compressed Sensing (CS) theory has been demonstrated using different concepts. The work on sub-Nyquist radar [109] and the Modulated Wideband Converter (MWC) [113] perform multiple observations in parallel and sample in the Fourier domain, which becomes increasingly infeasible at higher operating frequencies. In [121] the RD concept was applied to pulse-based UWB IR measurements observing from a single channel over multiple excitations. Although the concept can be implemented for very high operating frequencies, generating the RD mixing signal efficiently is not addressed in [121] and the signal basis is highly susceptible to interference.

In this document we propose, inter alia, examples for an extension to the M-Sequence Method (MSM) of [117] that uses CS principles [104, 102] to significantly reduce the measurement time, yet maintaining the low hardware implementation complexity known from the MSM. Applying the RD concept [122, 111], we obtain sufficient information about the IR from only a few observations of linear projections. Assuming the IR is sparse, it can be recovered via $\ell_0$ or $\ell_1$ techniques [116, 106]. The linear system model of this architecture is composed of structured matrices, which when exploited during implementation, yield great benefits in computation efficiency [123, 114, 115]. The proposed architecture is targeted for very high operating frequencies well exceeding 10 GHz and specifically considers aspects of hardware implementation feasibility.

The symbols w, W, *, ⊛ may denote vectors, matrices, convolution and circular (periodic) convolution respectively. ̃ indicates estimates and ̂ is used for symbols in context of the msm. It is known from linear system theory that any signal $\xi(t)$ can be represented by a series of values $\xi[n]=\xi(n \cdot T_0)$ at a uniform sampling rate of $T_0$, as long as the Nyquist-Shannon sampling theorem is fulfilled. For the remainder of the paper the following signal discretizations apply: $x(t) \leftrightarrow x[n]$, $y(t) \leftrightarrow y[n]$, $h(\tau) \leftrightarrow h[\nu]$ and $\delta(t) \leftrightarrow \delta_n$, where $\delta_n$ is the Kronecker delta.

2. Measuring Impulse Responses

The IR $h(\tau)$ of a linear system can be measured by exciting its input port x(t) with an impulse resembling the δ-function. Then, the IR can be directly observed at its output port y(t)=x(t)*h(t), yielding y(t)=h(t). In practice, h(τ) can be assumed to be band-limited, exhibiting a maximum frequency component $f_{max}$. It is then sufficient to use an equally band-limited approximation of δ as excitation signal.

In many applications, h(τ) is not static but actually slowly varying over time and h(τ) is usually also approximately limited to $\tau_{max}$ in the delay-domain. Measuring the it can then be repeated at a rate of up to $f_{IRF}=1/\tau_{max}$, allowing to also measure time-variant systems as long as they can be assumed to be stationary within the observation time frame $\tau_{max}=1 f_{IRF}$.

For measuring the IR using impulse excitation, the generation of sharply peaked, steep impulses is needed in order to achieve a large measurement bandwidth. For good dynamic range in the presence of noise, the amplitude of those pulses has to be very large. The Crest factor (CF) is commonly used as a metric for characterizing a signal's peak-to-RMS dynamic range. Impulse excitation also imposes severe demands on the circuit capturing y(t), since frequency components of up to $f_{max}$ are to be captured with both, high linearity and dynamic range. Furthermore, direct coupling of the excitation pulse into the capturing circuitry is usually quite strong and has to be tolerated without damage or impeding performance.

Due to the severity of these constraints for demanding measurement applications, more advanced methods have been presented to measure IR, especially for UWB systems or channels. Some of them focus on optimizing the excitation signal, some target linearity or CF and again others leverage on the dynamic range by applying additional signal processing on the collected data stream. But also the implementation effort can motivate to go for alternative approaches. For example, the FMCW method employs a narrowband continuous-wave signal as excitation signal x(t), which is swept through the frequency band over time. This greatly reduces hardware complexity, and also improves linearity and coupling due to the low instantaneous bandwidth of x(t). The attainable measurement rate is rather low and in time-varying scenarios distinct clutter is to be handled.

Selecting x(t) as a sum of carefully chosen, periodic narrowband signal components ("multi-tone"), achieves high instantaneous bandwidth and reduces measurement time. The IR is then retrieved by decorrelating y(t) with x(t). Optimizing x(t) such, that $x(t) \circledast x(t) \approx \delta(t)$ can be assumed, the computationally expensive decorrelation operation may be replaced by $y(t) \circledast x(t)$. As a side effect, this also suppresses noise and interfering signal components, increasing dynamic range.

A thorough review of the mentioned methods in the context of UWB systems can be found in [118].

3. Signal Model of the M-Sequence Method

A smart choice for x(t) is a periodic Maximum Length Binary Sequence (MLBS) of order k, exhibiting a period of $N=2^k-1$, a low CF≈1 and the desirable auto-correlation properties, as introduced in Sec 2. Such a signal can be generated efficiently from the system clock $f_0$ using a LFSR, as presented in [117], needing only a few standard digital gates to generate x[n]. FIG. 11a shows the block diagram a measurement device employing the MSM.

The periodic excitation sequence $x[n]=x[n+k \cdot N]$ for $k \in \mathbb{N}$ is also referred to as the vector $x \in \{+1, -1\}^N$. Similarly, we describe the periodic system response signal y(t) via $y=x \circledast h \in \mathbb{R}^N$. A cyclic convolution operator can be defined as a circulant matrix $D \in \{+1, -1\}^{N \times N}=\text{circ}(x)$, such that $y=D \cdot h$. The cyclic auto-correlation function of a periodic mlbs resembles a scaled $\delta_n$ except for a small DC offset [119]:

$$(x \circledast x)[i] = \{N \text{ for } i=0 \text{ and } -1 \text{ else}\}. \quad (2.1)$$

It is now possible to estimate the IR from the system response y[n]:

$$\tilde{h}=D^T \cdot y = D^T \cdot (x \circledast h) = x \circledast x \circledast h \approx N \cdot h \quad (2.2)$$

From (2.2) a correlation gain of N can be seen, which allows the use of significantly smaller excitation signal amplitudes.

To reduce hardware complexity in the receive path, [117] proposes to employ subsampling. Using a fast Track and Hold (T&H) circuit, any time instance of y(t) can be stored sufficiently long to convert the sample using slow, low-cost Analog-to-Digital Converter (ADC) circuits. A sampling clock $f_S=f_0/\hat{S}$ controls the conversion, which is derived from the system clock $f_0$ by means of an integer divide-by-$\hat{S}$ clock divider circuit. Due to subsampling, y can be collected over the course of $\hat{S}$ excitation signal periods. This effectively allows trading IR measurement rate $\hat{f}_{IRF}=f_0/(\hat{S} \cdot N)$ against adc conversion rate, greatly reducing hardware component requirements.

Especially when measuring radio channels, which is a popular application of the msm, moving objects cause the system response to be clinched/stretched in time domain. This effect, also known as the Doppler effect is tolerable, as long as the total absolute time distortion does not exceed the amount of one half sample duration $T_{max}=12f_0$. This limit can also be derived from a frequency perspective, where an object moving through the channel at a relative speed v causes a Doppler shift in the signal spectrum. Since we need to sample the Impulse Response Function (IRF) at least at twice the rate of the maximum Doppler shift to avoid degradation of $\hat{h}$ in moving scenarios, a limit can be written as:

$$v = \frac{2f_0 \cdot v}{c_{prop}}; \quad f_{IRFmin} = \frac{v_{max} \cdot f_0}{c_{prop}}, \quad (2.3)$$

where $c_{prop}$ is the relative propagation speed in the medium and $f_{IRFmin}$ is the minimum IR measurement rate, for which moving objects of relative speeds up to $v_{max}$ can be tolerated. If the motion limit of (2.3) is exceeded, coherent sampling is lost and the correlation gain of (2.1) diminishes by leaking to other taps of $\hat{h}$. FIG. 11b exhibits this degradation strongly as soon as the motion limit is exceeded.

Sampling can be described as a permutation operator $\hat{\Phi} \in \{0,1\}^{N \times N}$, defined as $$\hat{\Phi}_{ij}=\{1 \text{ if } j=(i \cdot \hat{S}) \text{Mod } N, 0 \text{ else}\} \quad (2.4)$$

To ensure full rank $\hat{\Phi}$, $\hat{S}$ must not be a factor of N. Since $\hat{\Phi}$ is trivial to invert, (2.2) applies for estimating $\hat{h}$ from $\hat{b} \in \mathbb{R}^N$. If subsampling is employed, it is self-evident that the MSM is poorly utilizing available signal energy, since only one in $\hat{S}$ samples is actually used. The presence of additive noise $\hat{n} \in \mathbb{R}^N$ completes the linear model to $$\hat{b}=\hat{\Phi} \cdot y=\hat{\Phi} \cdot D \cdot h+\hat{n}. \quad (2.5)$$

In employing a LFSR to generate x[n], the convolution operator D can be computed efficiently using the Fast Hadamard Transform (FHT) [119], which is exploited in our model implementation [123].

Multiple $\hat{b}$ can be averaged to further improve noise robustness by trading measurement speed for dynamic range.

4. Signal Model of the Proposed Architecture

One example of the proposed hardware architecture, as depicted in FIG. 11b, addresses the problem of low system signal energy usage by applying a more efficient sampling scheme. Under the assumption of sparsity in the IR, and inspired by Finite Rate of Innovation (FRI) theory, only a few degrees of freedom are to be determined in order to retrieve the IR [103], for which according to CS theory already a small number of observations is sufficient, if the system model is well conditioned [104]. To accomplish this, we replace the T&H circuit by a RD structure as in [122, 121], comprised of a second LFSR sequence generator, a multiplication circuit and a short-time integrator. Note that the RD is strictly synchronous to the excitation signal generator. This way, instead of observing one entry of y once every S system clocks, a pseudo-random linear combination of S successive elements in y is measured. These pseudo-random linear samples form the observation vector $b \in \mathbb{R}^M$. The random projection kernels are defined by the RD mixing signal $m \in \{-1, +1\}^{S \cdot M}$, generated by the second LFSR generator as depicted in FIG. 11b. Similar to (4) for the MSM case, the Sampling operation of the proposed architecture can be defined as $$\Phi_{iModN}\left\lfloor \frac{i}{s} \right\rfloor = m[i] \text{ for } i = 0 \ldots (S \cdot M). \quad (2.6)$$

Since we now utilize the full signal y[n] in the projections b, after just a few observations (M<<N), y is already captured multiple times in b[n] and reconstructing the IR is possible from these observations. The Compression Radio (CR) is defined as c=M/N. Controlling the number of observations per b, gives the flexibility to (adaptively) set $f_{IRF}$ independent of $f_S$ or $f_0$ and thus trade measurement rate (Doppler sensitivity) against sparsity (rate of innovation).

Given the linear system's IR h[n] is sparse, we can now formulate the under-determined linear problem for reconstructing h:

$$\underset{\tilde{h}}{\operatorname{argmin}} \; \|\tilde{h}\|_0 \text{ s.t. } A \cdot \tilde{h} = \Phi \cdot D \cdot \tilde{h} = b, \quad (2.7)$$

which can be solved approximately using $\ell$ or $\ell_1$ SSR methods. In this work we employ the omp implementation of [123], which operates solely using efficient rank-1 updates [115]. Compared to other SSR methods, OMP does not need any (noise regularization) parameters to be chosen and is robust as long as the columns of $A=\Phi \cdot D$ are mutually non-coherent.

Retrieving the IR from b may be seen as needing significantly more computational resources than the simple correlation post-processing employed by the MSM [117]. However, processing such as averaging or background subtraction can be performed directly on the raw observation stream b. Since the model (2.7) consists highly structured linear mappings, significant improvements in both memory footprint and run time performance may be achieved by exploiting structure [123]. Recently, an implementation of OMP has been demonstrated in silicon [110], giving way to realizing the proposed architecture as high-performance system-on-chip including SSR processing.

5. Measurement Setup

Following, we will evaluate the performance of our proposed architecture, based on real measurements of a time-variant UWB radio channel, according to Se. 5.1. A IS-HAD12HS device from IImsens GmbH, Germany is used to measure channel IRs using the MSM and two wideband vivaldi horn antennas, resulting in an overall −10 dB bandwidth of 3.11 GHz. The device features a LFSR, producing a MLBS of length N=4095, and a clock divider outputting a sample clock of $f_S=f_0/_{128}$. Providing a low-jitter stable clock source of $f_0=9.22$ GHz we obtain a sampling rate of $f_S=72.03$ MHz. The device is capable of measuring ≈17 590 IRF/s and to cover an it spread of $\tau_{max}$<444 ns.

In software, subsampling is extended to a total factor of $S_{total}=S \cdot S_{add}=4096$ by only processing every 32nd sample. Since the excitation signal period is $N=2^{12}-1=4095$, we now have the case that according to (2.4) the sampling matrix becomes the identity matrix: $\hat{\Phi}=I_{4095}$. Then the data stream z[n] is sampled at a virtual rate of $f_S=f_0/_{4096}\approx2.25$ MHz. This results in the sample stream being now equivalent to sampling at $f_0$, since the effective subsampling factor is $S_{eff}=S_{total}$ mod N=1. Reordering the samples is no longer needed and the data stream z[n] now serves as the virtual system response signal y[n] for both methods. The performance of both methods can now be compared fairly using realistic data.

It is advised to choosing S for the proposed architecture such that it divides N. Then it allows to reuse Φ for every reconstruction of (2.7). This is crucial in maintaining comparable reconstruction performance independent of the measurement time t but also gives us the flexibility to easily sweep CR, since for every additional excitation signal period an integer amount of N/S more observations is gathered. Having this laid out, this poses the problem that we cannot choose S=Ŝ, because the MSM strictly needs Ŝ to not be an integer factor of N (to ensure complete sampling). Since we want to compare the systems and also the ground truth channel, we aim for S~128. Choosing S=117 allows extending the CR for every additional signal period by ΔM=4095/117=35 observations, starting from 3·4095/117≈2.56%. Since we cannot match sampling rates, we give the MSM a slight advantage by choosing Ŝ=116.

5.1 Time-Variant Line of Sight (LOS) Scenario With Multipath

Figure 12:
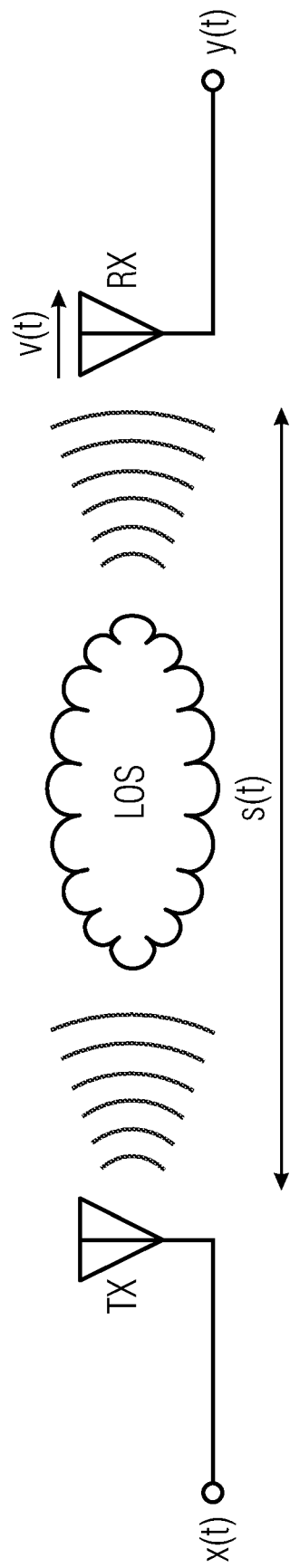
FIG. 12 shows an implementation.

FIG. 12: Measurement Scenario: Moving Receiver LOS Scenario

Given these parameters, (3) yields a movement limit of $\hat{v}_{max}=0.16$ m/s for the MSM. Setting the highest compression rate for the proposed architecture, yields $v_{max}=5.93$ m/s. FIG. 2 shows the measurement scenario, where the RX antenna is moved back and forth from the TX antenna, with $|v_{max}|≈1$ m/s. The antenna distance s(t) corresponds directly to the peak delay $\tau_{LOS}(t)$ in the channel IR $h(\tau)=\omega_0 \cdot \delta(t-\tau_{LOS}(t))$, where $\omega_0(t)$ denotes the LOS intensity.

Figure 8:
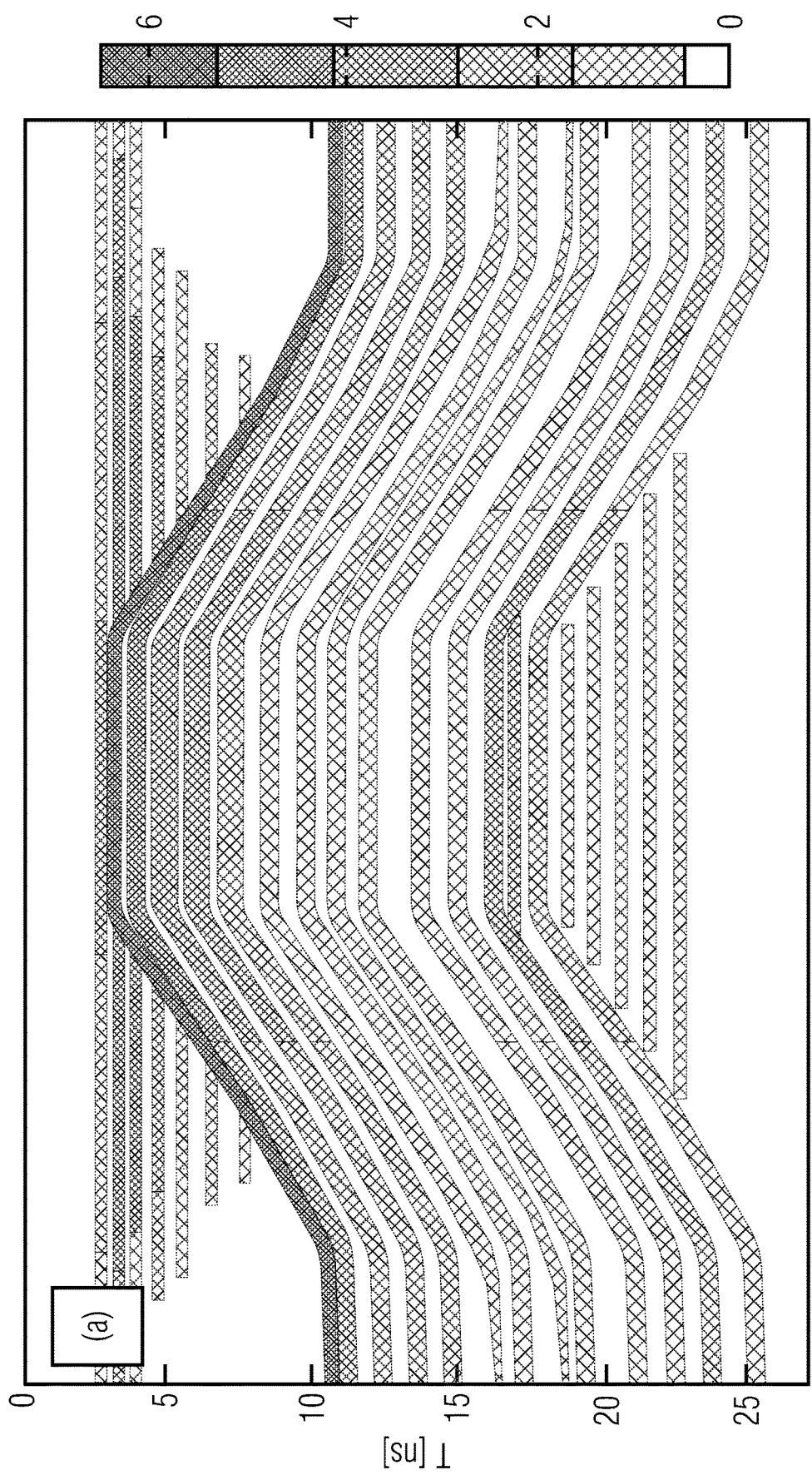
FIG. 8 shows evaluation results of experimentations.
Figure 8:
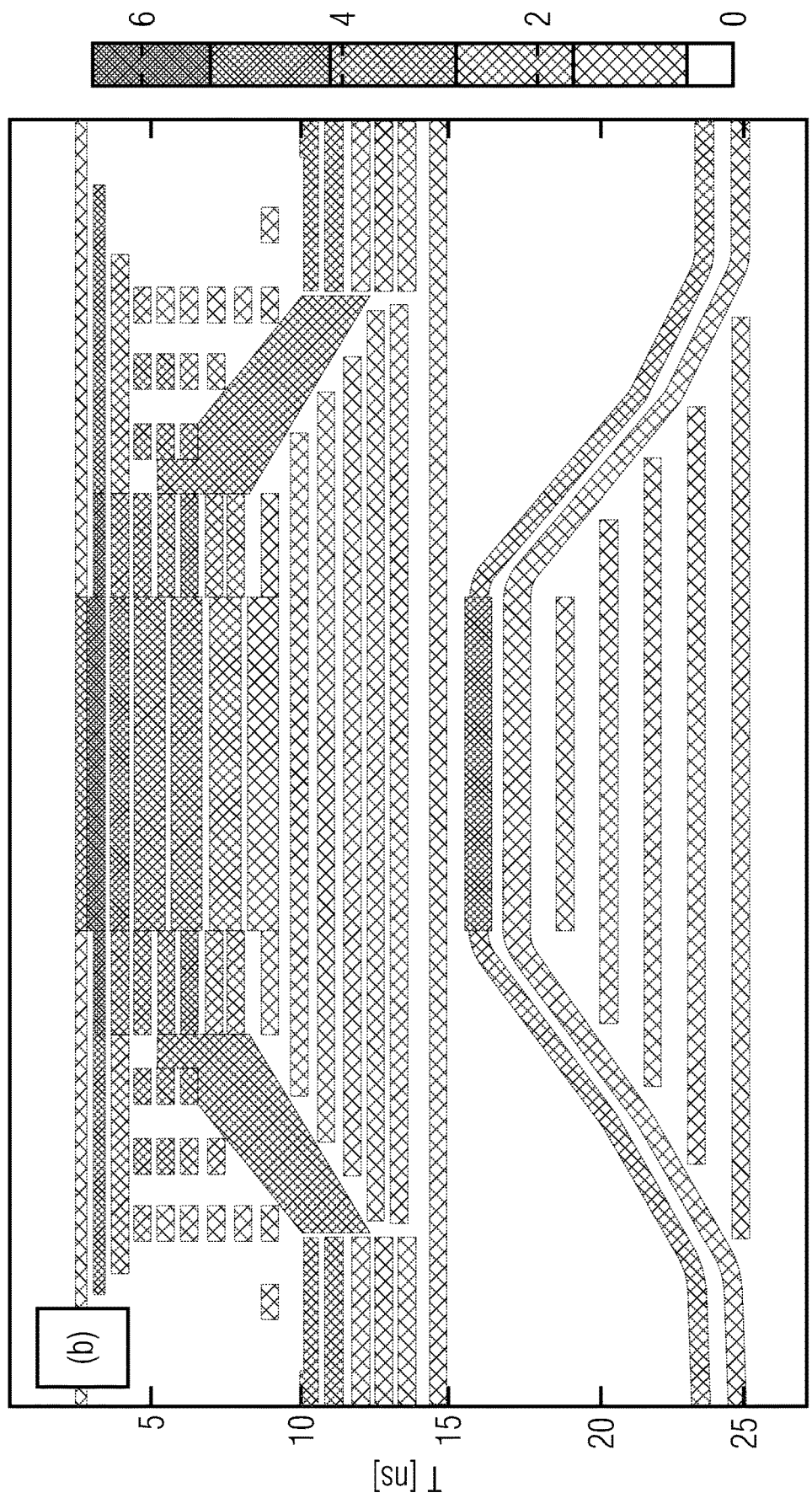
Figure 8:
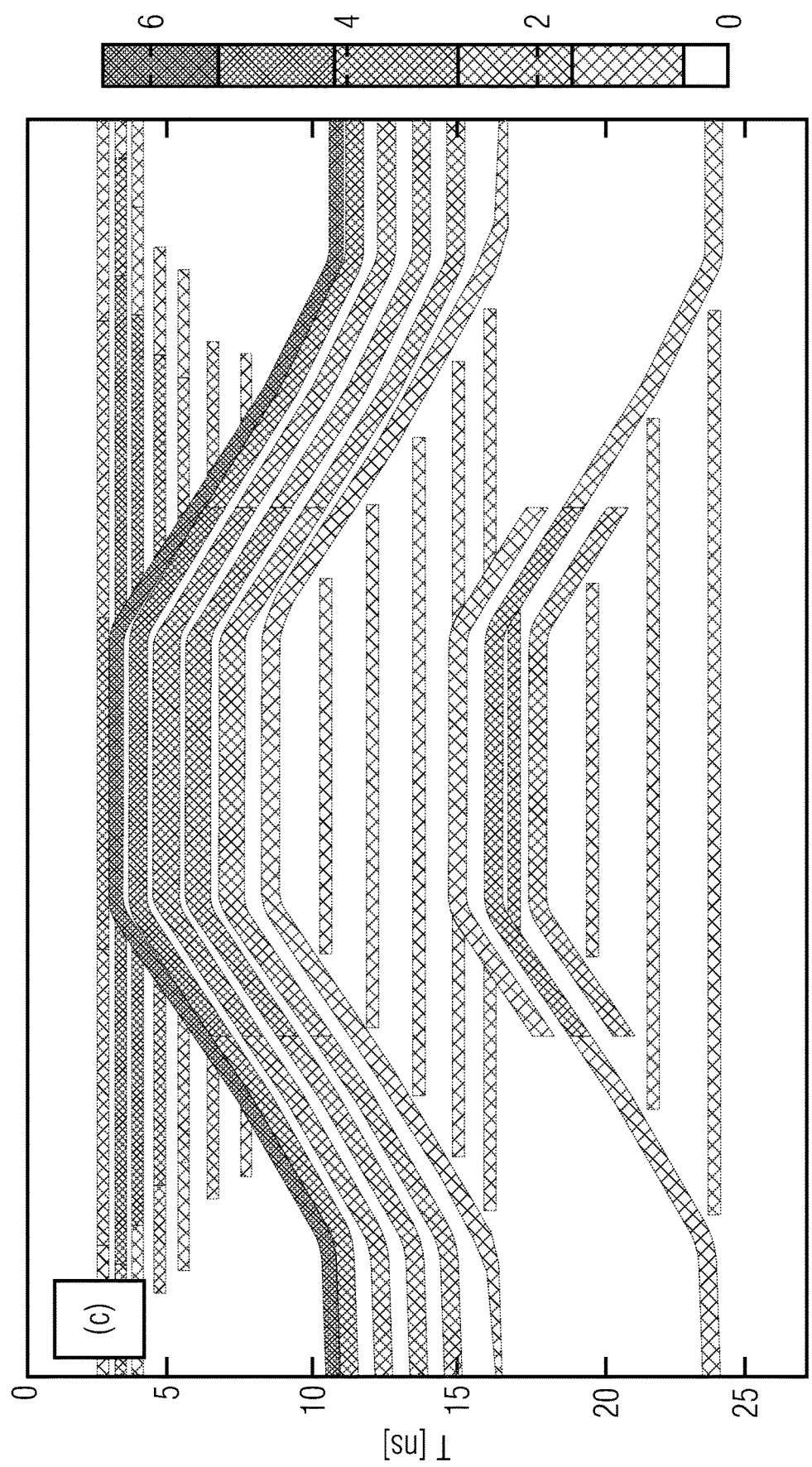
Figure 8:
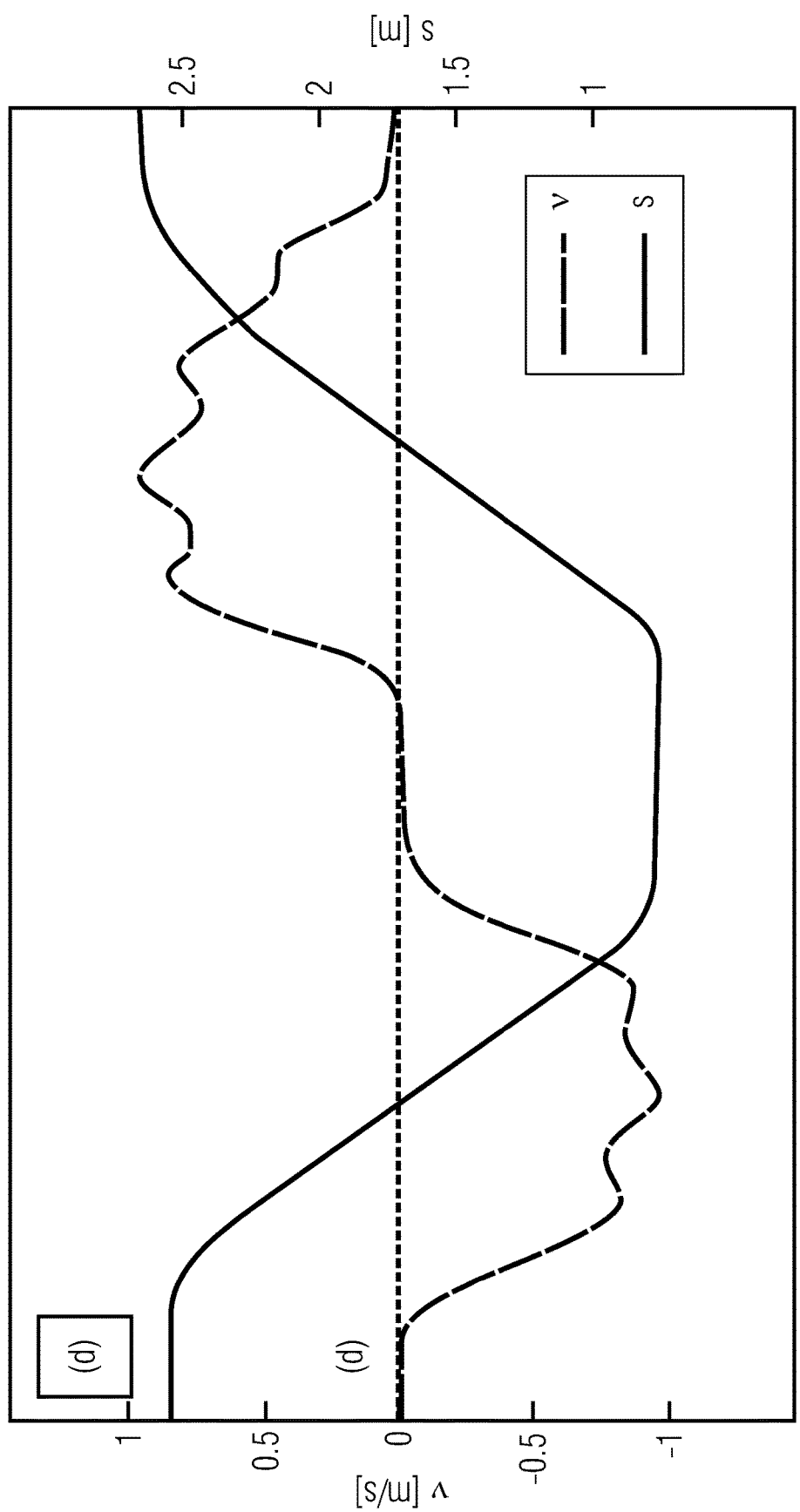
Figure 8:
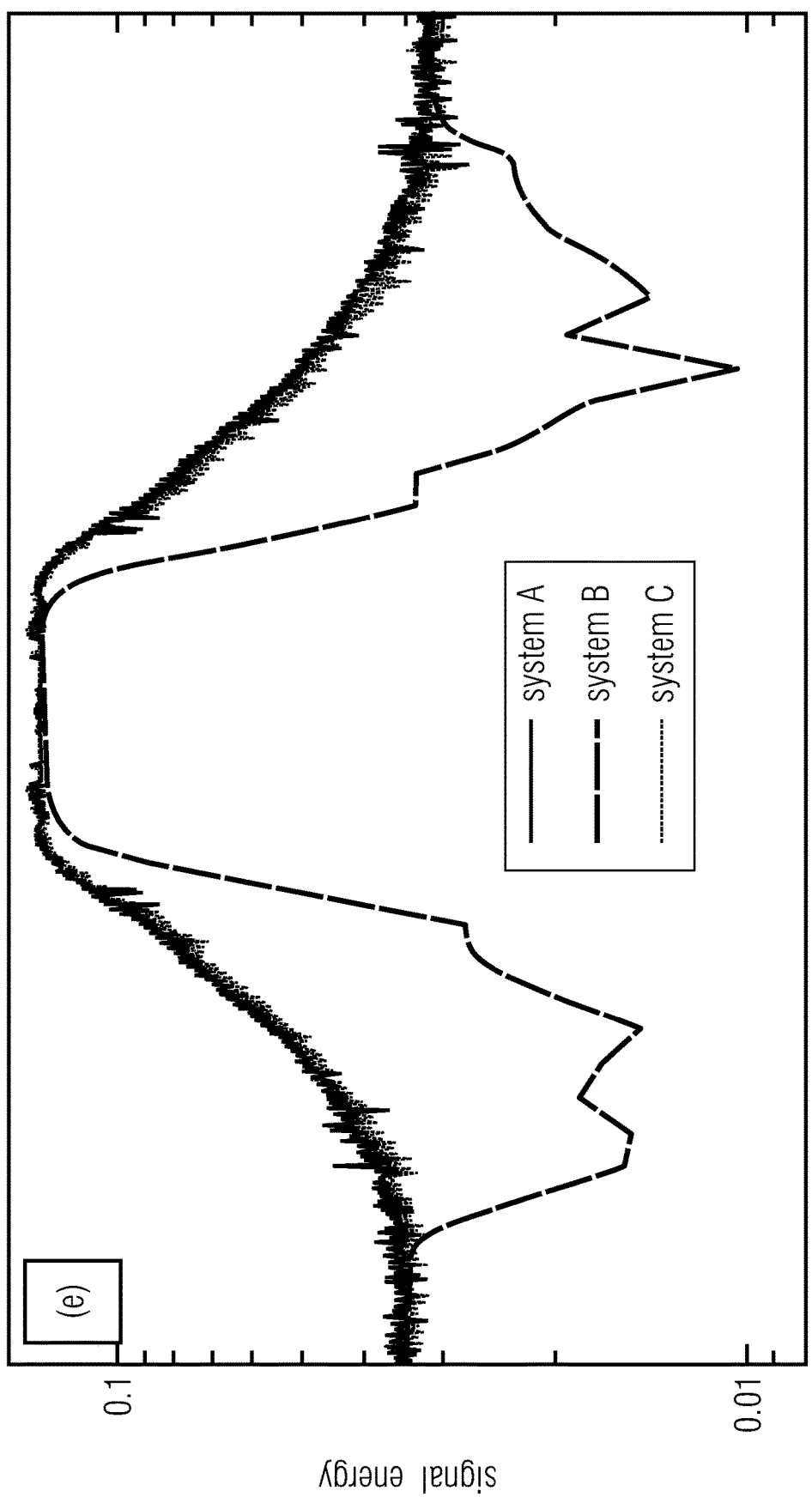
Figure 8:
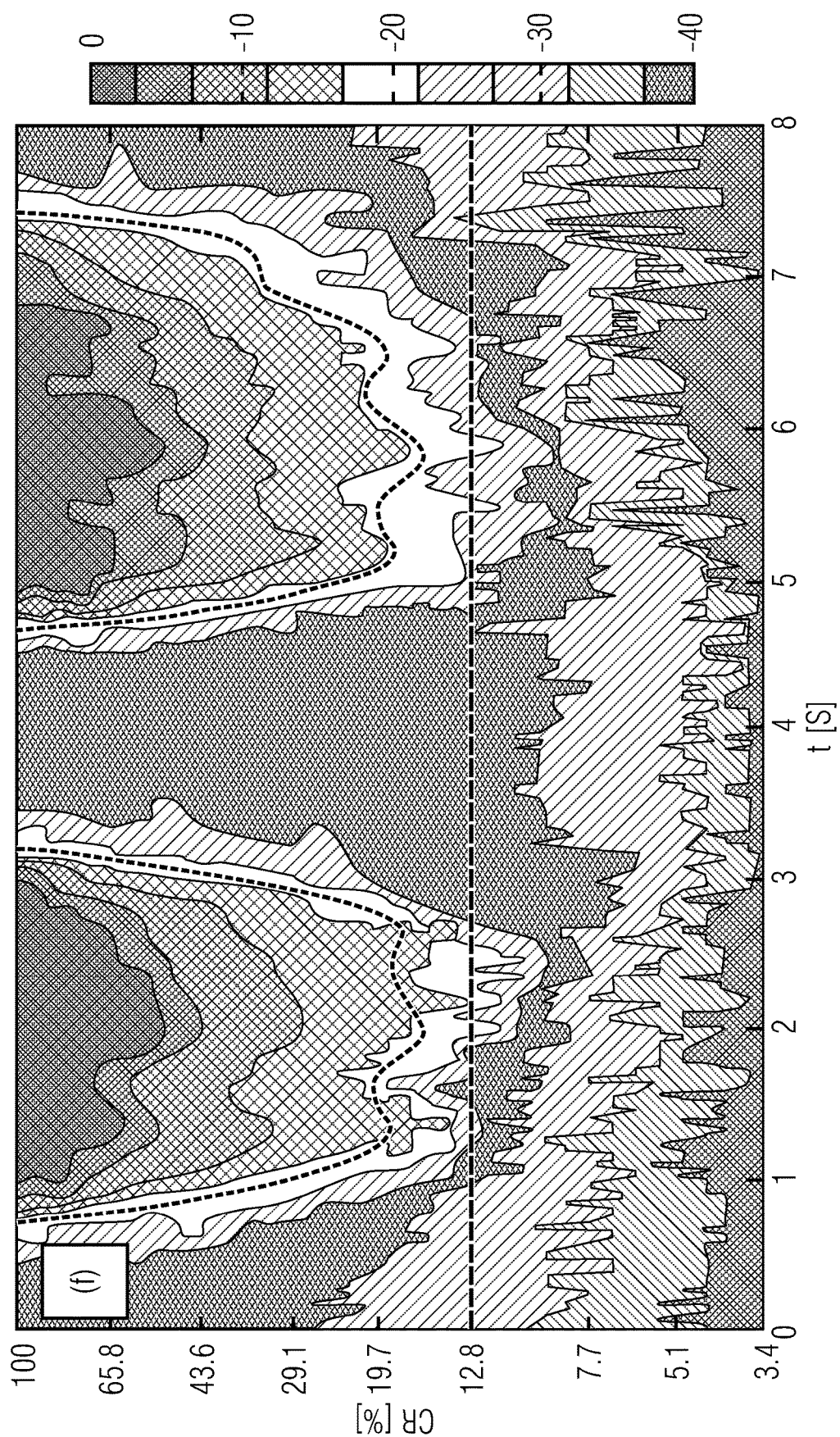

The measurement was conducted in a laboratory room, filled with large amounts of structures and objects, to produce uncontrolled multipath components, which can be seen in FIG. 8. By accessing the WiFi bands during measurements, model mismatch, due to RF interference, was introduced. We expect both methods to measure the channel IR properly during immobility and to see the MSM fail during phases of movement due to excess Doppler shift.

6. Evaluation

Three systems are compared (acc. to Sec. 5) based on noisy measurement data, which are parameterized such that their hardware implementation effort is comparable:

system A—Ground truth (according to MSM of Sec. 3) with Ŝ=1 ($\hat{f}_S$=2.25 MHz), yielding≈550 IRF/s.

system B—The MSM with Ŝ=116 ($\hat{f}_S$=19.40 kHz), yielding≈4.74 IRF/s. and system C—The proposed architecture with S=117 ($f_S$=19.20 kHz), yielding≈36.60 IRF/s for M=525 (CR of 12.82%). K=41 components (sparsity≈1, estimated from ĥ of system A) were recovered using omp, which does not need selecting any noise regularization parameter. Table 1 details on quantiles of observed system model μ(A) self-coherence, as defined in [106]:

TABLE 1

Histogram on observed self-coherence of system matrix A

| Quantile < | 0.9 | 0.99 | 0.999 | 0.9999 | 0.99999 | max |
|---|---|---|---|---|---|---|
| μ(A) ≤ | 0.083 | 0.130 | 0.166 | 0.196 | 0.223 | 0.300 |

FIG. 8 shows results of this evaluation over measurement time t (x-axis of all plots). In plots (a) to (c) the relevant ground-truth radargram section of 27.10 ns of system A, system B and system C are shown, which all exhibit almost identical $f_S$ and hardware complexity.

Plot (e) depicts the total IRF energy over time for the three systems. Once the relative motion v(t) exceeds $v_{max}$ (i.e., during the transitions), it can be seen that the IRF collected by system B possesses much lower energy compared to system A and C. The radargram of system B also shows leakage of energy into other delay taps, which is the expected outcome from losing correlation coherency. Plots (c) and (e) confirm that coherency is maintained and $v_{max}$ is not exceeded for system C.

Plot (d) shows the trajectory s(t) of the measured LOS scenario and its relative movement speed $v(t)=\dot{s}(t)$, which determines the Doppler properties acc. to (3) for the different systems. To derive s(t), a set of points $(t, T_0 \cdot \text{argmax}_i |h_t[i]|)$ is determined for every t-th IRF of system A, where t refers to the center of the IRF's observation time frame. These points are then low-pass-filtered to yield an estimate of s(t) from the measured data of system A. In a similar fashion to s(t) the signal peak amplitude a(t) can be derived from the set of points $(t, \max h_t)$. Combining both it is possible to define a Reconstruction Error Metric (REM) ε considering both delay- and amplitude errors:

$$\epsilon_t = (s_X(t)-s(t)+|a_X(t) \cdot a(t)^{-1}-1|) \quad (2.8)$$

where X is to be replaced by the system indicator.

TABLE 2

Evalation results.

| | |
|---|---|
| (a) | system A - Ground truth acc. to MSM (Sec. 3) with Ŝ = 1 |
| (b) | system B - Results for the MSM (Sec. 3) with Ŝ = 116 |
| (c) | system C - The proposed method (Sec. 4) with S = 117 |
| (d) | Trajectory of moving LOS scenario according to Sec. 5.1 |
| (e) | Signal energy in h for case (a), ĥ for cases (b) and (c) |
| (f) | REM ε for system C at different CR choices in [dB]. |

(a) to (c) show 27.10 ns of 444 ns

Plot (f) concludes with a phase diagram showing $\epsilon_t$ of (2.8) for system C at different choices of CR. The best system was identified by a total error metric $\text{argmin}_{C_r} \int \epsilon_{C_r}(t) dt$, and defined as system C as well as indicated in the plot by the red dashed line. The solid red line indicates the Doppler limit of (2.3) projected onto the CR. Once the Doppler limit is exceeded, the proposed method also fails to correctly reconstruct the scenario. This can be attributed to model mismatch. Also, the reconstruction is more robust for higher signal strength as is indicated by plot (f) around t=4s, where reliably a lower CR can be chosen than for the borders of the plot.

7. Conclusion

Compared to previous PN-based architectures, the proposed architecture makes better use of the received signal's energy, hence allows reconstructing the channel IR from fewer observations. While maintaining the low complexity of the MSM hardware frontends [117], adaptive control of key measurement parameters is possible, which allows trading IR measurement rate for Doppler range tolerance. Considering advances in integrated technology [110, 108], the proposed architecture is well suited for demonstration in integrated circuit technology.

The simulative evaluation, that was carried out on real channel data, concluded that for improving the recovery performance according to CS theory, good conditioning of the system matrix A=Φ·D is to be investigated further [104, 116]. Self coherence in the signal model matrix degrades reconstruction performance and can in most parts be attributed to the measurement matrix design. But since hardware complexity is of great concern, dense measurement matrices are not desirable. Future research may investigate on strategies for choosing good design parameter, in relation to Galois Field theory.

REFERENCES

[101] J. Ender, "On compressive sensing applied to radar," *Signal Processing*, vol. 90, no. 5, pp. 1402-1414, 2010.

[102] R. Baraniuk and P. Steeghs, "Compressive radar imaging," in *Radar Conference, 2007 IEEE*. IEEE, 2007, pp. 128-133.

[103] M. Lustig, D. L. Donoho, J. M. Santos, and J. M. Pauly, "Com-pressed sensing MRI," *IEEE Signal Processing Magazine*, vol. 25, no. 2, pp. 72-82, 2008.

[104] M. F. Duarte, M. A. Davenport, D. Takhar, J. N. Laska, T. Sun, K. E. Kelly, R. G. Baraniuk, et al., "Single-pixel imaging via compressive sampling," *IEEE Signal Processing Magazine*, vol. 25, no. 2, pp. 83, 2008.

[105] S. Semper, J. Kirchhof, C. Wagner, F. Krieg, F. Roemer, A. Os-man, and G. Del Galdo, "Defect detection from 3d ultrasonic measurements using matrix-free sparse recovery algorithms," September 2018.

[106] T. Zhou, C. Tao, S. Salous, L. Liu, and Z. Tan, "Channel sounding for high-speed railway communication systems," *IEEE Communications Magazine*, vol. 53, no. 10, pp. 70-77, October 2015.

[107] J. Sachs, *Ultra-Wideband Radar*, chapter 4, pp. 363-584, John Wiley & Sons, Ltd, 2012.

[108] J. Sachs, P. Peyerl, and M. Rossberg, "A new UWB-principle for sensor-array application," in *IMTC/99. Proceedings of the 16th IEEE Instrumentation and Measurement Technology Conference (Cat. No.99CH36309)*, May 1999, vol. 3, pp. 1390-1395 vol.3.

[109] Gal Itzhak, Noam Wagner, and Eli Shoshan, "A sub-nyquist radar prototype: Hardware and algorithms," *IEEE Transactions on Aerospace and Electronic Systems, special issue on Compressed Sensing for Radar*, August 2012.

[110] M. Mishali and Y. C. Eldar, "Sub-nyquist sampling," IEEE Signal Processing Magazine, vol. 28, no. 6, pp. 98-124, Nov 2011.

[111] T. Thiasiriphet, M. Ibrahim, and J. Lindner, "Compressed sensing for uwb medical radar applications," in *2012 IEEE International Conference on Ultra-Wideband*, September 2012, pp. 106-110.

[112] D. L. Donoho, "Compressed sensing," *IEEE Transactions on Information Theory*, vol. 52, no. 4, pp. 1289-1306, April 2006.

[113] E. J. Candes and T. Tao, "Near-optimal signal recovery from random projections: Universal encoding strategies?," *IEEE Trans. Inf. Theor.*, vol. 52, no. 12, pp. 5406-5425, December 2006.

[114] J. A. Tropp, J. N. Laska, M. F. Duarte, J. K. Romberg, and R. G. Baraniuk, "Beyond Nyquist: Efficient sampling of sparse bandlimited signals," *IEEE Transactions on Information Theory*, vol. 56, no. 1, pp. 520-544, 2009.

[115] J. N. Laska, S. Kirolos, M. F. Duarte, T. S. Ragheb, R. G. Baraniuk, and Y. Massoud, "Theory and implementation of an analog-to-information converter using random demodulation," in 2007 *IEEE International Symposium on Circuits and Systems*, May 2007, pp. 1959-1962.

[116] M. Rani, S. B. Dhok, and R. B. Deshmukh, "A systematic review of compressive sensing: Concepts, implementations and applications," *IEEE Access*, vol. 6, pp. 4875-4894, 2018.

[117] Y. Eldar and G. Kutyniok, *Compressed Sensing: Theory and Applications*, Cambridge University Press, January 2012.

[118] C. Wagner and S. Semper, "Fast linear transformations in python," *arXiv preprint arXiv:*1710.09578, 2017.

[119] T. E. Oliphant, *A guide to NumPy*, vol. 1, Trelgol Publishing USA, 2006.

[120] Y. C. Pati, R. Rezaiifar, and P. S. Krishnaprasad, "Orthogonal Matching Pursuit: recursive function approximation with appli-cations to wavelet decomposition," in *27th Asil. Conf. Signals, Systems Comp.*, November 1993.

[121] D. V. Sarwate and M. B. Pursley, "Crosscorrelation properties of pseudorandom and related sequences," *Proceedings of the IEEE*, vol. 68, no. 5, pp. 593-619, May 1980.

[122] T. Chernyakova and Y. C. Eldar, "Exploiting fri signal structure for sub-nyquist sampling and processing in medical ultrasound," in 2015 *IEEE International Conference on Acoustics, Speech and Signal Processing (ICASSP)*, April 2015, pp. 5947-5951.

[123] A. Kulkarni and T. Mohsenin, "Low overhead architectures for omp compressive sensing reconstruction algorithm," *IEEE Transactions on Circuits and Systems I: Regular Papers*, vol. 64, no. 6, pp. 1468-1480, June 2017.

[124] P. Galajda, S. Slovak, M. Sokol, M. Pecovsky, and M. Kmec, "Integrated m-sequence based transceiver for uwb sensor networks," *Radioengineering*, vol. 27, pp. 175-182, April 2019.

Implementation Considerations for Improved Computational Performance

Utilizing Matrix Free Representations for the Linear Model

In the context of this architecture, when choosing the type parameters of the Sequence generators 1 (7) and 2(8) and the divider factor (5) properly, we can achieve several optimizations. Compared to an implementation using prior--art technique, it is possible to reduce the computation complexity of the reconstruction step (15) significantly, when exploiting the structure of the proposed hardware architecture also in the mathematical model.

The system model matrix $A = \Phi \cdot D$ can be regarded as a direct transformation between the observed measurement vector b (29) and the impulse response vector $\tilde{h}$ (30). A is dense and its elements appear randomly upon first glance, giving no indication of structure that can be exploited computationally. However, analyzing the two matrices $\Phi$ and D, the inventors have understood that these matrices indeed contain structure and special properties that can be utilized to reduce the computation effort needed to compute $A \cdot \tilde{h}$.

To exploit this embedded structure within the matrices $\Phi$ (33) and D (32), it is needed to not only consider their numeric representation as dense rectangles (e.g. squares) of numbers, but also as an operator, that expresses the effect of the matrix when applied to a vector as a Matrix-Vector product. Throughout the whole document, both the dense numeric representations as well as the operator representation (that may be factorized into a sequence of equivalent consecutive operations) will be used interchangeably. However, to maintain clarity, the blocks (13) and (14) provide the operators Φ (33) and D (32) as well as their numeric representations, such that the reconstruction (15) may make use of either representation variants.

Both Φ and D contain some embedded structure that can be harnessed for benefits in computation complexity. By using their forward (A·x) and backward ($A^H$·x) Matrix-Vector operators wherever applicable instead of the dense numerical representation, these benefits can take effect. This technique may be referred to as a matrix-free implementation of the algorithm, since it is no longer needed to store dense numeric representations of the operators. Instead, it is sufficient to encode the structure of the matrix within the algorithms that provide the operators and to parameterize it accordingly such that the operators represent the effect of the desired matrix when applied on a vector.

Therefore, the reconstruction block (15) can be implemented such, that matrix-free operators can be utilized. The mentioned candidates for the choice of the reconstruction algorithm (15), OMP, ISTA and FISTA, all can be implemented in a way that they make use of forward or backward projections (Matrix-Vector products) only. In the case of OMP, it is possible to formulate the algorithm such that it solely relies on iterative Rank-1 updates [1], minimizing the number of needed such projections to a total of two (one forward and one backward) for each per degree of sparsity in h.

For many types of structured or sparse matrices, efficient algorithms exist. The algorithms implementing their forward and backward projections often utilize repetitions within the matrix structure such that the total amount of needed computations is reduced. But also the storage requirements are often drastically reduced, since the parameterization needed to make one of these projections represent one particular matrix is often much smaller than the numeric representation of that matrix. This allows to reduce the computation and storage complexity below the well-known bound $O(N^2)$ for dense numeric Matrix-Vector products.

The following is a discussion of conventional technology:
In the case of the Fast Fourier Transform (FFT) or the Fast Hadamard Transform (FHT) (also known as Fast Walsh Transform (FWT)), the underlying matrix structure can be expressed in terms on many smaller layers of butterfly structures, that represent smaller embedded transformations, repeating throughout to matrix in potentially several patterns.

In fact, using Flexible Multilayer Sparse Approximations (FMSA) [203] it is possible to represent a matrix as a factorization into a set of multiple sparse matrices, whose product (repeated matrix-matrix product) is equivalent to the original matrix. Especially if the matrix is large and dense, this can lead to a tremendous saving in computations:

Consider the example of a fifth-order Hadamard Matrix $H_5 \in \mathbb{R}^{32\times 32}$ that can be factorized into five layers of sparse matrices $S_i \in \mathbb{R}^{32\times 32}$ for i=1 ... 5 as $$H_5 = \prod_{i=1}^{5} S_i.$$

The Matrix-Vector product $H_5$·x needs 988 additions/subtractions (32·31) to calculate the effect of the 1.024 elements of values [+1,−1] in $H_5$. On first glimpse, the trade against five matrix of similar size may appear bad. However, since each of the $S_i$ only contains 64 non-zero elements, needing only 32 operations per layer, totaling 160 operations for the full Matrix-Vector product, which is a saving of more than 83% of the otherwise needed computation resources.

The FSMA model, as introduced in [203], can be applied to other types of structured matrices as well. Either serving as an exploration agent, revealing the hidden structure to exploit computationally, or by revealing approximations that can be even more computationally efficient, if some amount of calculation error is tolerable.

Especially as the size of the linear model grows and in real-time high-speed measurement applications, the benefits of both aspects, the matrix-free implementation and Multilayer Sparse Representations (Approximations) become crucial as the considerable benefits they provide often decide whether a hardware-based compressive acquisition approach is feasible at all.

Modelling the linear transformation block for the transmit signal base

Maximum-length sequences (M-sequences), which are sequences that repeat within a finite number of steps, can be generated efficiently in hardware by employing Linear Feedback Shift Registers (LFSR), that are parameterized from the specification of a characteristic polynomial that determines the actual M-sequence. If synchronous operation is needed, the Parameterization may include the definition of the initial state of the register.

In an embodiment of our architecture, The Sequence Generator 1 (7) is chosen to be implemented as such a LFSR and is parameterized by a characteristic polynomial by the Sequence 1 Definition Parameter (16) to generate a maximum length sequence (M-sequence) as transmit signal x(t) (23).

Since the transmit sequence (23) is a linear recurring sequence (which an M-sequence is), it is possible to formulate the Linear transformation block (13) for the signal base D (32) in a matrix-free notation exploiting the fast m-Transform as introduced in [202]. The fast m-Transform is a particular Multilayer Sparse Representation of a circular convolution operator that is derived from a linear recurring sequence.

The transmit signal base operator D (32) was introduced as a Circulant Matrix earlier and was also shown to be efficiently representable by two FFT operators and one Diagonal Matrix, resulting in lower computation complexity. In the special case of a linear recurring sequence, where the m-Transform is applicable, D (32) can be a factorization into the product $$D = P_1 \cdot H_L \cdot P_2 = P_1 \cdot \left(\prod_{i=1}^{L} S_i\right) \cdot P\_2,$$

needing only $L \cdot 2^L$ additions for one full Matrix-Vector product, which is considerably less than the $2^{2 \cdot L}$ additions that are needed when considering the dense representation of D (32).

Implementing the operator D (13, 32) using the Fourier convolution approach, results in an estimated $4 \cdot 2^L - 2 \cdot L^2 - 4$ additions and multiplications each. Although, the Fourier approach needs less arithmetic operations in total, multiplications are considerably more expensive in terms of chip die area, power consumption and slower in processing speed, when compared against full-adder.

Therefore, one can use a permutation of the Hadamard Matrix as sparsity-promoting convolutional signal basis for M-Sequence signals, that are generated from a Linear Feedback Shift Registers. This allows to greatly reduce the computation complexity, especially for integrated implementations, when compared against dense matrix dot product with $O(N^2)$, or the fast convolution using the Fast Fourier Transform (FFT), needing two FFT operations of $O(N \cdot \log(N))$ each per transformation. The notation $O(\cdot)$ refers to the common concept of time-complexity (the "big-O notation") and is used as a relation to implementation effort. In most cases, memory and gate-level complexity behaves similar to $O(\cdot)$, unless noted specifically. Furthermore, the FHT only needs additions and subtractions in contrast to the FFT, adding to the savings in implementation effort due to the greatly reduced complexity in terms of needed logic gate count (for integrated designs). This naturally impacts all aspects of large-scale silicon integration, such as area usage, power consumption and propagation delay (which directly affects maximum operation speed and system throughput)

Modelling the Linear Transformation Block for the Sampling Operation

Since only S out of N elements of x are observed for each of the M observations in b, the Measurement Matrix $\Phi$, having M rows can contain only contain M·S nonzero elements. This reduces the computation effort to $O(M \cdot S)$ operations instead of $O(M \cdot N)$ when compared to a dense product of a full matrix.

By choosing the Sequence Generator 2 (8) also as a LFSR with some arbitrary characteristic polynomial while fulfilling the aforementioned conditions, it is possible to derive another Multilayer Sparse Representation for the sampling operator $\Phi$ (14), (33), which can be derived using the method described in [203]. The multiple sparse layers in the factorization of $\Phi$ yield benefits by combining partially similar operations to reduce the overall amount of needed additions and subtractions.

Another variant of constructing $\Phi$ is to choose another M-Sequence of order $L_2 > \log_2(2 \cdot S)$ as the Mixing Signal (25). The length of this sequence has to be different to any integer multiple of the Sample Clock Divider Factor S (17), to avoid repeating linear combinations in the observations. At the core of the Multilayer Sparse Representation of $\Phi$ now sits another m-Transform $M_2$, based on the characteristic polynomial of the Sequence Generator 2 (8) as defined in the Sequence 2 Definition Parameter (18).

Since the columns of $M_2$ are mostly incoherent (due to the choice of another M-sequence of short length as Mixing Signal (25)), each piece of the Mixing Signal sequence will be mapped to another portion of the corresponding instance of the delayed transmit signal (being orthogonal to other piecewise instances of that signal with different relative delays to the transmit signal). This way, $M_2$ acts in a way that enforces mutual incoherency of the piecewise linear combinations of the sampling operation.

To both sides of $M_2$, layers of sparse matrices result in mapping the Portions of the Mixing Signal (25), as located in $M_2$, to the locations in $\Phi$ (33), where the piecewise consecutive sampling is located. Due to the smaller length and the promoted incoherent sampling, this approach yields lower amounts of computations in the Multilayer Sparse Representation of $\Phi$, however, finding a suitably matching choice for Mixing Signal (25) and Sample Clock Divider Factor S (17) is tricky and cannot be found.

FIG. 10

FIG. 10*i* shows a conceptual example of use of the sparse representation operators instead of plain matrixes. Accordingly, the apparatus 100 uses less computational effort (as discussed above). Models D and $\Phi$ are shown as matrices at step 1000. At 1002, sparse representation operators are obtained, which describe the models D and $\Phi$. At 1004, the sparse representation operators are either stored in some storage unit of the apparatus 100 (or at disposal of the apparatus 100), or are directly integrated into the design of the apparatus 100 by specialized processing units that carry out the function of the sparse representation operators in parallel, sequentially (pipelined) or iteratively. In an example design, the representations may very well be realized as some form of equivalent integrated sea of logic gates in integrated technology. However, in direct-logic implementations, care has to be taken to maintain the flexibility of adapting the specialized processing units to operate for different parameterizations (16), (17), (18) and (19). At 1006 (e.g. at block 15), the apparatus 100 minimizes the sparsity-promoting function g (see above in correspondence of formula (19)), based on a behavioural model (e.g. A=$\Phi \cdot$D), which is obtained from the sparse representation operators describing the models D and $\Phi$, but without normal matrix operations. Instead, algorithms like OMP, FISTA and ISTA may be used. The minimization of the sparsity-promoting function g has to be repeated when some parameter changes in (16), (17), (18), (19) or (22) affect the operators D (32) or $\Phi$ (33) and the processing systems that are used for computing the forward and backward transforms have to be reconfigured accordingly. However, this update is only needed for parameter changes.

[201] Y. C. Pati, R. Rezaiifar, and P. S. Krishnaprasad, "Orthogonal Matching Pursuit: recursive function approximation with applications to wavelet decomposition," in 27th Asil. Conf. Signals, Systems Comp., November 1993

[202] E. S. Sutter, "THE FAST m-TRANSFORM: A FAST COMPUTATION OF CROSS-CORRELATIONS WITH BINARY m-SEQUENCES" (attached)

[203] L. L. Magoarou, "Flexible Multilayer Sparse Approximations of Matrices and Applications", IEEE Journal of Selected Topics in Signal Processing, Vol. 10, June 2016 (attached)

[204] [18] C. Wagner and S. Semper, "Fast linear transformations in python," arXiv preprint arXiv: 1710.09578, 2017.

Some Summarizations on the Techniques Above

By virtue of the above, it is now possible to completely grasp several possibilities that are provided by the present examples. The first sequence (sequence 1) generated by block 7 is associated with the first linear model (e.g. matrix D, 32), and the second sequence (sequence 2) generated by block 8 is associated with the second linear model (e.g. the matrix $\phi$, 33). The estimate 30 of the impulse response is obtained by a relationship between the plurality of sample values (b, 29), the first linear model (D, 13) and the second linear model ($\phi$, 33). When the first and second linear models are matrixes (D, $\phi$), the product A=D·$\phi$ of the matrixes is a behavioral model matrix (in some examples, the columns are so that any subset of up to K columns is linearly independent, K being a number of unknown values of the impulse response to be determined). In particular, a sparsity-promoting function g may be minimized (e.g. g being the argmin in formula (19)), under the condition that a product of the behavioral model matrix A and the reconstructed impulse response vector (b, 29) approximates (or equals) the sample vector (12, b) defined by the plurality of samples obtained by the AIC 200.

However, it has been explained above that it is not necessary that matrixes are actually stored or computed, and it is in particular not necessary that lines-times-column multiplications are performed. For example, the first and second linear model may be embodied, for examples, by operator(s), such as Hadamard matrixes (or Hadamard transforms) and/or sparse representations.

For example, the first and/or the second linear model may be embodied by (or include) a sparse representation operator (sparse permutation matrix), representing a sparse matrix whose values are either 1s or 0, but the 0s overwhelm the 1s (e.g., there are much more 0s than 1s). (In some examples, the plurality of 1s may be substituted by a plurality of entries with the same value). Notably, an automated system (e.g. a processor operating block 15) may simply store, in few memory locations, only the position of the 1s in the sparse matrix, instead of storing the complete matrix (which would involve storing many 0s in many memory allocations). Moreover, when performing multiplications (e.g., those implied by formula (19)), the multiplications by 0 may simply be avoided, thus resulting in a reduced amount of computations. E.g., the processor is not requested to actually compute several 0·number operations, and is also not requested to perform several 0+0 . . . +0 operations, but simply looks at the presence of a 1 or a 0 in an entry of the matrix, thus speeding up the whole computations.

As explained above (e.g. step 1002 in FIG. 10, following the step 1000 in which the matrixes D and φ are conceived), the sparse representation operator may be obtained by a matrix factorization such that D=P1·H·P2, where:

P1 and P2 are sparse representation operators (the matrixes above having only 1s and 0s);

H is a Hadamard matrix or a product of a Hadamard matrixes (or a Hadamard transform or a product of Hadamard transforms).

The Hadamard matrix may be a matrix having only +1s or −1s in its entries. The rows may be orthogonal with each other (the same my apply to the columns). A set of Hadamard matrixes may be pre-defined and known a priori (e.g. stored in a non-volatile memory).

In order to obtain the factorization D=P1·H·P2 and/or φ=P1·H·P2 (with P1 and P2 sparse permutation matrixes, and H Hadamard matrix or product of Hadamard matrixes), techniques known as OMP, ISTA, FISTA, etc. may be used.

On the other side, it is possible to make use an M-sequence [e.g. maximum-length sequence] for representing another model (e.g. for representing φ)).

Figure 10:
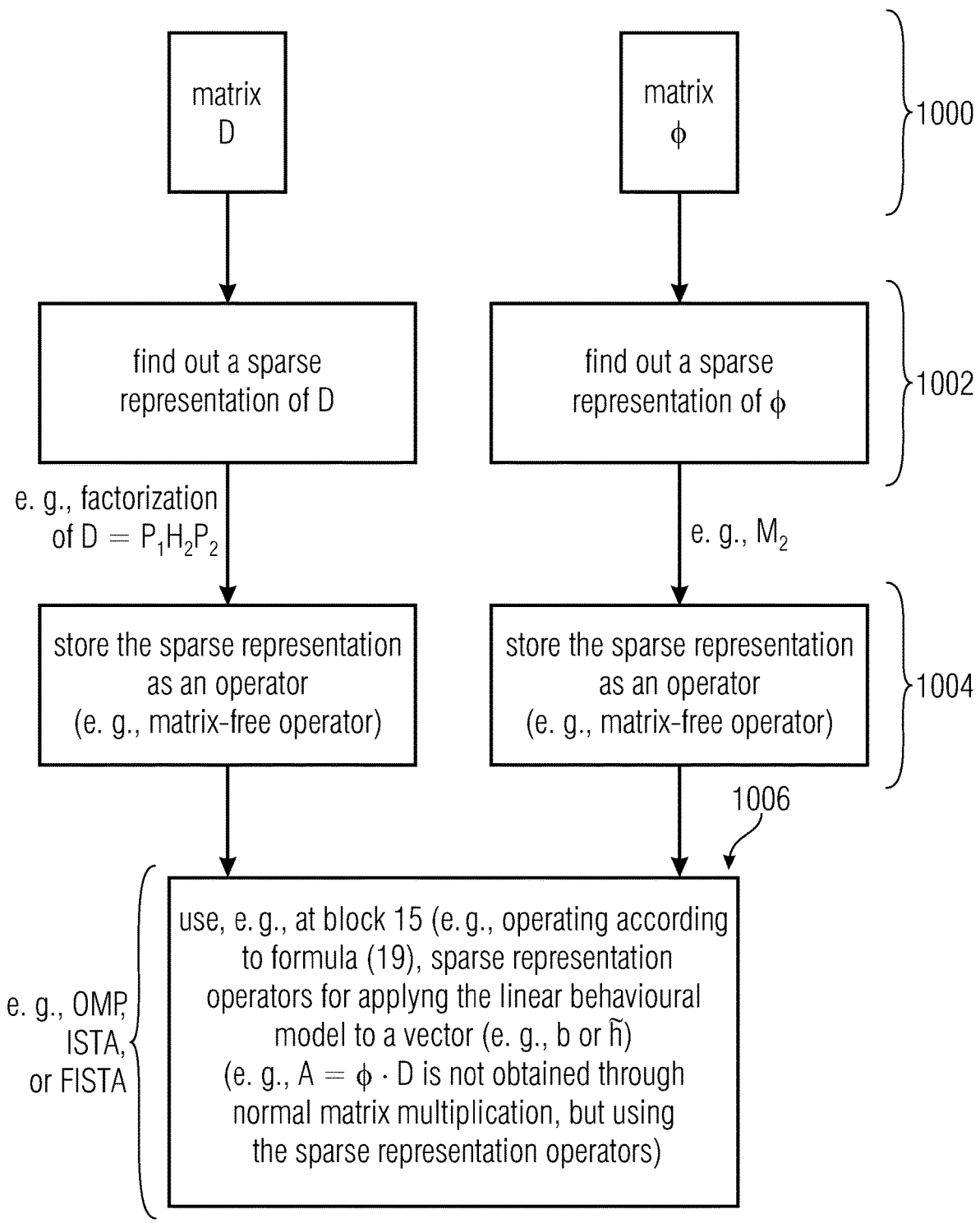
FIG. 10 shows a conceptual diagram according to a proposed technique.

FIG. 10 shows that, after step 1002, step 1004 is performed. Here, the sparse representation (e.g., P1, P2 or the m-transform) may be stored as an operator (the so-called "matrix-free operator") which embodies the model. As explained above, less memory is needed for storing the operator, and less calculations are needed for the computations.

FIG. 10 also shows step 1006 in which, e.g. by block 15 (and/or by operating according to formula (19)), the sparse representation operators are used for applying the linear behavioral model to a vector (e.g. b or h).

For example, A=D·φ may be obtained, instead of relying on matrix multiplications, by using the sparse representation operators. As explained above, by virtue of factorizations like D=P1·H·P2 (and by virtue of P1 and P2 being sparse and H being a Hadamard matrix or a product of multiple Hadamard matrixes) or of m-transforms, it is obtained that less multiplications and less additions are performed by a processor (by virtue of skipping many multiplications and many additions), hence reducing the effort for the processor.

Hence, it is possible to obtain the estimate 30 of the impulse response of the linear system based on knowledge of the behavioral model [e.g. a matrix or at least one of the first and second sparse representation operators] based on the first and second linear models [e.g. based on the sparse representation operators based on the sparse representations of at least one of the first and second linear models]. This result may be obtained by minimizing a sparsity-promoting function that maps its argument to a scalar number which represents the degree of sparsity, under the condition that: the application of the linear behavioral model to the reconstructed impulse response vector approximates or equals a sample vector defined by the plurality of samples; and/or the application of the linear behavioral model to a sample vector defined by the plurality of samples approximates or equals the reconstructed impulse response vector.

Hence, even when sparse representation operators are used, formula (19) may actually be used: however, at least an advantage lies in that that a considerable number of multiplications and additions are not performed, hence reducing the whole number of computations.

The Example of FIG. 10

Figure 9:
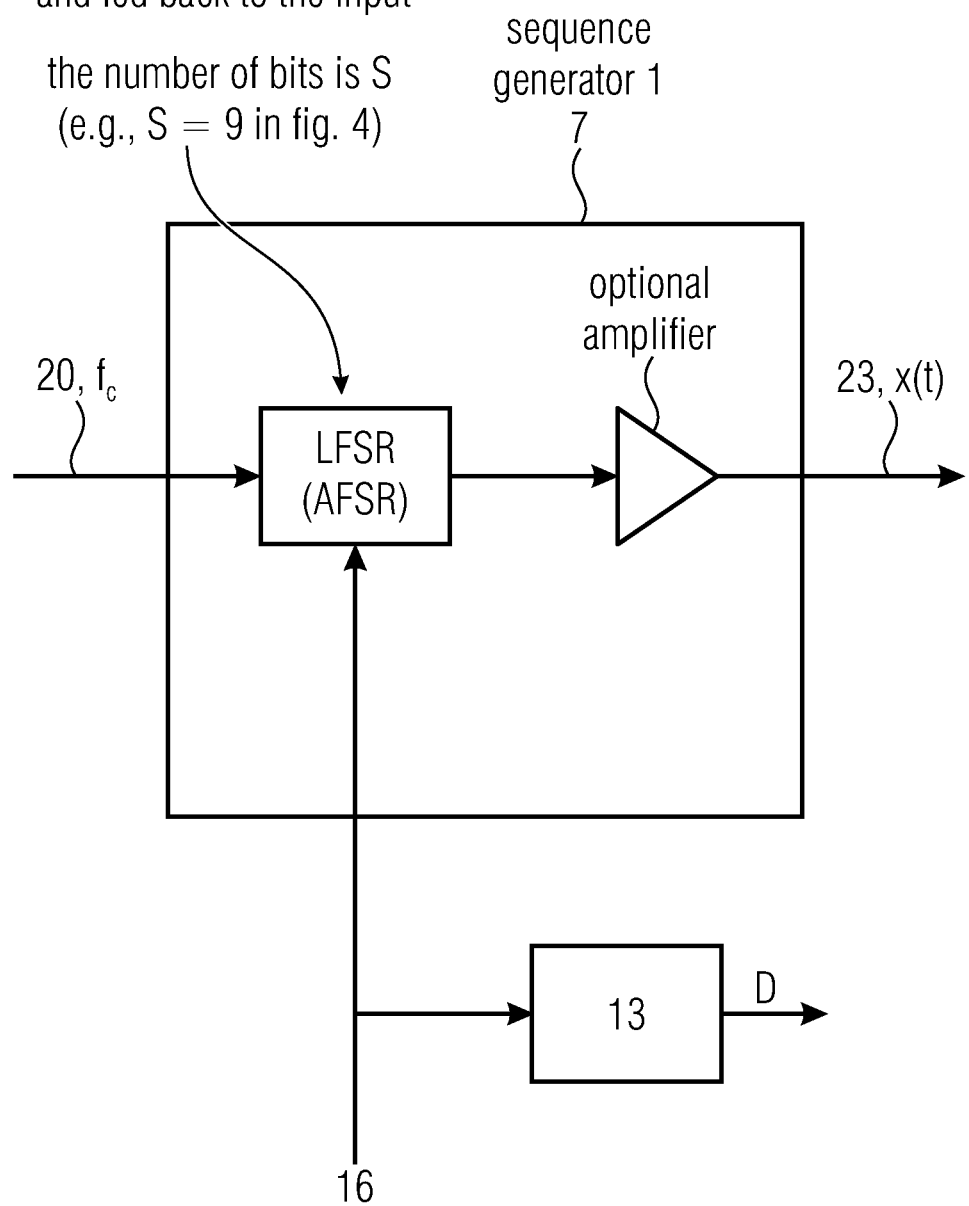
FIG. 9 shows a possible example of an element of FIG. 2

FIG. 9 shows an example of block 7 (sequence generator 1) that may be used (other techniques may notwithstanding be implemented). As can be seen, the above-discussed sequence 23, mathematically expressed as x(t), is obtained from a LFSR or AFSR block or DSFR block (as in linear, analog or digital feedback shift register), which are as such known. The LFSR or ASFR or DSFR may be a maximal length shift register with output summed modulo 2 ("XORed"). An input of the LFSR or ASFR may be the sequence 1 definition parameter 16 (see above). Another input of the LFSR or ASFR may be the clock signal 20 ($f_C$), for timing (FIG. 9 also shows that the sequence 1 definition parameter 16 is also input to block 13, similarity to what shown in FIG. 3). An optional amplifier (e.g. downstream to the LFSR or AFSR or DSFR) may also be used, so as to provide the sequence 23 appropriately. By using the LFSR or ASFR or DSFR, the periodical sequence 23 may be used bade on the sequence 1 definition parameter 16.

In some examples, the sequence generator 2 block 8 may operate accordingly (in that case, the clock signal 20 is provided to the LFSR or ASFR or DSFR, but the parameter 16 is substituted by the sequence 2 definition parameter 18 as shown in FIG. 2; moreover, a frame clock signal 22 is provided for resetting the sequence).

An Application for Measuring Reflection Properties

An application of present examples is here discussed for measuring reflection properties in an electromagnetic medium. The receive signal (24) may be, or may be associated with, a reflected (e.g. by the electromagnetic medium that is subject to the transmission) version of the transmit signal (23). It is possible to measure the reflection properties on the basis of the estimate (30) of the impulse response. The apparatus may be connected to the electromagnetic medium by means of a directional coupler. The apparatus may couple the electromagnetic waves originating in the transmit signal (23) of the apparatus (100) into the electromagnetic medium, causing a propagation of the transmit signal (23) into the electromagnetic medium. The apparatus may couple the electromagnetic waves from reflections of the transmit signal (23), that have occurred within the electromagnetic mediums, and that are propagating in the direction of the apparatus (100), into the receive signal (24) of the apparatus (100). The apparatus may be configured to measure the reflection properties on the basis of the estimate (30) of the impulse response. The electromagnetic medium may be a cable or transmission line or a combined network of either. The linear system may be associated with a cable or transmission line or a combined network of them.

However, the invention may also found different applications, and the signals 23 and 24 may have different use.

Other Examples

Moreover, features and functionalities disclosed herein relating to a method can also be used in an apparatus. Furthermore, any features and functionalities disclosed herein with respect to an apparatus can also be used in a corresponding method. In other words, the methods disclosed herein can be supplemented by any of the features and functionalities described with respect to the apparatuses.

Also, any of the features and functionalities described herein can be implemented in hardware or in software, or using a combination of hardware and software, as described below.

Depending on certain implementation requirements, examples may be implemented in hardware. The implementation may be performed using a digital storage medium, for example a floppy disk, a Digital Versatile Disc (DVD), a Blu-Ray Disc (registered trademark), a Compact Disc (CD), a Read-only Memory (ROM), a Programmable Read-only Memory (PROM), an Erasable and Programmable Read-only Memory (EPROM), an Electrically Erasable Programmable Read-Only Memory (EEPROM) or a flash memory, having electronically readable control signals stored thereon, which cooperate (or are capable of cooperating) with a programmable computer system such that the respective method is performed. Therefore, the digital storage medium may be computer readable.

Generally, examples may be implemented as a computer program product with program instructions, the program instructions being operative for performing one of the methods when the computer program product runs on a computer. The program instructions may for example be stored on a machine readable medium.

Other examples comprise the computer program for performing one of the methods described herein, stored on a machine-readable carrier. In other words, an example of method is, therefore, a computer program having a program-instructions for performing one of the methods described herein, when the computer program runs on a computer.

A further example of the methods is, therefore, a data carrier medium (or a digital storage medium, or a computer-readable medium) comprising, recorded thereon, the computer program for performing one of the methods described herein. The data carrier medium, the digital storage medium or the recorded medium are tangible and/or nontransitionary, rather than signals which are intangible and transitory.

A further example comprises a processing unit, for example a computer, or a programmable logic device performing one of the methods described herein.

A further example comprises a computer having installed thereon the computer program for performing one of the methods described herein.

A further example comprises an apparatus or a system transferring (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example, a field programmable gate array) may be used to perform some or all of the functionalities of the methods described herein. In some examples, a field programmable gate array may cooperate with a microprocessor in order to perform one of the methods described herein. Generally, the methods may be performed by any appropriate hardware apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for estimating an impulse response of a linear system,
    wherein the apparatus comprises a measurement block configured to generate a transmit signal on the basis of a first sequence and to send the transmit signal onto the linear system,
    wherein the measurement block is configured to acquire a receive signal as a feedback from the linear system and to multiply the receive signal with a second sequence, to acquire a modified receive signal, wherein the second sequence is different from the first sequence,
    wherein the measurement block is configured to analog-to-digital convert, ADC, an integration result in order to acquire a sample value, the integration result being based on an integration of the modified receive signal over a period of time, and
    wherein the apparatus is configured to acquire an estimate of the impulse response on the basis of a plurality of sample values,
    wherein the first sequence and the second sequence are synchronized with each other and/or are generated from a common system clock signal and/or are synchronized with a common system clock signal,
    wherein the measurement block is configured to perform a clock division by dividing the common system clock signal by a first divider factor parameter to acquire a sampling clock signal to control the ADC conversion and/or to define the period of time of the integration of the modified receive signal,
    wherein the first sequence is associated with a first linear signal model, and the second sequence is associated with a second linear model, so as to acquire the estimate of the impulse response on the basis of a relationship between the plurality of sample values, the first linear signal model, and the second linear model,
    wherein the first linear model is described by a first sparse representation operator and the second linear model is described by a second sparse representation operator,
    wherein the first sparse representation operator is acquired through a factorization which involves at least one Hadamard matrix or Hadamard transform.

2. The apparatus of claim 1, configured to perform a clock division by dividing the common system clock signal, or a clock signal derived from the common system clock signal, by a second divider factor parameter, or a multiple of the second divider factor parameter, so as to acquire a frame clock signal to control the processing of the estimation of the impulse response and/or reset the generation of the second sequence.

3. The apparatus of claim 1, wherein the first sequence is generated based on at least one first sequence definition parameter and/or the second sequence is generated based on at least one second sequence definition parameter.

4. The apparatus of claim 1, comprising an automated logic configured to select at least one of the following parameters:
the first divider factor parameter;
the second divider factor parameter;
the first sequence definition parameter;
and the second sequence definition parameter.

5. The apparatus of claim 4, wherein the automated logic is configured to adaptively define at least one of the parameters based on at least one of a previous estimate, a priori knowledge about the linear system and linear system state information as acquired from other sources.

6. The apparatus of claim 5, wherein the automated logic is configured to define the at least one of the parameters on the basis of a Doppler resolution, ambiguity range, number of non-zero components in the system's impulse response.

7. The apparatus of claim 1, configured to measure a distance of an object, wherein the receive signal is, or is associated with, the reflected version of the transmit signal,
wherein the apparatus is configured to measure a distance of the object on the basis of the estimate of the impulse response.

8. The apparatus of claim 1, configured to measure transmission properties in an electromagnetic medium, wherein the receive signal is, or is associated with, a modified version of the transmit signal, wherein the apparatus is configured to measure the transmission properties on the basis of the estimate of the impulse response.

9. The apparatus of claim 1, configured to measure reflection properties in an electromagnetic medium, wherein the receive signal is, or is associated with, a reflected version of the transmit signal,
wherein the apparatus is configured to measure the reflection properties on the basis of the estimate of the impulse response,
wherein the apparatus is configured to couple the electromagnetic waves originating in the transmit signal of the apparatus into the electromagnetic medium, causing a propagation of the transmit signal into the electromagnetic medium,
wherein the apparatus is also configured to couple the electromagnetic waves from reflections of the transmit signal, that have occurred within the electromagnetic mediums, and that are propagating in the direction of the apparatus, into the receive signal of the apparatus,
wherein the apparatus is configured to measure the reflection properties on the basis of the estimate of the impulse response.

10. The apparatus of claim 1, wherein the linear system is associated with a cable or transmission line or a combined network of them.

11. The apparatus of claim 1, wherein at least one of the first and second linear models is a circulant linear model.

12. The apparatus of claim 1, wherein the calculation of at least one of the first and second sparse representation operators involves a factorization with at least one Hadamard transform or Hadamard matrix and at least one sparse permutation matrix.

13. The apparatus of claim 1, configured to acquire the estimate of the impulse response of the linear system based on knowledge of a linear behavioral model based on the first and second linear models, by minimizing a sparsity-promoting function that maps its argument to a scalar number which represents the degree of sparsity, under the condition that:
the application of the linear behavioral model to the reconstructed impulse response vector approximates or equals a sample vector defined by the plurality of samples; and/or
the application of the linear behavioral model to a sample vector defined by the plurality of samples approximates or equals the reconstructed impulse response vector.

14. The apparatus of claim 1, wherein at least one of the first and second linear models is described by a first and a second matrixes, wherein the product of the first and second matrixes form a linear behavioral model matrix, whose columns are such that any subset of up to K columns is linearly independent, wherein K is a number of unknown values of the impulse response to be determined.

15. The apparatus of claim 1, configured to generate at least one among the first sequence and the second sequence through a feedback shift register, or to generate the first sequence based on a maximum-length sequence (M-sequence).

16. The apparatus of claim 1, wherein the second sparse representation operator is acquired through a factorization which involves at least one Hadamard matrix or Hadamard transform.

17. The apparatus of claim 1, wherein at least one of the first and second sparse representation operators, or one term of their factorization, is an m-transform or comprises at least one term which is an m-transform, wherein the m-transform is a multilayer sparse representation of a circular convolution operator that is derived from a linear recurring sequence.

18. A method for measuring the impulse response of a linear system comprising:
generating a transmit signal on the basis of a first sequence, and sending the transmit signal onto the linear system;
acquiring a receive signal as a feedback from the linear system;
mixing the receive signal with another signal based on a second sequence;
analog-to-digitally, ADC, convert an integrated version of the mixed signal;
estimating the impulse response on the basis of a plurality of digital acquired signals,
wherein the first sequence and the second sequence are synchronized with each other and/or are generated from a common system clock signal and/or are synchronized with a common system clock signal,
wherein the method performs a clock division by dividing the common system clock signal by a first divider factor parameter to acquire a sampling clock signal to control the ADC conversion and/or to define the period of time of the integration of the modified receive signal,
wherein the first sequence is associated with a first linear signal model, and the second sequence is associated with a second linear model, so as to acquire the estimate of the impulse response on the basis of a relationship between the plurality of sample values, the first linear signal model, and the second linear model,
wherein the first linear model is described by a first sparse representation operator and the second linear model is described by a second sparse representation operator,
wherein the first sparse representation operators is acquired through a factorization which involves at least one Hadamard matrix or Hadamard transform.

19. A non-transitory storage unit storing instruction which, when executed by a processor, cause the processor to:

generate a transmit signal on the basis of a first sequence,
acquire a receive signal and to multiply the receive signal with a second sequence, to acquire a modified receive signal, wherein the second sequence is different from the first sequence;
analog-to-digital, ADC, convert an integration result in order to acquire a sample value, the integration result being based on an integration of the modified receive signal over a period of time; and
acquire an estimate of the linear system impulse response on the basis of a plurality of sample values,
wherein the first sequence and the second sequence are synchronized with each other and/or are generated from a common system clock signal and/or are synchronized with a common system clock signal,
wherein a clock division is performed by dividing the common system clock signal by a first divider factor parameter to acquire a sampling clock signal to control the ADC conversion and/or to define the period of time of the integration of the modified receive signal,
wherein the first sequence is associated with a first linear signal model, and the second sequence is associated with a second linear model, so as to acquire the estimate of the impulse response on the basis of a relationship between the plurality of sample values, the first linear signal model, and the second linear model,
wherein the first linear model is described by a first sparse representation operator and the second linear model is described by a second sparse representation operator,
wherein the first sparse representation operator is acquired through a factorization which involves at least one Hadamard matrix or Hadamard transform.

* * * * *